(12) United States Patent
 Choi et al.

(10) Patent No.: US 11,730,231 B2
(45) Date of Patent: Aug. 22, 2023

(54) SOLE STRUCTURE OF AN ARTICLE OF FOOTWEAR AND RELATED METHODS

(71) Applicant: NIKE, Inc., Beaverton, OR (US)

(72) Inventors: Yoon Jeong Choi, Portland, OR (US); Tory M. Cross, Portland, OR (US); Christian Alexander Steinbeck, Portland, OR (US); James Zormeir, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/643,288

(22) PCT Filed: Aug. 29, 2018

(86) PCT No.: PCT/US2018/048553
§ 371 (c)(1),
(2) Date: Feb. 28, 2020

(87) PCT Pub. No.: WO2019/046432
PCT Pub. Date: Mar. 7, 2019

(65) Prior Publication Data
US 2020/0345102 A1 Nov. 5, 2020

Related U.S. Application Data

(60) Provisional application No. 62/552,885, filed on Aug. 31, 2017.

(51) Int. Cl.
*A43B 13/12* (2006.01)
*A43B 3/00* (2022.01)
(Continued)

(52) U.S. Cl.
CPC .......... *A43B 13/127* (2013.01); *A43B 3/0052* (2013.01); *B29D 35/0009* (2013.01);
(Continued)

(58) Field of Classification Search
CPC ....... A43B 3/0052; A43B 13/127; A43B 9/16; A43B 9/18
See application file for complete search history.

(56) References Cited

U.S. PATENT DOCUMENTS 1,659,339 A 2/1928 Franz
1,701,611 A * 2/1929 Glidden ................. A43B 13/12
 36/73
(Continued)

FOREIGN PATENT DOCUMENTS

DE 1881914 U 10/1963
DE 8305716 U1 6/1983
(Continued)

OTHER PUBLICATIONS

European Patent Office as IPEA, International Preliminary Report of Patentability for PCT Application No. PCT/US2018/048553, dated Jul. 23, 2019.
(Continued)

*Primary Examiner* — Jila M Mohandesi
(74) *Attorney, Agent, or Firm* — Honigman LLP; Matthew H. Szalach; Jonathan P. O'Brien

(57) ABSTRACT

A sole structure of an article of footwear is provided and includes a first midsole portion including a first sidewall and a second midsole portion including a second sidewall. The sole structure also includes a first sheet disposed between the first midsole portion and the second midsole portion and including a first surface and a second surface formed on an opposite side of the first sheet than the first surface. The first sheet includes one or more apertures extending through the first sheet from the first surface to the second surface. The first midsole portion and the second midsole portion are operably connected through the one or more apertures of the first sheet.

14 Claims, 45 Drawing Sheets

(51) Int. Cl.
B29D 35/00 (2010.01)
B29D 35/14 (2010.01)
B29K 105/04 (2006.01)

(52) U.S. Cl.
CPC ....... B29D 35/0054 (2013.01); B29D 35/142 (2013.01); *B29K 2105/04* (2013.01)

(56) References Cited

U.S. PATENT DOCUMENTS

| | | | |
|---|---|---|---|
| 1,704,187 A | 3/1929 | Glidden | |
| 2,333,303 A * | 11/1943 | Enos | A43B 13/22 36/25 R |
| 2,669,036 A * | 2/1954 | Israel | A43B 3/128 36/11.5 |
| 3,345,664 A * | 10/1967 | Ludwig | B29D 35/081 12/142 R |
| 3,812,604 A * | 5/1974 | Sato | B29D 35/10 36/14 |
| 3,878,626 A | 4/1975 | Isman | |
| 3,925,914 A * | 12/1975 | Marcoux | A43B 3/105 36/11.5 |
| 4,005,532 A | 2/1977 | Giese | |
| 4,073,072 A * | 2/1978 | Gross | A43B 7/06 36/44 |
| 4,241,523 A | 12/1980 | Daswick | |
| 4,561,195 A | 12/1985 | Onoda et al. | |
| 4,608,768 A * | 9/1986 | Cavanagh | A43B 13/181 36/28 |
| 4,653,206 A | 3/1987 | Tanel | |
| 4,798,010 A | 1/1989 | Sugiyama | |
| 4,896,440 A * | 1/1990 | Salaverria | A43B 3/0084 12/142 RS |
| 5,022,168 A * | 6/1991 | Jeppson, III | A43B 17/08 36/43 |
| 5,025,573 A | 6/1991 | Giese et al. | |
| 5,075,984 A | 12/1991 | Shiew | |
| 5,561,920 A | 10/1996 | Graham | |
| 5,572,805 A * | 11/1996 | Giese | A43B 13/12 36/103 |
| 5,575,089 A | 11/1996 | Giese | |
| 5,664,343 A | 9/1997 | Byrne | |
| 5,720,118 A * | 2/1998 | Mayer | A43B 13/38 36/107 |
| 5,926,974 A | 7/1999 | Friton | |
| 5,930,916 A | 8/1999 | Connor | |
| 6,021,585 A * | 2/2000 | Cole | A43B 3/122 36/11.5 |
| 6,154,983 A | 12/2000 | Austin | |
| 6,167,639 B1 | 1/2001 | Ventura | |
| 6,205,683 B1 | 3/2001 | Clark | |
| 6,389,713 B1 * | 5/2002 | Kita | A43B 13/026 36/28 |
| 6,401,366 B2 | 6/2002 | Foxen | |
| 7,197,840 B2 | 4/2007 | Nakano | |
| 7,401,421 B2 | 7/2008 | Brennan | |
| 7,627,963 B2 | 12/2009 | Kilgore | |
| 7,814,686 B2 * | 10/2010 | Becker | A43B 13/026 36/73 |
| 9,794,958 B2 | 2/2018 | Cheney | |
| 10,342,292 B2 | 7/2019 | Del Biondi | |
| 10,448,703 B2 | 10/2019 | Schiller | |
| 10,674,791 B2 | 6/2020 | Bruce | |
| 2001/0007177 A1 | 7/2001 | Brown | |
| 2002/0162246 A1 | 11/2002 | Mayer et al. | |
| 2003/0093920 A1 | 5/2003 | Greene | |
| 2005/0229431 A1 * | 10/2005 | Gerlin | A43B 13/026 36/25 R |
| 2007/0186446 A1 | 8/2007 | Lafortune | |
| 2007/0240331 A1 | 10/2007 | Borel | |
| 2008/0098616 A1 * | 5/2008 | Leedy | A43B 3/24 36/102 |
| 2010/0287795 A1 | 11/2010 | Van Niekerk | |
| 2011/0016748 A1 * | 1/2011 | Soler | A43B 3/246 36/102 |
| 2011/0146104 A1 | 6/2011 | Lafortune | |
| 2011/0225852 A1 | 9/2011 | Mahoney | |
| 2012/0030972 A1 | 2/2012 | Arnone et al. | |
| 2013/0167402 A1 | 7/2013 | Christensen et al. | |
| 2014/0013617 A1 | 1/2014 | Montross et al. | |
| 2014/0283412 A1 | 9/2014 | Elder et al. | |
| 2015/0068063 A1 | 3/2015 | Farris | |
| 2015/0082669 A1 * | 3/2015 | Peikert | A43B 7/08 36/30 R |
| 2015/0250259 A1 | 9/2015 | Attey | |
| 2015/0289591 A1 | 10/2015 | Jones | |
| 2016/0095384 A1 * | 4/2016 | Kraft | A43B 13/04 36/103 |
| 2016/0166007 A1 | 6/2016 | Bruce | |
| 2016/0219973 A1 | 8/2016 | Cheney | |
| 2016/0353834 A1 | 12/2016 | Luedecke | |
| 2017/0119094 A1 | 5/2017 | Vontorcik, Jr. et al. | |
| 2017/0238652 A1 | 8/2017 | Langvin | |
| 2017/0267850 A1 | 9/2017 | Baghdadi | |
| 2018/0116336 A1 | 5/2018 | Dallas | |
| 2018/0213884 A1 | 8/2018 | Kim | |
| 2018/0352895 A1 | 12/2018 | Chang | |
| 2019/0125028 A1 | 5/2019 | Bartel et al. | |
| 2020/0046068 A1 * | 2/2020 | Choi | A43B 13/127 |
| 2020/0253326 A1 * | 8/2020 | Choi | A43B 23/042 |

FOREIGN PATENT DOCUMENTS

| | | |
|---|---|---|
| DE | 102010046278 A1 | 2/2011 |
| DE | 102012110573 A1 | 5/2014 |
| EP | 0130816 A2 | 1/1985 |
| EP | 0922400 A1 | 6/1999 |
| EP | 2975962 A2 | 1/2016 |
| EP | 3001924 A1 | 4/2016 |
| EP | 2975962 B1 | 5/2018 |
| GB | 1433481 A | 4/1976 |
| KR | 20070093375 A | 9/2007 |
| KR | 101638304 B1 | 7/2016 |
| WO | WO-2016165734 A1 | 10/2016 |
| WO | WO-2017058419 A1 | 4/2017 |
| WO | WO-2018175734 A1 | 9/2018 |
| WO | WO-2019046438 A1 | 3/2019 |

OTHER PUBLICATIONS

European Patent Office as ISA, International Search Report and Written Opinion for PCT Application No. PCT/US2018/048553, dated Feb. 13, 2019.
European Office Action, Application No. 18 811 089.4, dated Jun. 7, 2021.
European Patent Office, Communication Pursuant to Article 94(3) dated Oct. 20, 2021 for application No. 18811089.4.
European Patent Office as ISA, International Search Report and Written Opinion for PCT Application No. PCT/US2018/048562, dated Feb. 13, 2019.
European Patent Office as IPEA, Written Opinion of the International Preliminary Examining Authority for PCT Application No. PCT/US2018/048562, dated Jul. 18, 2019.
European Office Action, Application No. 18 811 090.2, dated Jun. 7, 2021.
European Patent Office, Communication Pursuant to Article 94(3) EPC dated Oct. 20, 2021 for application No. 18811089.4.
USPTO, Final Office Action for U.S. Appl. No. 16/642,991, dated Oct. 6, 2022.
International Search Report for PCT/US2019/045757 dated Nov. 19, 2019.
International Search Report and Written Opinion for Application No. PCT/US2021/024544 dated Jul. 13, 2021.
USPTO, Non-Final Office Action for U.S. Appl. No. 17/214,887, dated Aug. 23, 2022.
European Patent Office as ISA, International Search Report and Written Opinion for PCT Application No. PCT/US2020/025594, dated Jun. 23, 2020.

(56) References Cited

OTHER PUBLICATIONS

USPTO, Final Office Action for U.S. Appl. No. 16/833,617, dated Sep. 26, 2022.
USPTO, Final Office Action for U.S. Appl. No. 17/214,887, dated Jan. 18, 2023.
USPTO, Non-Final Office Action for U.S. Appl. No. 16/833,617, dated Feb. 8, 2022.
USPTO, Non-Final Office Action for U.S. Appl. No. 16/833,617, dated Dec. 21, 2022.

* cited by examiner

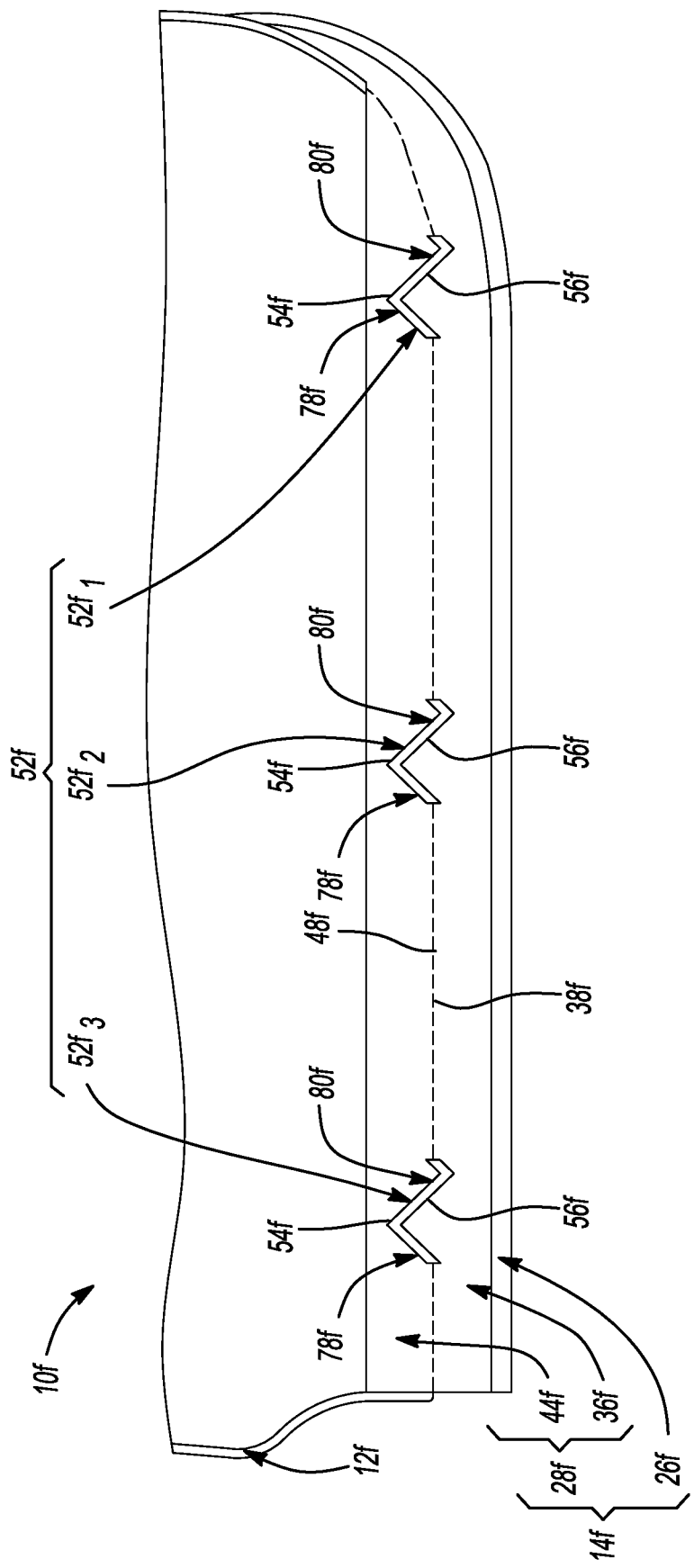

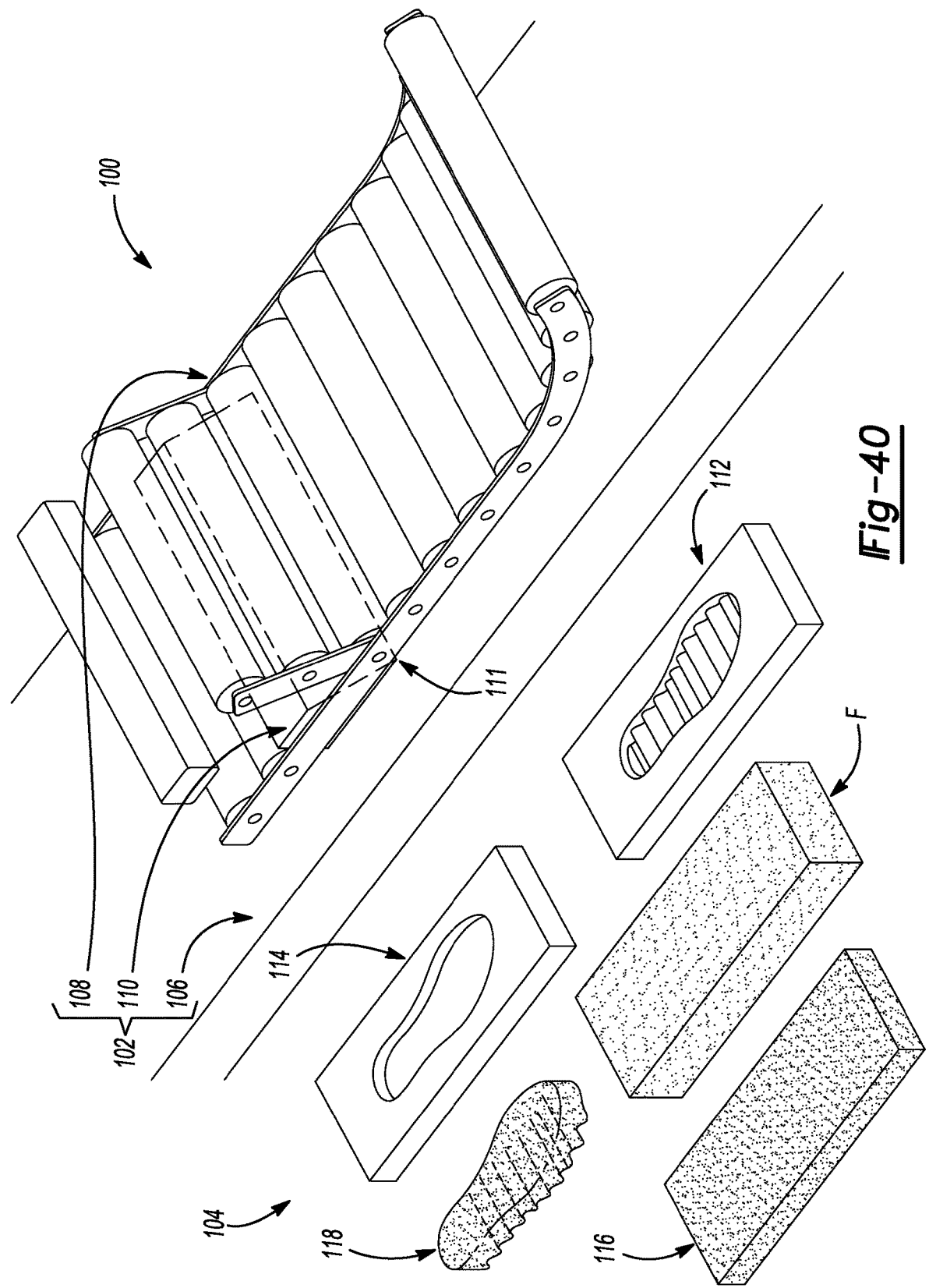

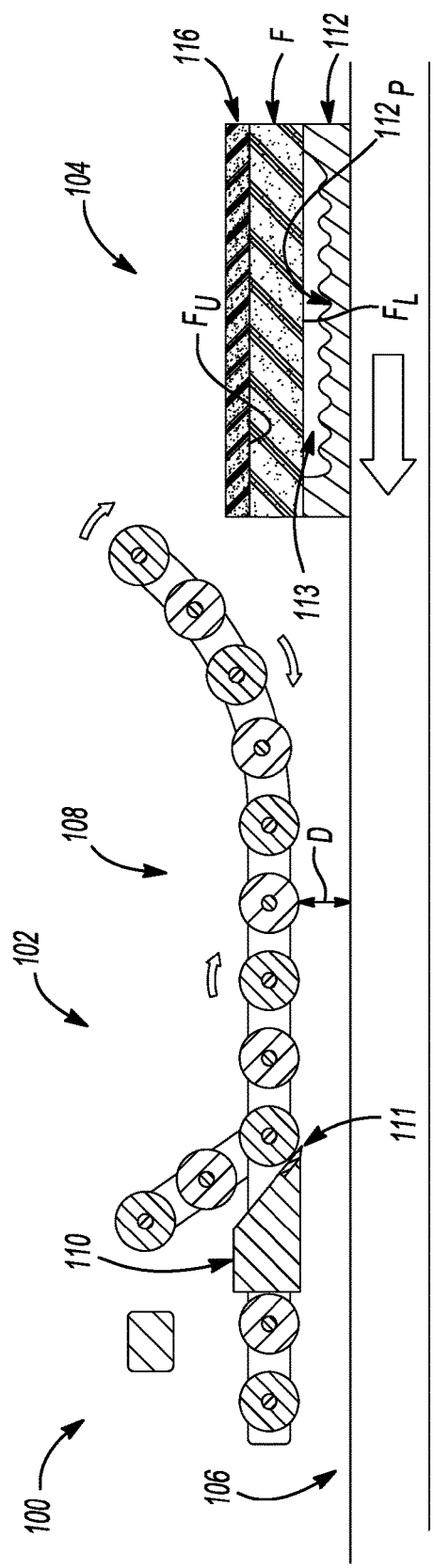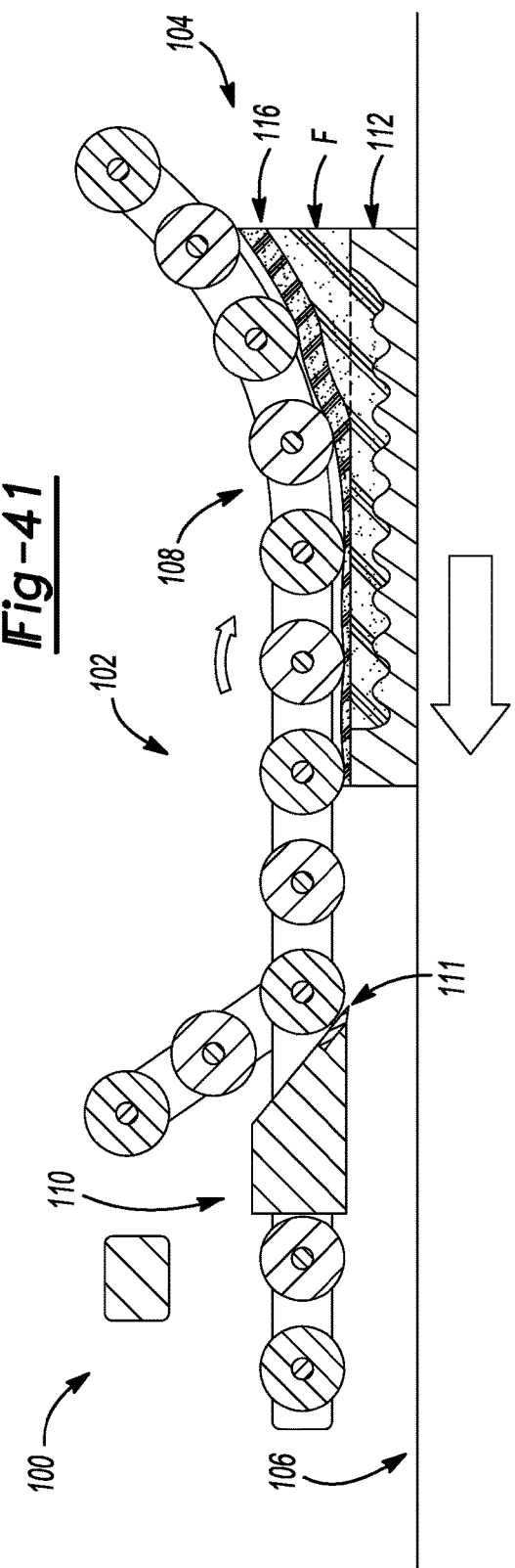

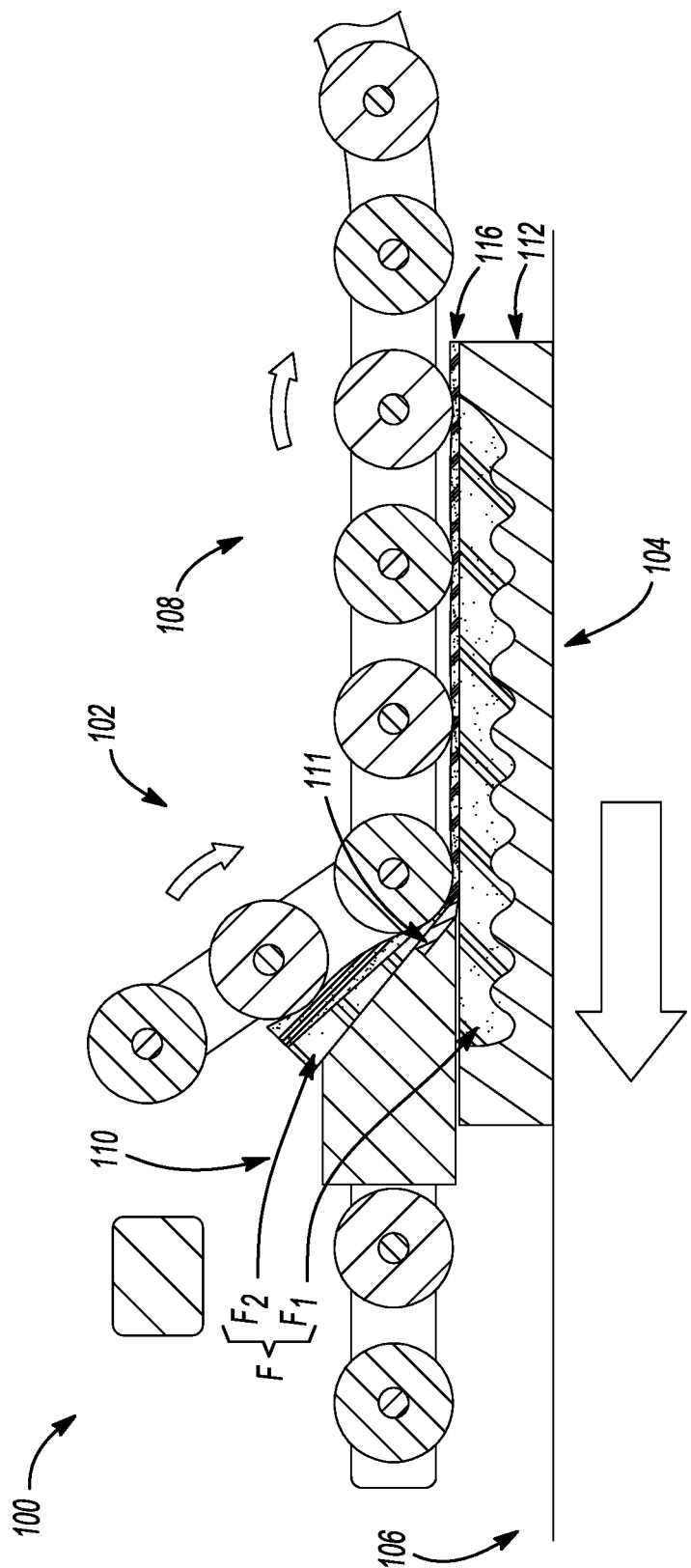

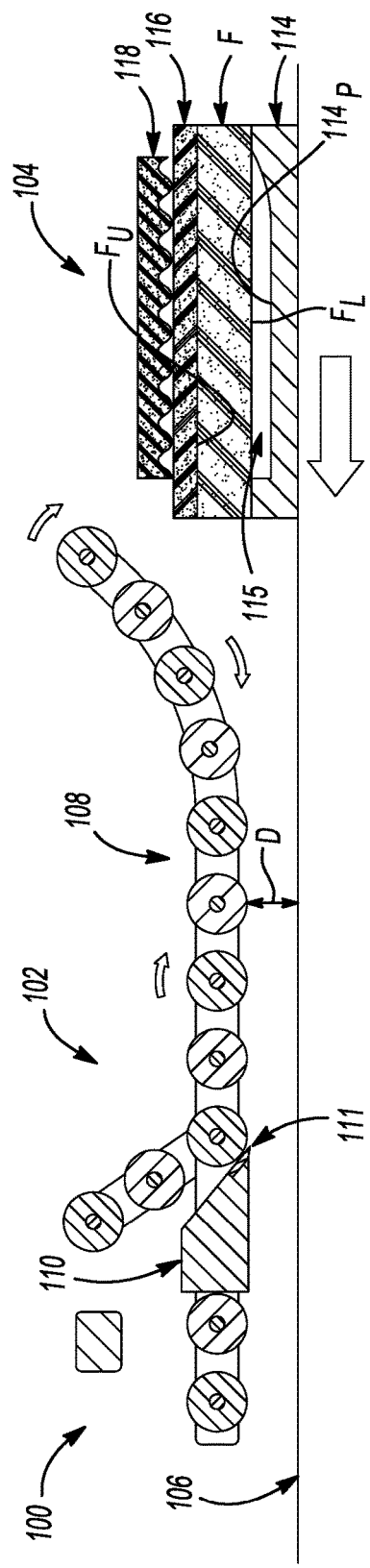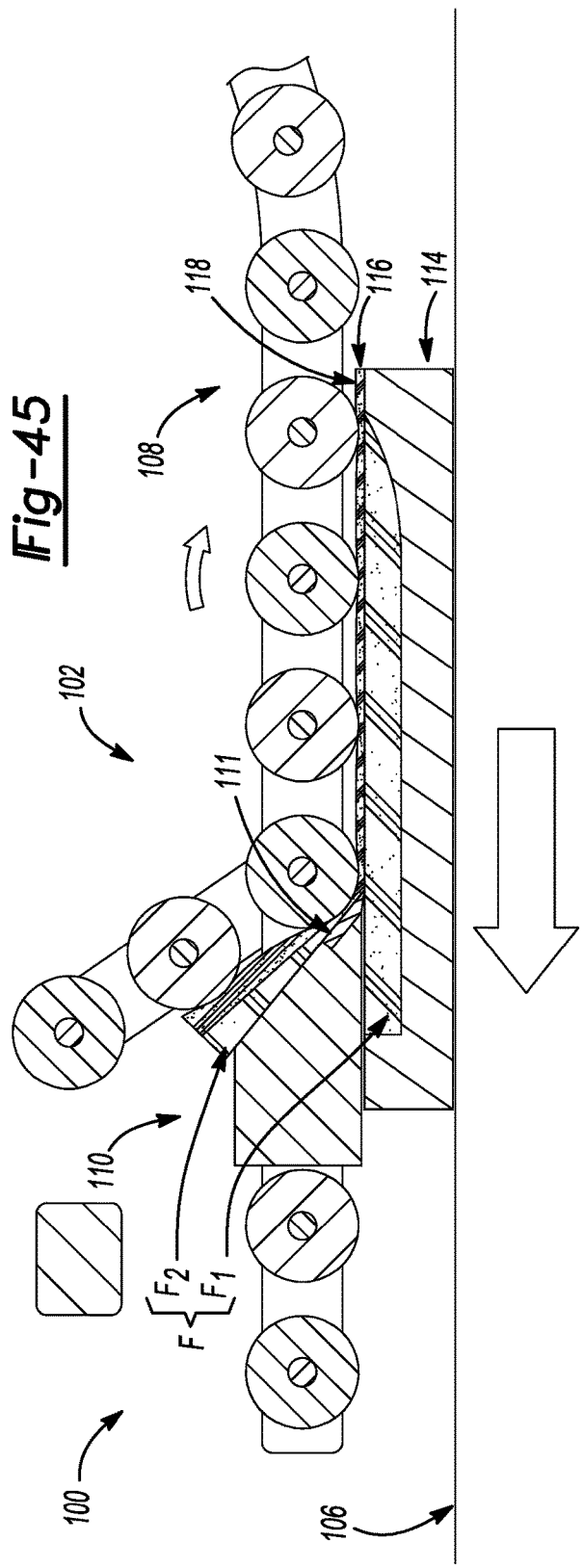
Fig-45
Fig-46

SOLE STRUCTURE OF AN ARTICLE OF FOOTWEAR AND RELATED METHODS

CROSS-REFERENCE TO RELATED APPLICATIONS

This application is the national phase of International Application No. PCT/US2018/048553, filed Aug. 29, 2018, which claims priority to U.S. Provisional Application No. 62/552,885, filed on Aug. 31, 2017, the disclosures of which are hereby incorporated by reference in their entirety.

FIELD

The present disclosure relates generally to an article of footwear and more particularly to a sole structure for an article of footwear.

BACKGROUND

This section provides background information related to the present disclosure and is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a stacked arrangement of a midsole and an outsole extending between a ground surface and the upper. The outsole provides abrasion-resistance and traction with the ground surface and may be formed from rubber or other materials that impart durability and wear-resistance, as well as enhancing traction with the ground surface. The midsole is disposed between the outsole and the upper. While existing sole structures perform adequately for their intended purpose, improvements to sole structures are continuously being sought in order to advance the arts.

DESCRIPTION OF THE DRAWINGS

The drawings described herein are for illustrative purposes only of selected embodiments and not all possible implementations, and are not intended to limit the scope of the present disclosure.

FIG. 39 is an exemplary partial side view of an article of footwear including the first midsole portion and the second midsole portion of any of FIGS. 1-33 and one or more alternative exemplary strips of material having a non-flat pattern;

FIG. 40 is a perspective view of a foam cutting system including a receiver portion, an insertion portion and a foam workpiece portion;

FIG. 41 is a side view of the foam cutting system and the foam workpiece portion of FIG. 40;

FIG. 42 is a further side view of the foam cutting system and the foam workpiece portion of FIG. 41;

FIG. 43 is a further side view of the foam cutting system and the foam workpiece portion of FIG. 42 illustrating the foam workpiece portion being separated into a midsole component portion and a scrap piece portion;

FIG. 45 is another side view of the foam cutting system and another foam workpiece portion of FIG. 40;

FIG. 46 is a further side view of the foam cutting system and the foam workpiece portion of FIG. 45 illustrating the foam workpiece portion being separated into a midsole component portion and a scrap piece portion.

Corresponding reference numerals indicate corresponding parts throughout the several views of the drawings.

DETAILED DESCRIPTION

Figure 1:
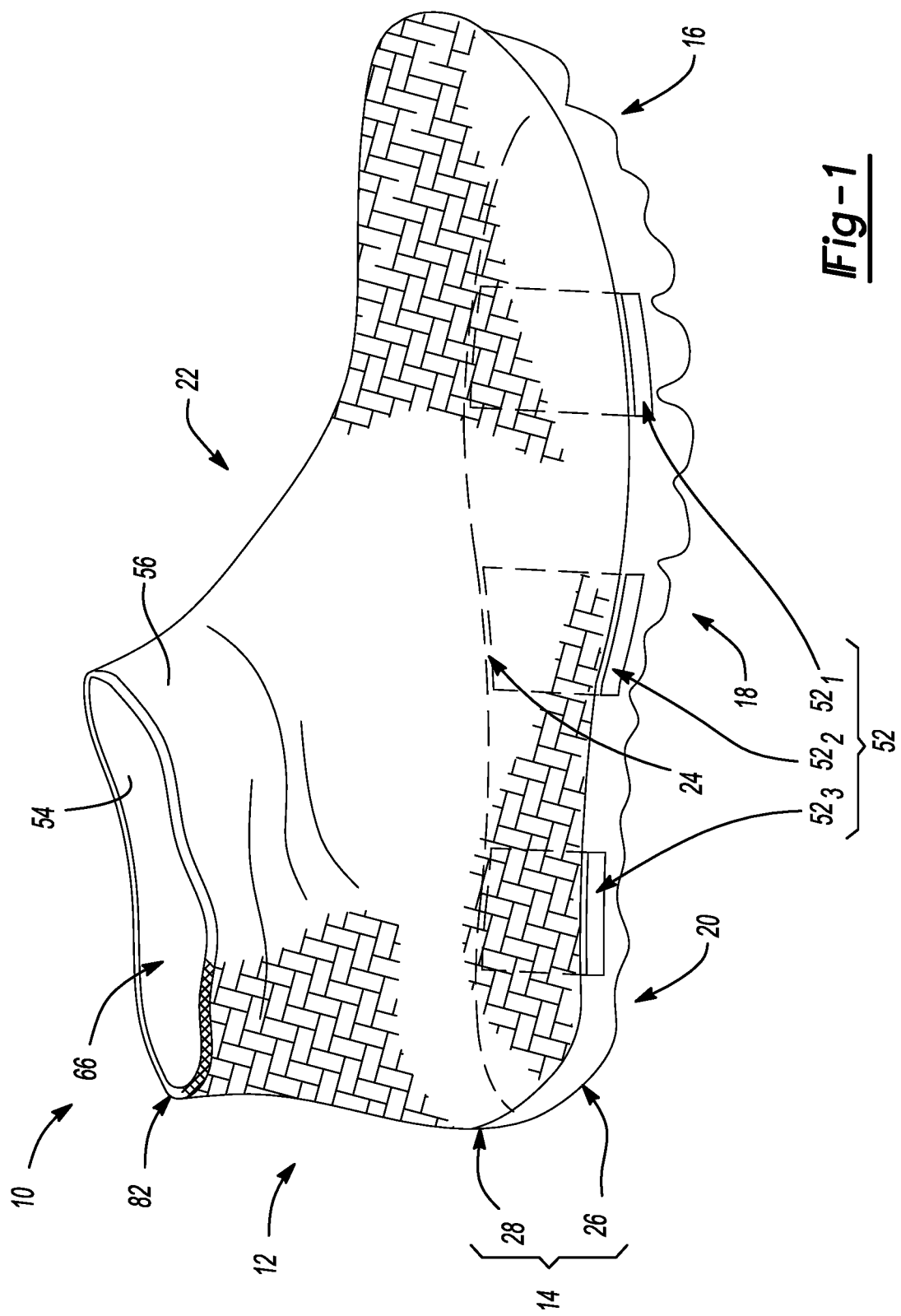
FIG. 1 is a perspective view of an article of footwear incorporating a sole structure in accordance with the principles of the present disclosure.

The present disclosure is related to a sole structure for an article of footwear. The sole structure includes one or more midsole portions (see, e.g., first midsole portions 36, 36$a$, 36$b$, 36$c$, 36$d$, 36$e$ and second midsole portions 44, 44$a$, 44$b$, 44$c$, 44$d$, 44$e$) and one or more strips of material 52, 52$a$, 52$b$, 52$c$, 52$d$, 52$e$ (see, e.g., strips of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52$a$, 52$b$, 52$c$, 52$d$, 52$e$). In an example, the one or more midsole portions may be molded around, molded through or molded around-and-through the one or more strips of material. One or more of the one or more strips of material and the one or more midsole portions may be pre-formed to define a pattern (e.g., a sinusoidal pattern, a saw tooth pattern or the like). One or a combination of the one or more strips of material and the pattern contributes to a desired characteristic (e.g., shear strength, shear stability, shear loading) in one or more regions (e.g., a forefoot region, a midfoot region and a heel region) of the sole structure of the article of footwear. Accordingly, the sole structure may provide improved stability in one or a combination of a parallel loading direction and a perpendicular loading direction when a load is imparted to the sole structure by a user's foot.

Example embodiments will now be described more fully with reference to the accompanying drawings. Example embodiments are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of moded features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or sheet is referred to as being "on," "engaged to," "connected to," or "coupled to" another element or sheet, it may be directly on, engaged, connected or coupled to the other element or sheet, or intervening elements or sheets may be present. In contrast, when an element is referred to as being "directly on," "directly engaged to," "directly connected to," or "directly coupled to" another element or sheet, there may be no intervening elements or sheets present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, sheets and/or sections, these elements, components, regions, sheets and/or sections should not be limited by these terms. These terms may be only used to distinguish one element, component, region, sheet or section from another region, sheet or section. Terms such as "first," "second," and other numerical terms when used herein do not imply a sequence or order unless clearly indicated by the context. Thus, a first element, component, region, sheet or section discussed below could be termed a second element, component, region, sheet or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

One aspect of the disclosure provides a sole structure of an article of footwear and related methods. The sole structure includes a first midsole portion including a first sidewall and a second midsole portion including a second sidewall. The sole structure also includes a first sheet disposed between the first midsole portion and the second midsole portion and including a first surface and a second surface formed on an opposite side of the first sheet than the first surface. The first sheet includes one or more apertures extending through the first sheet from the first surface to the second surface. The first midsole portion and the second midsole portion are operably connected through the one or more apertures of the first sheet.

Implementations of the disclosure may include one or more of the following optional features. In some examples, the sole structure includes a second sheet disposed between the first midsole portion and the second midsole portion. The second sheet may include a third surface and a fourth surface formed on an opposite side of the second sheet than the third surface. The sole structure may also include one or more apertures extending through the second sheet from the third surface to the fourth surface. In these examples, the second sheet may be spaced apart from the first sheet in a first direction. The first direction may be substantially parallel to a longitudinal axis of the sole structure. The second sheet and the first sheet may each include a longitudinal axis that is substantially perpendicular to a longitudinal axis of the sole structure. Optionally, the second sheet and the first sheet may each include a longitudinal axis that is formed at an angle relative to a longitudinal axis of the sole structure. Additionally or alternatively, a longitudinal axis of the first sheet and a longitudinal axis of the second sheet may be substantially parallel to one another or a longitudinal axis of the first sheet and a longitudinal axis of the second sheet are convergent. When a second sheet is disposed between the first midsole portion and the second midsole portion, the second sheet may be in contact with the first sheet. The second sheet may cross the first sheet.

In some implementations, a first distal end of the first sheet is visible at one of a medial side of the sole structure and a lateral side of the sole structure. Here, a second distal end of the first sheet may be visible at the other of the medial side of the sole structure and the lateral side of the sole structure. Optionally, a first distal end of the first sheet may extend from one of a medial side of the sole structure and a lateral side of the sole structure. Here, a second distal end of the first sheet may extend from the other of the medial side of the sole structure and the lateral side of the sole structure.

In some configurations, a first distal end of the first sheet is substantially planar at one of a medial side of the sole structure and a lateral side of the sole structure and a second distal end of the first sheet is substantially planar at the other of the medial side of the sole structure and the lateral side of the sole structure. Optionally, a first distal end of the first sheet may include a sinusoidal shape at one of a medial side of the sole structure and a lateral side of the sole structure and a second distal end of the first sheet may include a sinusoidal shape at the other of the medial side of the sole structure and the lateral side of the sole structure. Additionally or alternatively, a first distal end of the first sheet may include a saw-tooth shape at one of a medial side of the sole structure and a lateral side of the sole structure and a second distal end of the first sheet may include a saw-tooth shape at the other of the medial side of the sole structure and the lateral side of the sole structure.

In some examples of the sole structure, each aperture of the one or more apertures is at least 3.0 mm in length in a largest dimension or at least 1 mm in length in a smallest dimension. Each aperture of the one or more apertures may be a post-processed aperture defined by material removed from the first sheet. The first sheet may be woven, knit, or braided for integrally defining each aperture of the one or more apertures. The sole structure may further include an outsole including a ground-contacting surface. Here, the first midsole portion may be disposed between the outsole and the first sheet. Optionally, the first midsole portion may define at least one first contact region and the second midsole portion may define at least one second contact region. The at least one first contact region may be in contact with the at least one second contact region at the one or more apertures. In some examples, the first midsole portion and the second midsole portion are bonded to one another at the one or more apertures. Additionally, or alternatively, a material of the first midsole portion and a material of the second midsole portion may be melded at the one or more apertures.

In some configurations, the first midsole portion includes a first surface in contact with the first sheet and the second midsole portion includes a second surface in contact with the first sheet. The first surface of the first midsole portion and the second surface of the second midsole portion may each include a plurality of surface features. Here, each of the plurality of surface features may have a minimum height or depth of at least 2 mm or may have a minimum height or depth of at least 5 mm. Each of the plurality of surface features may also have a maximum height or depth of less than 22 mm or may have a maximum height or depth of less than 17 mm. The height or depth of each of the plurality of surface features may range from about 2 mm to about 15 mm.

In some implementations, the first midsole portion includes a first series of peaks and a first series of valleys and the second midsole portion includes a second series of peaks and a second series of valleys. The first series of peaks may oppose the second series of valleys and the second series of peaks may oppose the first series of valleys. The first sheet may conform to the shape of the first series of peaks and the first series of valleys and may also conform to the shape of the second series of peaks and the second series of valleys. The first series of peaks, the first series of valleys, the second series of peaks, and the second series of valleys may cooperate to provide the first sheet with a side surface having a sinusoidal or saw-tooth configuration. In some examples, the sole structure includes an adhesive disposed between the first midsole portion and the second midsole portion. The adhesive may be applied to at least one of the first midsole portion, the second midsole portion, the first surface of the sheet, and the second surface of the sheet.

In some configurations, the first sheet includes a mesh textile defining the one or more apertures in a structure of the mesh. The one or more apertures may each be at least 0.5 mm in length in a largest dimension or may each be at least 1.0 mm in length in a largest dimension. Additionally or alternatively, the one or more apertures may each be less than 10 mm in length in a largest dimension, may each be less than 5.0 mm in length in a largest dimension, or may each be less than 3.0 mm in length in a largest dimension. Optionally, the one or more apertures may each have a length in a largest dimension from about 0.5 mm to about 3.0 mm.

In some examples, the first sheet is a textile configured to stretch in only one dimension. Optionally, the first sheet may be a textile configured to stretch in two dimensions. The first sheet may be an embroidered textile. The embroidered textile may include a first embroidered region and a second embroidered region. The first embroidered region may have a different concentration of fibers than the second embroidered region. Additionally or alternatively, the first sheet includes embroidered regions disposed at discrete locations of the sheet.

In some implementations, at least one of the first midsole portion and the second midsole portion is formed from a polymeric material having a foam structure. The polymeric material having a foam structure may be an injection-molded foam or may be a compression-molded foam.

Another aspect of the disclosure provides a method of making a sole structure for an article of footwear. The method includes providing a first midsole portion including a first sidewall and providing a second midsole portion including a second sidewall. The method further includes positioning a first sheet of material between the first midsole portion and the second midsole portion. The first sheet has a first surface and has a second surface formed on an opposite side of the first sheet than the first surface. The first sheet also includes one or more apertures extending through the sheet from the first surface to the second surface. The method also includes connecting the first midsole portion and the second midsole portion through the one or more apertures of the first sheet.

Implementations of the disclosure may include one of more of the following optional features. In some examples, the method includes positioning a second sheet between the first midsole portion and the second midsole portion. In this example, positioning a second sheet may include providing a second sheet having a third surface and a fourth surface formed on an opposite side of the second sheet than the third surface. The method may also include providing one or more apertures that extend through the second sheet from the third surface to the fourth surface. The method may further include spacing the second sheet apart from the first sheet in a first direction. Here, spacing the second sheet apart from the first sheet in a first direction may include spacing the second sheet apart from the first sheet in a direction that is substantially parallel to a longitudinal axis of the sole structure.

In some implementations, the method includes providing the second sheet and the first sheet with a longitudinal axis that is substantially perpendicular to a longitudinal axis of the sole structure. Optionally, the method may include providing the second sheet and the first sheet with a longitudinal axis that is formed at an angle relative to a longitudinal axis of the sole structure. Additionally or alternatively, the method may include positioning a longitudinal axis of the first sheet and a longitudinal axis of the second sheet substantially parallel to one another or positioning a longitudinal axis of the first sheet and a longitudinal axis of the second sheet convergent to one another. The method may include placing the second sheet in contact with the first sheet. When placing the second sheet in contact with the first sheet, the method may include crossing the second sheet and the first sheet.

In some configurations, the method includes exposing a first distal end of the first sheet at one of a medial side of the sole structure and a lateral side of the sole structure. The method may also include exposing a second distal end of the first sheet at the other of the medial side of the sole structure and the lateral side of the sole structure. Optionally, the method may include extending a first distal end of the first sheet from one of a medial side of the sole structure and a lateral side of the sole structure. Here, the method may further include extending a second distal end of the first sheet from the other of the medial side of the sole structure and the lateral side of the sole structure.

In some examples, the method includes providing a first distal end of the first sheet with a substantially planar configuration at one of a medial side of the sole structure and a lateral side of the sole structure and providing a second distal end of the first sheet with a substantially planar configuration at the other of the medial side of the sole structure and the lateral side of the sole structure. Optionally, the method may include providing a first distal end of the first sheet with a sinusoidal shape at one of a medial side of the sole structure and a lateral side of the sole structure and providing a second distal end of the first sheet with a sinusoidal shape at the other of the medial side of the sole structure and the lateral side of the sole structure. Additionally or alternatively, the method may include providing a first distal end of the first sheet with a saw-tooth shape at one of a medial side of the sole structure and a lateral side of the sole structure and providing a second distal end of the first sheet with a saw-tooth shape at the other of the medial side of the sole structure and the lateral side of the sole structure.

In some implementations, the method includes providing each aperture of the one or more apertures with a length that is at least 3.0 mm in a largest dimension. Optionally, the method may include providing each aperture of the one or more apertures with a length that is at least 1 mm in a smallest dimension. The method may include forming each aperture of the one or more apertures by removing material from the first sheet. Additionally or alternatively, positioning the first sheet may include positioning a sheet that is woven, knit, or braided for integrally defining each aperture of the one or more apertures. The method may further include providing an outsole including a ground-contacting surface. When providing an outsole including a ground-contacting surface, the method may also include positioning the first midsole portion between the outsole and the first sheet.

In some examples, providing a first midsole portion includes providing a first midsole portion that defines at least one first contact region and providing a second midsole portion includes providing a second midsole portion that defines at least one second contact region. Here, the at least one first contact region may be in contact with the at least one second contact region at the one or more apertures. The method may also include bonding the first midsole portion and the second midsole portion to one another at the one or more apertures. Additionally or alternatively, the method may further include melding a material of the first midsole portion and a material of the second midsole portion at the one or more apertures.

In some configurations, the method also includes contacting a first surface of the first midsole portion with the first sheet and contacting a second surface of the second midsole portion with the first sheet. The first surface of the first midsole portion and the second surface of the second midsole portion may each include a plurality of surface features. The method may also include providing each of the plurality of surface features with a minimum height or depth of at least 2 mm or with a minimum height or depth of at least 5 mm. Additionally or alternatively, the method may further include providing each of the plurality of surface features with a maximum height or depth of less than 22 mm or with a maximum height or depth of less than 17 mm. Optionally the method may also include providing each of the plurality of surface features with a height or depth that ranges from about 2 mm to about 15 mm.

In some implementations, the method includes providing the first midsole portion with a first series of peaks and a first series of valleys and providing the second midsole portion with a second series of peaks and a second series of valleys. Here, the method may include opposing the first series of peaks with the second series of valleys and opposing the second series of peaks with the first series of valleys. The method may also include conforming the first sheet to the shape of the first series of peaks and the first series of valleys and conforming the first sheet to the shape of the second series of peaks and the second series of valleys. Optionally, the method may include providing the first sheet with a side surface having a sinusoidal or saw-tooth configuration.

In some examples, the method includes positioning an adhesive between the first midsole portion and the second midsole portion. The adhesive may be applied to at least one of the first midsole portion, the second midsole portion, the first surface of the sheet, and the second surface of the sheet. When positioning a first sheet, the method may include positioning a first sheet that includes a mesh textile defining the one or more apertures in a structure of the mesh. The method may also include providing each of the one or more apertures with a length of at least 0.5 mm in a largest dimension or may include providing each of the one or more apertures with a length of at least 1.0 mm in a largest dimension. Optionally, the method may further include providing each of the one or more apertures with a length that is less than 10 mm in a largest dimension, a length that is less than 5.0 mm in a largest dimension, or a length that is less than 3.0 mm in a largest dimension. Additionally or alternatively, the method may also include providing each of the one or more apertures with a length from about 0.5 mm to about 3.0 mm in a largest dimension.

In some configurations, when providing a first sheet, the method includes providing a first sheet that is a textile configured to stretch in only one dimension or the method includes providing a first sheet that is a textile configured to stretch in two dimensions. When providing a first sheet, the method may also include providing a first sheet that is an embroidered textile. Here, an embroidered textile may include providing a textile that has a first embroidered region and a second embroidered region. The first embroidered region may a have different concentration of fibers than the second embroidered region. Optionally, the method may further include providing the first sheet with embroidered regions disposed at discrete locations of the sheet.

In some examples, the method includes forming at least one of the first midsole portion and the second midsole portion from a polymeric material having a foam structure. When forming at least one of the first midsole portion and the second midsole portion from a polymeric material having a foam structure, then method may include incorporation of an injection-molded foam. Optionally, when forming at least one of the first midsole portion and the second midsole portion from a polymeric material having a foam structure, the method may include incorporation of a compression-molded foam.

With reference to FIG. 1, an exemplary article of footwear 10 is provided and includes an upper 12 and a sole structure 14 attached to the upper 12. The article of footwear 10 may be divided into one or more regions. The regions may include a forefoot region 16, a midfoot region 18, and a heel region 20. The forefoot region 16 may correspond with toes and joints connecting metatarsal bones with phalanx bones of a foot. The midfoot region 18 may correspond with an arch area of the foot while the heel region 18 may correspond with rear portions of the foot, including a calcaneus bone. The article of footwear 10 may additionally include a medial side 22 and a lateral side 24 that correspond with opposite sides of the article of footwear 10 and extend through the regions 16, 18, 20.

The sole structure 14 includes a midsole 28 and optionally includes an outsole 26. A cushioning arrangement (not shown) may optionally be disposed generally between the outsole 26 and the midsole 28.

Figure 2:
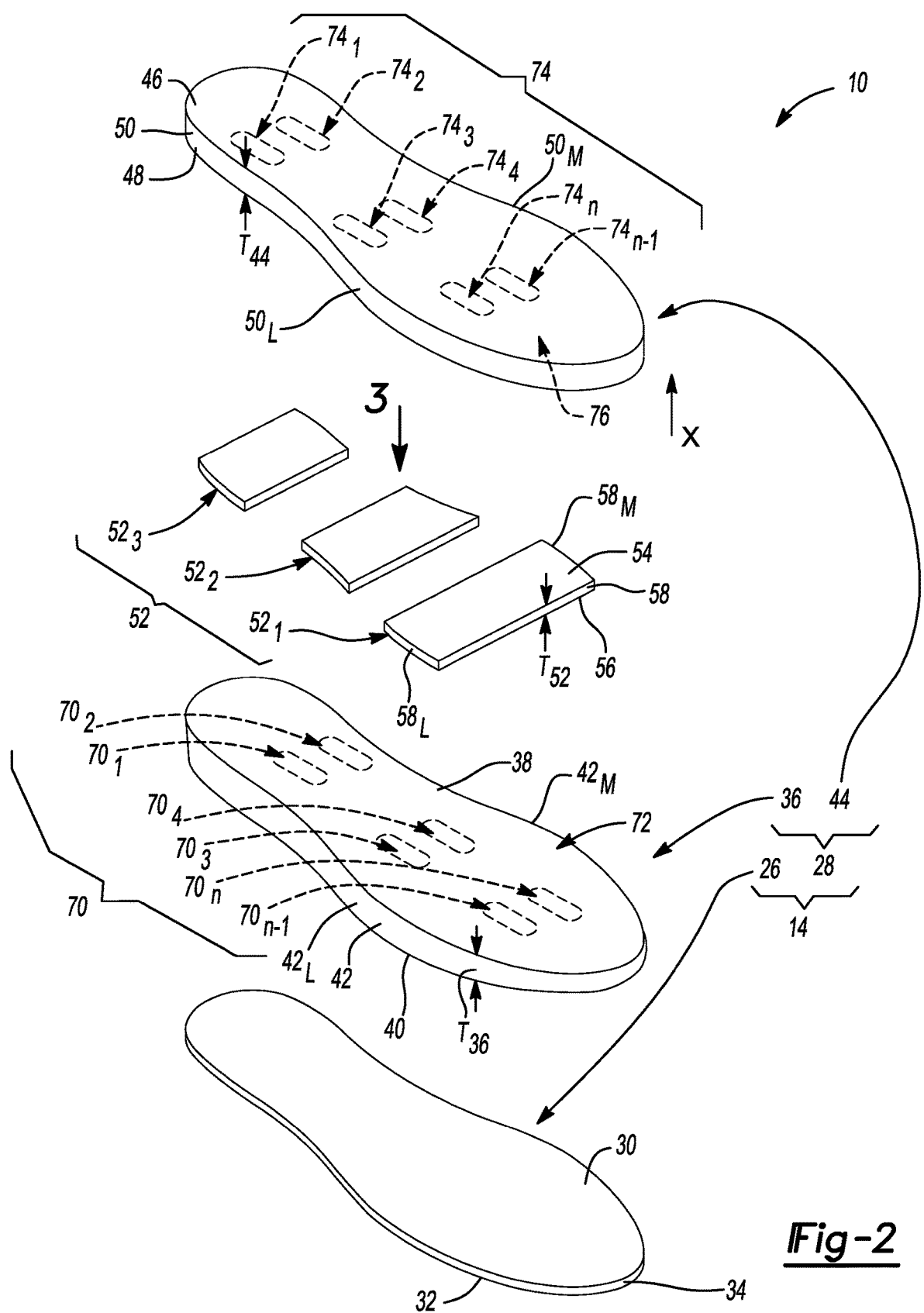
FIG. 2 is a perspective exploded view of a portion of the article of footwear of FIG. 1.

Referring to FIG. 2, the outsole 26 includes a midsole-contacting surface 30 and a ground-contacting surface 32. The outsole 26 further includes a sidewall surface 34 extending between the midsole-contacting surface 30 and the ground-contacting surface 32.

As also shown in, for example, FIG. 2, the midsole 28 includes a first midsole portion 36 and a second midsole portion 44. The first midsole portion 36 includes a top surface 38, a bottom surface 40 and a sidewall surface 42 extending between the top surface 38 and the bottom surface 40. The sidewall surface 42 may define a thickness ($T_{36}$) of the first midsole portion 36 extending between the top surface 38 and the bottom surface 40.

The top surface 38 and the bottom surface 40 of the first midsole portion 36 may generally define an outer surface profile of the first midsole portion 36. In an example, each of the top surface 38 and the bottom surface 40 of the first midsole portion 36 may be substantially flat (e.g., planar). In this regard, each of the top surface 38 and the bottom surface 40 may not be interrupted with one or more recesses, trenches, valleys, or other similar features. Furthermore, in an example, the top surface 38 of the first midsole portion 36 may be substantially parallel to the bottom surface 40 of the first midsole portion 36 such that the thickness ($T_{36}$) of the first midsole portion 36 is substantially the same across a length ($L_{14}$) of the sole structure 14 as shown in, for example, FIG. 11.

With continued reference to FIG. 2, the second midsole portion 44 includes a top surface 46, a bottom surface 48 and a sidewall surface 50 extending between the top surface 46 and the bottom surface 48. The sidewall surface 50 may define a thickness ($T_{44}$) of the second midsole portion 44 extending between the top surface 46 and the bottom surface 48.

The top surface 46 and the bottom surface 48 of the second midsole portion 44 may generally define an outer surface profile of the second midsole portion 44. In an example, each of the top surface 46 and the bottom surface 48 of the second midsole portion 44 may be substantially flat (e.g., planar). In this regard, each of the top surface 46 and the bottom surface 48 may not be interrupted with one or more recesses, trenches, valleys, or other similar features. Furthermore, in an example, the top surface 46 of the second midsole portion 44 may be substantially parallel to the bottom surface 48 of the second midsole portion 44 such that the thickness ($T_{44}$) of the second midsole portion 44 is substantially the same across the length ($L_{14}$) of the sole structure 14 as shown in, for example, FIG. 11.

In some examples, at least one of the first midsole portion 36 and the second midsole portion 44 are formed from a foamed material. In some instances, one or both of the first midsole portion 36 and the second midsole portion 44 are formed from a polymeric material. In some examples, the first midsole portion 36 and the second midsole portion 44 are formed from the same material. In another example, the first midsole portion 36 and the second midsole portion 44 are formed from different materials. The first midsole portion 36 may be formed from a first material and the second midsole portion 44 may be formed from a second material. The first material forming the first midsole portion 36 may have substantially the same stiffness as the second material forming the second midsole portion 44. In some instances, the first material forming the first midsole portion 36 has a different stiffness than the second material forming the second midsole portion 44. In other examples, the first material forming the first midsole portion 36 is the same as the second material forming the second midsole portion 44. In yet another example, the first material forming the first midsole portion 36 is different than the second material forming the second midsole portion 44.

Figure 3:
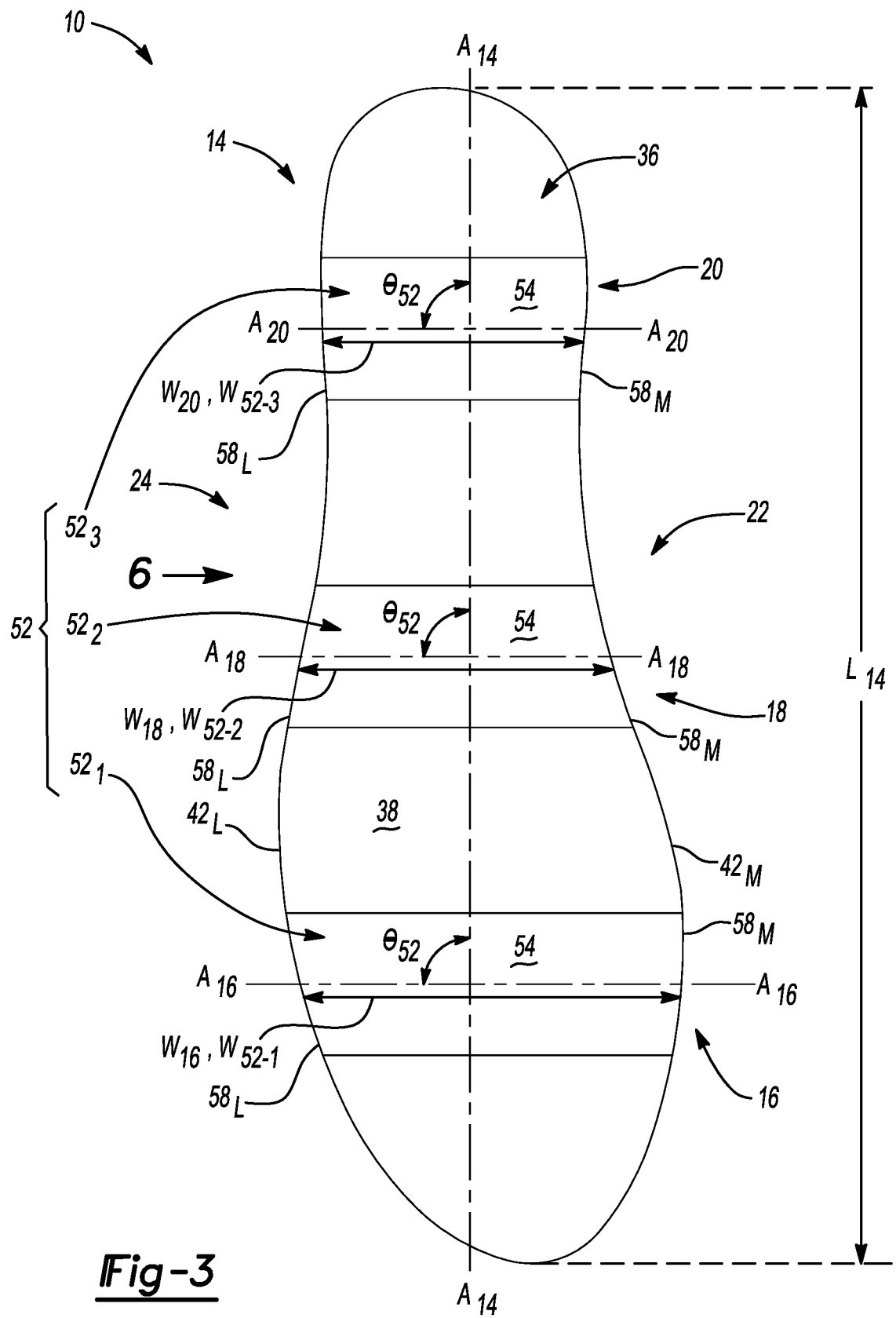
FIG. 3 is an exemplary top view of the article of footwear according to arrow 3 of FIG. 2.

As shown in FIGS. 2-3, the article of footwear 10 further includes one or more strips of material 52. In an example, the one or more strips of material 52 may include three strips of material $52_1$-$52_3$.

Figure 4:
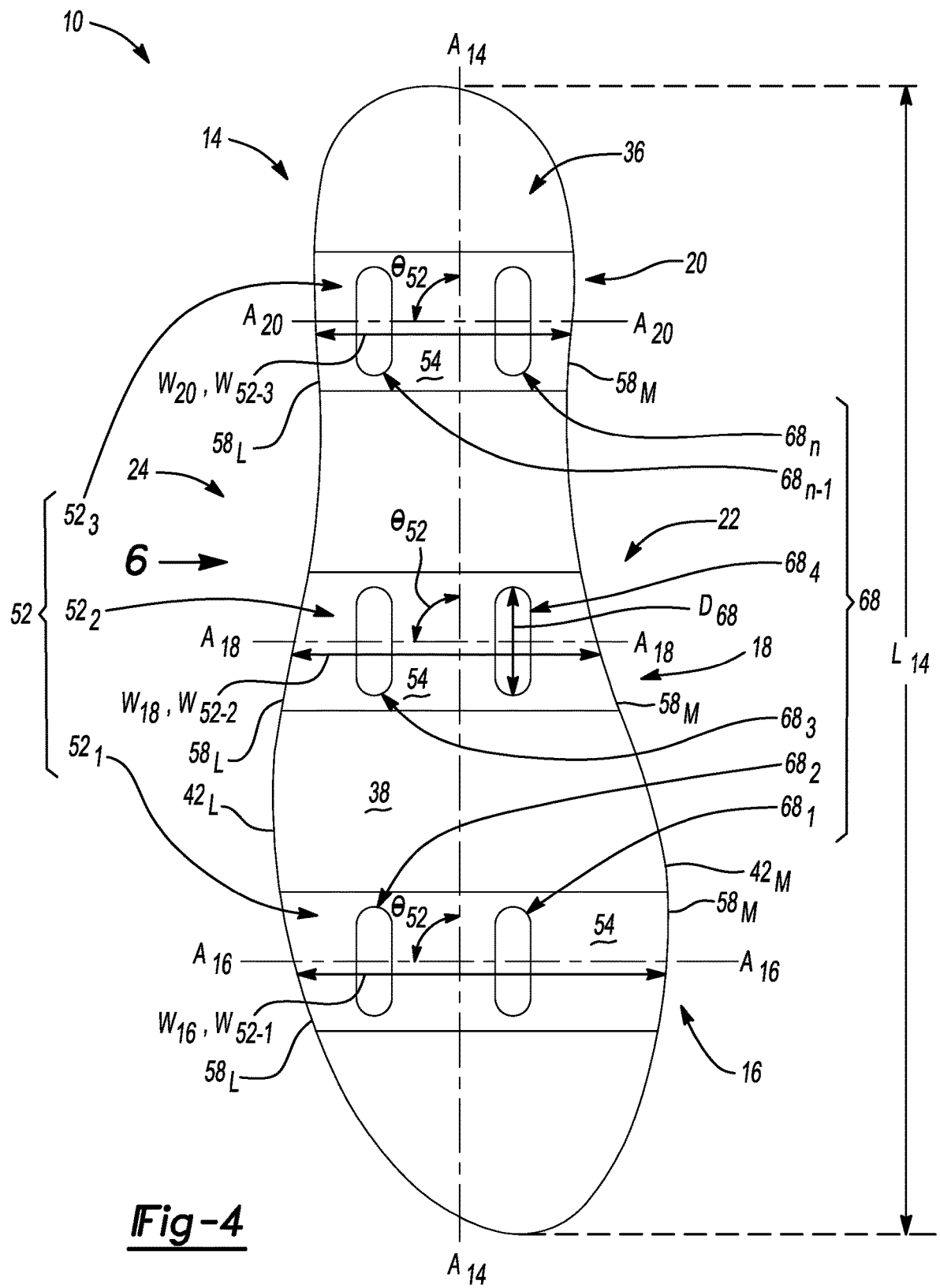
FIG. 4 is an exemplary alternative top view of the article of footwear according to arrow 3 of FIG. 2.
Figure 5:
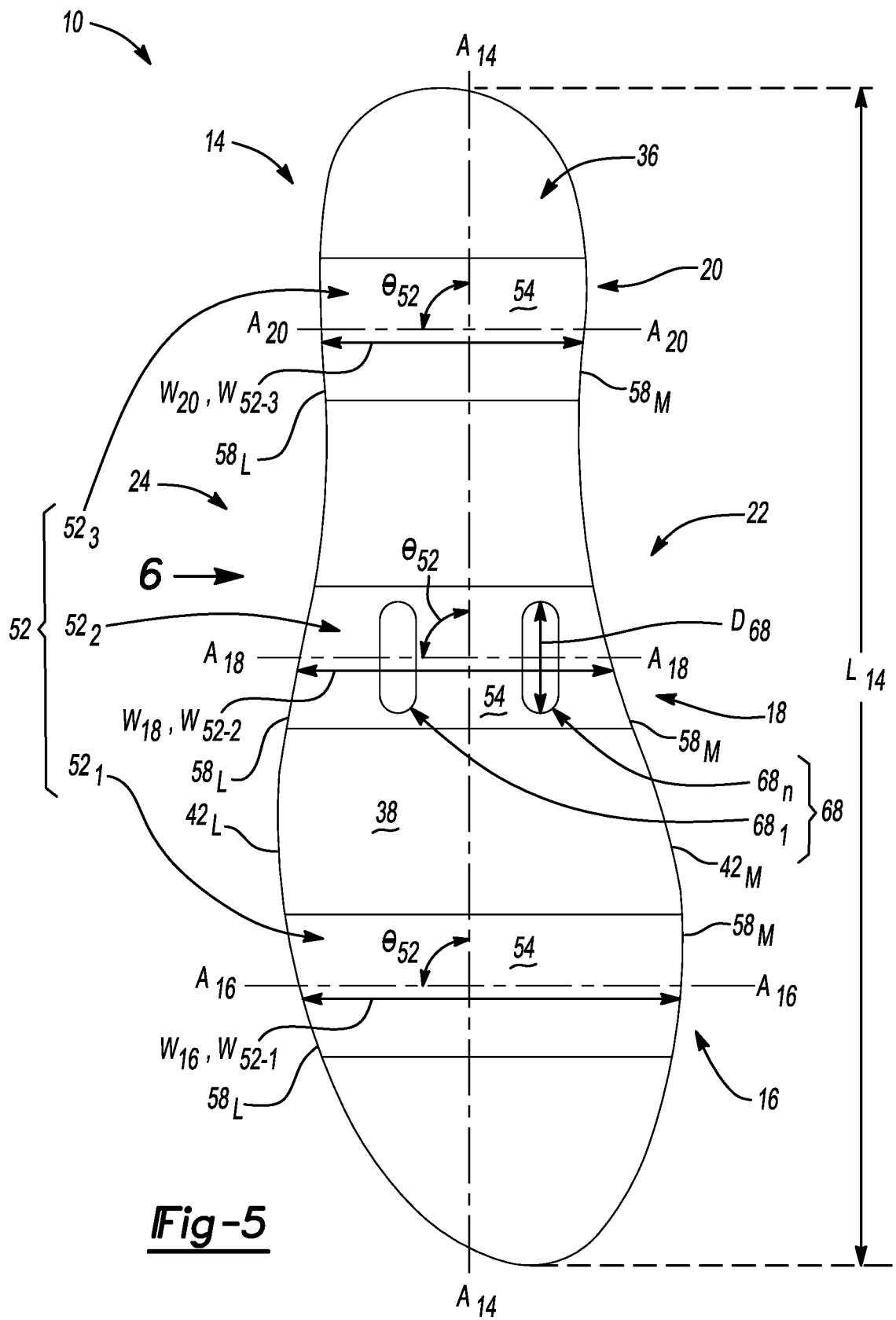
FIG. 5 is another exemplary alternative top view of the article of footwear according to arrow 3 of FIG. 2.

With reference to FIGS. 3, 4 and 5, if the one or more strips of material 52 includes, for example, three strips of material $52_1$-$52_3$, in some instances the one or more strips of material 52 may be arranged as follows: (1) a width ($W_{52-1}$) of a first strip of material $52_1$ extends across a width ($W_{16}$) of the forefoot region 16 of the article of footwear 10 from the medial side 22 to the lateral side 24 of the article of footwear 10, (2) a width ($W_{52-2}$) of a second strip of material $52_2$ extends across a width ($W_{18}$) of the midfoot region 18 of the article of footwear 10 from the medial side 22 to the lateral side 24 of the article of footwear 10, and (3) a width ($W_{52-1}$) of a third strip of material $52_3$ extends across a width ($W_{20}$) of the heel region 20 of the article of footwear 10 from the medial side 22 to the lateral side 24 of the article of footwear 10. As shown in FIGS. 3, 4 and 5, the width ($W_{52-1}$), ($W_{52-2}$), ($W_{52-3}$) of each strip of material $52_1$-$52_3$ of the one or more strips of material 52 extends substantially perpendicularly $\theta_{52}$ along respective axes $A_{16}$-$A_{16}$, $A_{18}$-$A_{18}$, $A_{20}$-$A_{20}$, corresponding to the widths ($W_{16}$, $W_{18}$, $W_{20}$) of the forefoot region 16, the midfoot region 18 and the heel region 20 of the article of footwear 10 with respect to an axis $A_{14}$-$A_{14}$ extending along the length ($L_{14}$) of the sole structure 14.

Referring back to FIG. 2, each strip of material $52_1$-$52_3$ of the one or more strips of material 52 includes a top surface 54, a bottom surface 56 and a sidewall surface 58 extending between the top surface 54 and the bottom surface 56. The sidewall surface 58 may define a thickness ($T_{52}$) of each strip of material $52_1$-$52_3$ of the one or more strips of material 52 extending between the top surface 54 and the bottom surface 56.

In an example, each strip of material $52_1$-$52_3$ of the one or more strips of material 52 is formed from a flexible material. Each strip of material $52_1$-$52_3$ of the one or more strips of material 52 may include a fabric material, a woven textile (see, e.g., enlarged view of the each strip of material 52 in FIG. 2), or a knitted textile (see, e.g., enlarged view of the each strip of material 52 in FIG. 2). In some instances, each strip of material $52_1$-$52_3$ of the one or more strips of material 52 is porous. Each strip of material $52_1$-$52_3$ of the one or more strips of material 52 may be formed from a polymeric material such as, for example, a thermoplastic polymeric material. An exemplary thermoplastic polymeric material may include, for example, a thermoset polymeric material or the like. In some examples, each strip of material $52_1$-$52_3$ of the one or more strips of material 52 may be a thermoformable material. In some examples, if each strip of material 52 is a woven or knit structure (as seen in, e.g., the enlarged view of FIG. 2), the woven or knit structure may be formed from a polyester yarn. Furthermore, in other examples, if each strip of material 52 is a woven or knit structure (as seen in, e.g., the enlarged view of FIG. 2), each passage or aperture formed by overlapping members defining the woven or knit structure of each strip of material 52 may be at least 0.5 mm in length in a largest dimension or at least 1.0 mm in length in a largest dimension.

Furthermore, each passage or aperture formed by overlapping members defining the woven or knit structure of each strip of material 52 may permit one or both of the first midsole portion 36 and the second midsole portion 44 to directly contact one another. In other implementations, one or both of the first midsole portion 36 and the second midsole portion 44 may be injection molded around or through each passage or aperture formed by overlapping members defining the woven or knit structure of each strip of material 52.

In some instances, each strip of material $52_1$-$52_3$ of the one or more strips of material 52 is an embroidered textile. In some examples, each strip of material $52_1$-$52_3$ of the one or more strips of material 52 has one or more first regions including embroidery and one or more second regions without embroidery or with a lower percentage of embroidered surface area as comparted to the one or more first regions. The embroidery can provide reduced stretch or a "lock down" feature to areas of each strip of material $52_1$-$52_3$ of the one or more strips of material 52. Such areas of each strip of material $52_1$-$52_3$ of the one or more strips of material 52 provide a reduced stretch quality and may be located, for example, at a region of each strip of material $52_1$-$52_3$ of the one or more strips of material 52 that is arranged between the first midsole portion 36 and the second midsole portion 44, or, alternatively at a region that extends beyond the sidewall surface 58 of each strip of material $52_1$-$52_3$ of the one or more strips of material 52.

Figure 11:
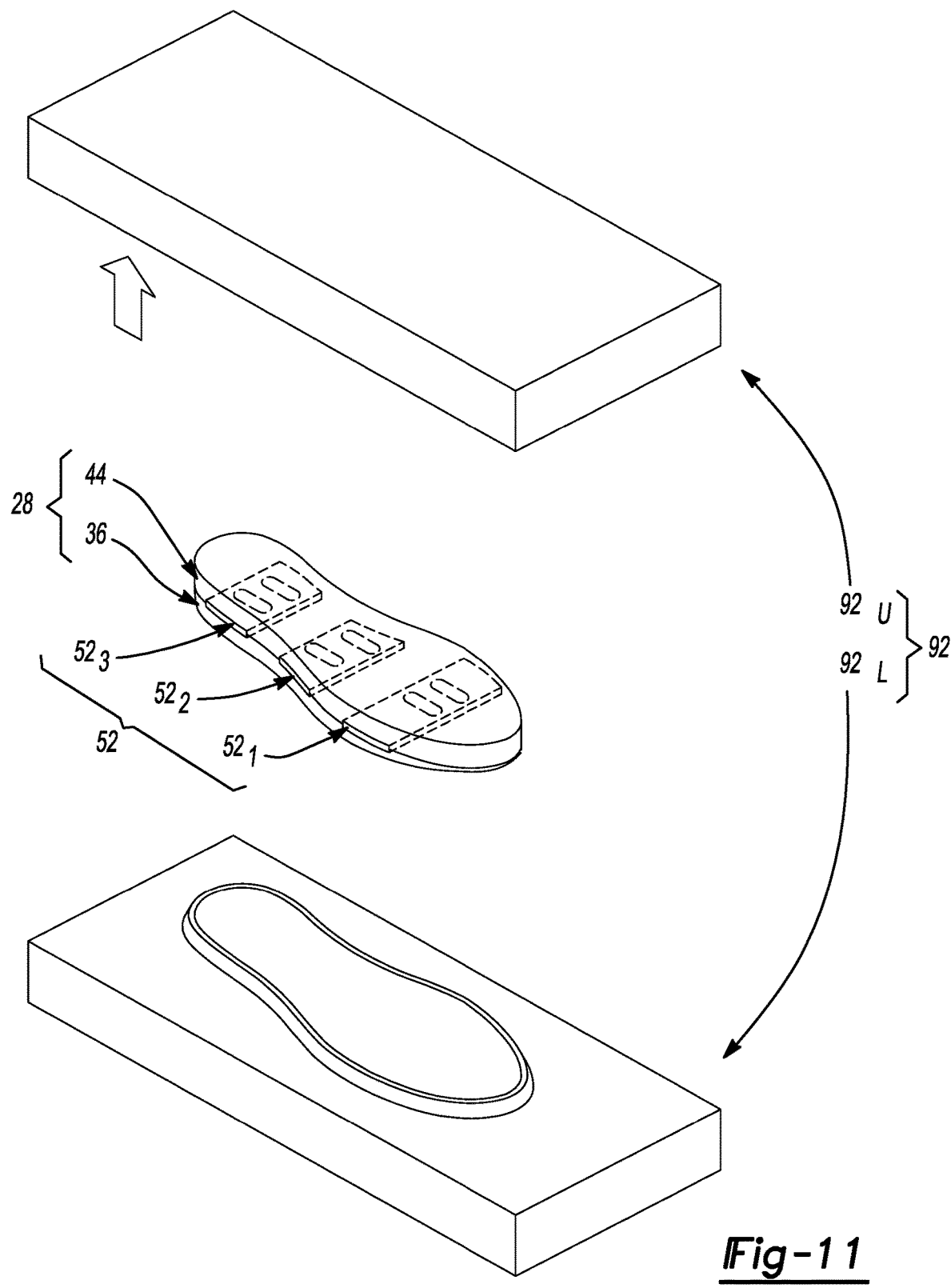
FIG. 11 is a further perspective view of the mold tool and the portion of the article of footwear of FIG. 10 arranged in an assembled state.

With reference to FIG. 2, the first midsole portion 36 is disposed between the outsole 26 and the upper 12. When the sole structure 14 is attached to the upper 12 as shown in FIG. 1, the second midsole portion 44 is disposed between the first midsole portion 36 and the upper 12. As shown in FIGS. 2 and 11, each strip of material $52_1$-$52_3$ of the one or more strips of material 52 is disposed between the first midsole portion 36 and the second midsole portion 44. The bottom surface 56 of each strip of material $52_1$-$52_3$ of the one or more strips of material 52 extends across the top surface 38 of the first midsole portion 36. The top surface 54 of each strip of material $52_1$-$52_3$ of the one or more strips of material 52 extends across the bottom surface 48 of the second midsole portion 44.

As shown in FIG. 2, the sidewall surface 58 of each strip of material $52_1$-$52_3$ of the one or more strips of material 52 may be further defined by a medial sidewall surface portion $58_M$ and a lateral sidewall surface portion $58_L$. The width ($W_{52-1}$, $W_{52-2}$, $W_{52-3}$) of each strip of material $52_1$-$52_3$ of the one or more strips of material 52 extends between the medial sidewall surface portion $58_M$ and the lateral sidewall surface portion $58_L$ of each strip of material $52_1$-$52_3$ of the one or more strips of material 52. Furthermore, the sidewall surface 42, 50 of each of the first midsole portion 36 and the second midsole portion 44 may be further defined by a medial sidewall surface portion $42_M$, $50_M$ and a lateral sidewall surface portion $42_L$, $50_L$ that respectively define a width ($W_{36}$, $W_{44}$) of each of the first midsole portion 36 and the second midsole portion 44. The width ($W_{36}$, $W_{44}$) of each of the first midsole portion 36 and the second midsole portion 44 correspondingly varies and defines, for example, the widths ($W_{16}$, $W_{18}$, $W_{20}$) of the forefoot region 16, the midfoot region 18 and the heel region 20 of the sole structure 14 of the article of footwear 10.

Figure 6:
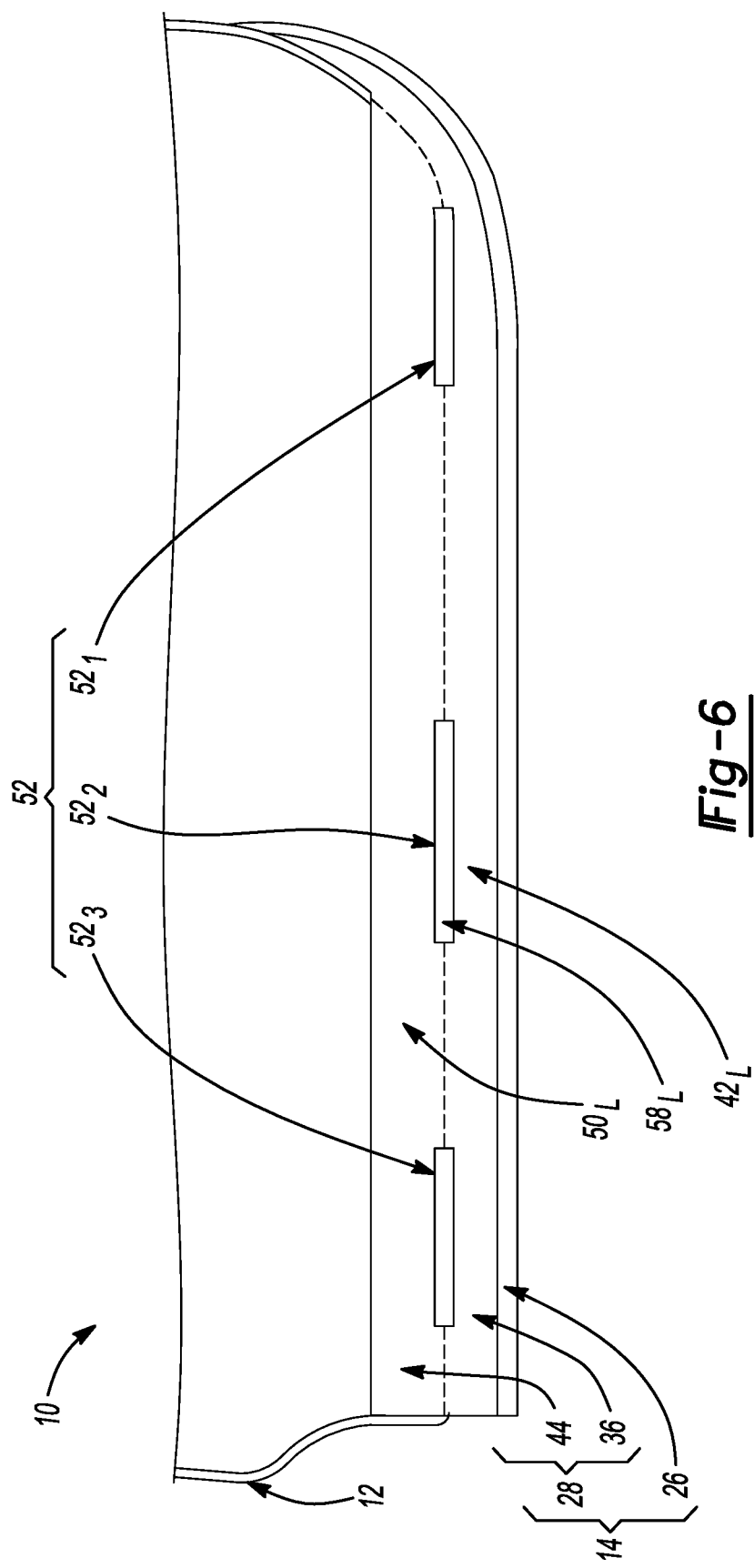
FIG. 6 is an exemplary partial side view of the article of footwear according to arrow 6 of any of FIG. 3, 4 or 5.

With reference to FIG. 2 and FIGS. 6, 7, 8 and 9, the width ($W_{52-1}$), ($W_{52-2}$), ($W_{52-3}$) extending between the medial sidewall surface portion $58_M$ and the lateral sidewall surface portion $58_L$ of each strip of material $52_1$-$52_3$ of the one or more strips of material 52 may be selectively sized with respect to the width ($W_{36}$, $W_{44}$) of each of the first midsole portion 36 and the second midsole portion 44. As shown in FIGS. 2, 3 and 6, the width ($W_{52-1}$), ($W_{52-2}$), ($W_{52-3}$) of each strip of material $52_1$-$52_3$ of the one or more strips of material 52 is selectively sized such that each of the medial sidewall surface portion $58_M$ and the lateral sidewall surface portion $58_L$ of each strip of material $52_1$-$52_3$ of the one or more strips of material 52 is respectively aligned with the medial sidewall surface portion $42_M$, $50_M$ and the lateral sidewall surface portion $42_L$, $50_L$ of each of the first midsole portion 36 and the second midsole portion 44. As a result of the alignment of the respective medial sidewall surface portions $42_M$, $50_M$, $58_M$ and the lateral sidewall surface portions $42_L$, $50_L$, $58_L$ described above, the medial sidewall surface portion $58_M$ or the lateral sidewall surface portion $58_L$ of each strip of material $52_1$-$52_3$ of the one or more strips of material 52 is visible when viewing the medial side 22 or the lateral side 24 the of the sole structure 14.

Figure 7:
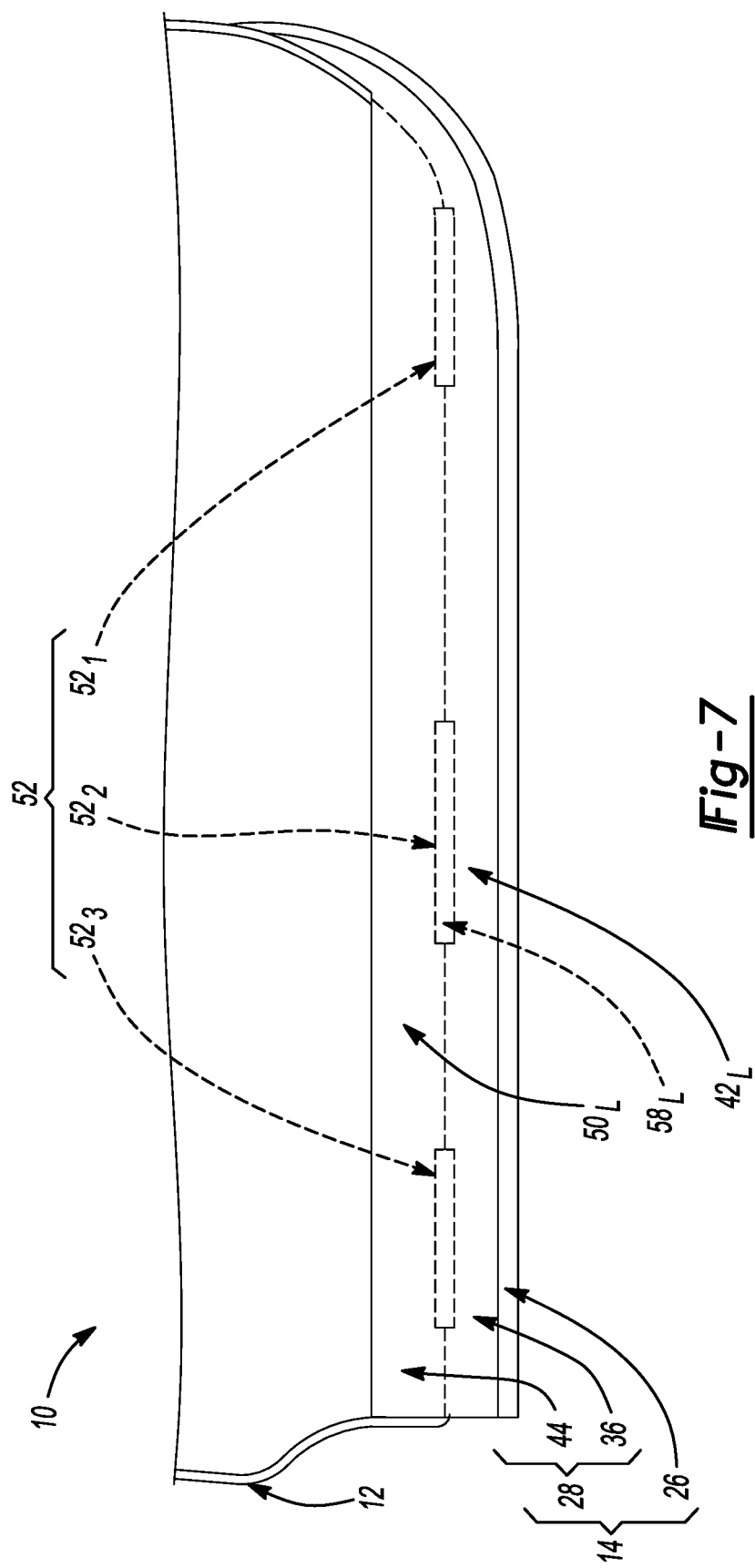
FIG. 7 is an exemplary alternative partial side view of the article of footwear according to arrow 6 of any of FIG. 3, 4 or 5.

In another example as shown in FIG. 7, the width ($W_{52-1}$), ($W_{52-2}$), ($W_{52-3}$) of each strip of material $52_1$-$52_3$ of the one or more strips of material 52 is selectively sized such that each of the medial sidewall surface portion $58_M$ and the lateral sidewall surface portion $58_L$ of each strip of material $52_1$-$52_3$ of the one or more strips of material 52 is not aligned with and does extend beyond the medial sidewall surface portion $42_M$, $50_M$ and the lateral sidewall surface portion $42_L$, $50_L$ of each of the first midsole portion 36 and the second midsole portion 44. As a result of the non-alignment of the respective medial sidewall surface portions $42_M$, $50_M$, $58_M$ and the lateral sidewall surface portions $42_L$, $50_L$, $58_L$ described above, the medial sidewall surface portion $58_M$ or the lateral sidewall surface portion $58_L$ of each strip of material $52_1$-$52_3$ of the one or more strips of material 52 is not visible when viewing the medial side 22 or the lateral side 24 the of the sole structure 14.

Figure 8:
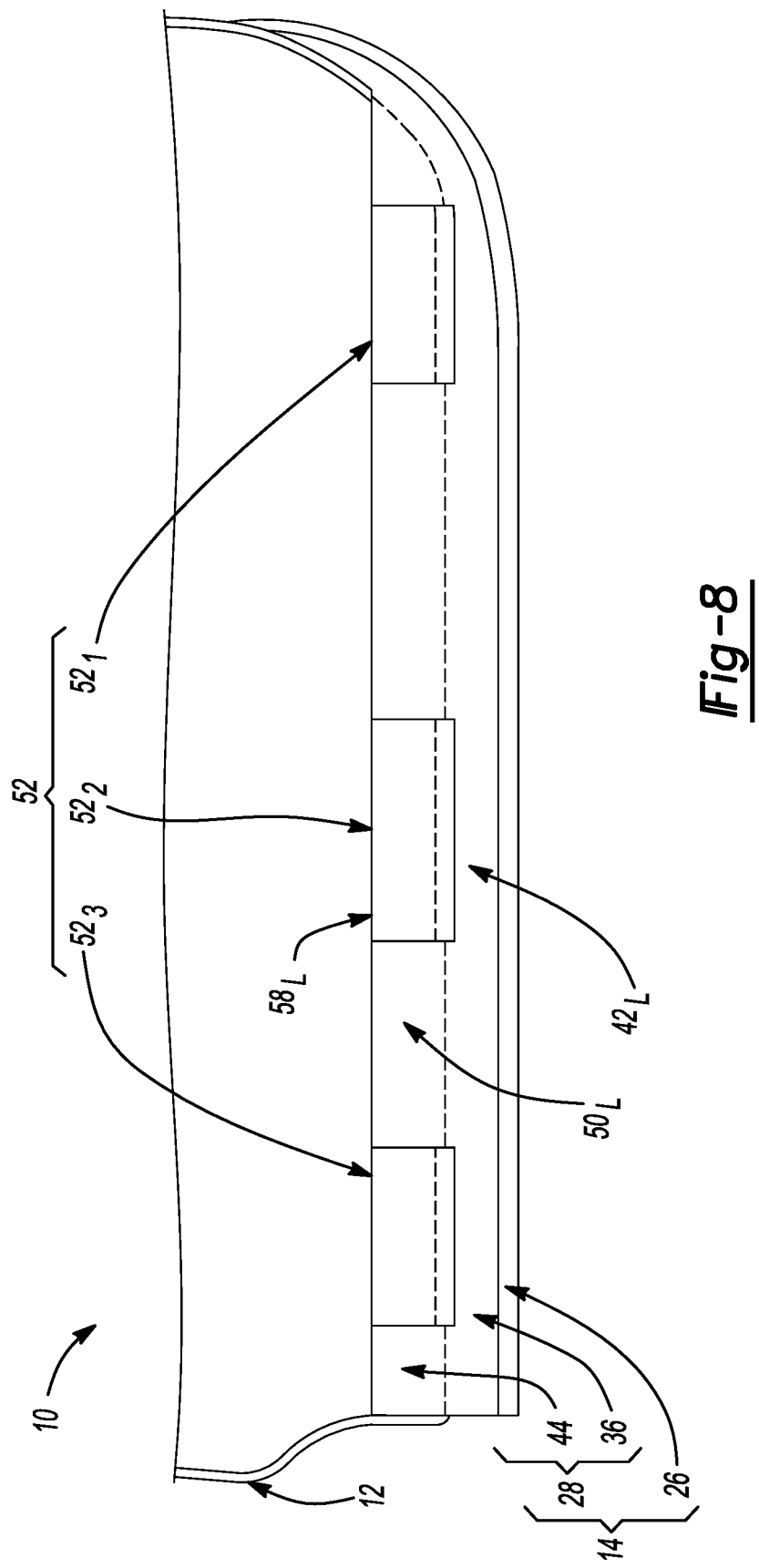
FIG. 8 is another exemplary alternative partial side view of the article of footwear according to arrow 6 of any of FIG. 3, 4 or 5.

In yet another example as shown in FIG. 8, the width ($W_{52-1}$), ($W_{52-2}$), ($W_{52-3}$) of each strip of material $52_1$-$52_3$ of the one or more strips of material 52 is selectively sized such that each of the medial sidewall surface portion $58_M$ and the lateral sidewall surface portion $58_L$ of each strip of material $52_1$-$52_3$ of the one or more strips of material 52 extends beyond the medial sidewall surface portion $42_M$, $50_M$ and the lateral sidewall surface portion $42_L$, $50_L$ of each of the first midsole portion 36 and the second midsole portion 44. Therefore, a first portion ($W_{52-P1}$) of each width ($W_{52-1}$), ($W_{52-2}$), ($W_{52-3}$) of each strip of material $52_1$-$52_3$ of the one or more strips of material 52 extending from of the medial sidewall surface portion $58_M$ of each strip of material $52_1$-$52_3$ of the one or more strips of material 52 and a second portion (not shown) of each width ($W_{52-1}$), ($W_{52-2}$), ($W_{52-3}$) of each strip of material $52_1$-$52_3$ of the one or more strips of material 52 extending from of the lateral sidewall surface portion $58_L$ of each strip of material $52_1$-$52_3$ of the one or more strips of material 52 may respectively extend along and be arranged adjacent, for example, the medial sidewall surface portion $42_M$, $50_M$ and the lateral sidewall surface portion $42_L$, $50_L$ of each of the first midsole portion 36 and the second midsole portion 44. However, as shown in FIG. 8, the first portion ($W_{52-P1}$) of each width ($W_{52-1}$), ($W_{52-2}$), ($W_{52-3}$) of each strip of material $52_1$-$52_3$ of the one or more strips of material 52 and the second portion (not shown) of each width ($W_{52-1}$), ($W_{52-2}$), ($W_{52-3}$) of each strip of material $52_1$-$52_3$ of the one or more strips of material 52 do not respectively extend along and are not respectively arranged adjacent the upper 12 of the article of footwear 10. As a result, the first portion ($W_{52-P1}$) of each width ($W_{52-1}$), ($W_{52-2}$), ($W_{52-3}$) of each strip of material $52_1$-$52_3$ of the one or more strips of material 52 and the second portion (not shown) of each width ($W_{52-1}$), ($W_{52-2}$), ($W_{52-3}$) of each strip of material $52_1$-$52_3$ of the one or more strips of material 52 is visible when viewing the medial side 22 or the lateral side 24 the of the sole structure 14.

Figure 9:
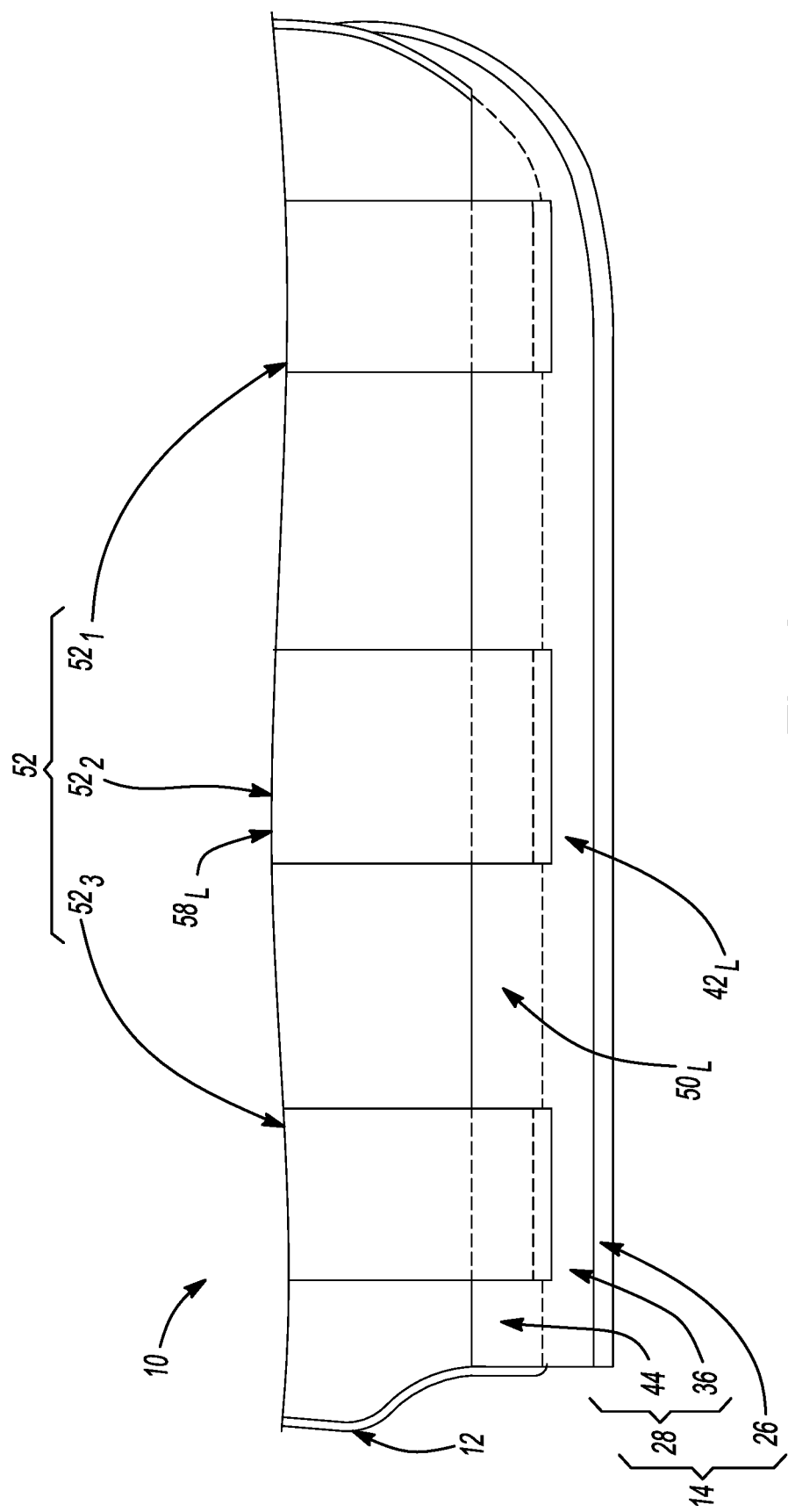
FIG. 9 is yet another exemplary alternative partial side view of the article of footwear according to arrow 6 of any of FIG. 3, 4 or 5.

In another example as shown in FIG. 9, the width ($W_{52-1}$), ($W_{52-2}$), ($W_{52-3}$) of each strip of material $52_1$-$52_3$ of the one or more strips of material 52 is selectively sized such that each of the medial sidewall surface portion $58_M$ and the lateral sidewall surface portion $58_L$ of each strip of material $52_1$-$52_3$ of the one or more strips of material 52 extends beyond the medial sidewall surface portion $42_M$, $50_M$ and the lateral sidewall surface portion $42_L$, $50_L$ of each of the first midsole portion 36 and the second midsole portion 44. Therefore, a first portion ($W_{52-P1}$) of each width ($W_{52-1}$), ($W_{52-2}$), ($W_{52-3}$) of each strip of material $52_1$-$52_3$ of the one or more strips of material 52 extending from of the medial sidewall surface portion $58_M$ of each strip of material $52_1$-$52_3$ of the one or more strips of material 52 and a second portion (not shown) of each width ($W_{52-1}$), ($W_{52-2}$), ($W_{52-3}$) of each strip of material $52_1$-$52_3$ of the one or more strips of material 52 extending from of the lateral sidewall surface portion $58_L$ of each strip of material $52_1$-$52_3$ of the one or more strips of material 52 may respectively extend along and be arranged adjacent, for example: (1) the medial sidewall surface portion $42_M$, $50_M$ and the lateral sidewall surface portion $42_L$, $50_L$ of each of the first midsole portion 36 and the second midsole portion 44 and (2) at least a portion of, respectively, the medial side and the lateral side of the upper 12. As a result, the first portion ($W_{52-P1}$) of each width ($W_{52-1}$), ($W_{52-2}$), ($W_{52-3}$) of each strip of material $52_1$-$52_3$ of the one or more strips of material 52 and the second portion (not shown) of each width ($W_{52-1}$), ($W_{52-2}$), ($W_{52-3}$) of each strip of material $52_1$-$52_3$ of the one or more strips of material 52 is visible when viewing the medial side 22 or the lateral side 24 the of the sole structure 14.

With reference to FIGS. 4 and 5, one or more regions of at least one strip $52_1$-$52_3$ (see, e.g., all of the strips $52_1$-$52_3$ in FIG. 4 or one strip $52_2$ in FIG. 5) of the one or more strips of material 52 may further define at least one passage or aperture 68 or absence of at least one strip $52_1$-$52_3$ of the one or more strips of material 52. The at least one passage 68 extends through the thickness ($T_{52}$) of the at least one strip $52_1$-$52_3$ of the one or more strips of material 52 between the top surface 54 and the bottom surface 56. If a polymeric material defines one or both of the first midsole portion 36 and the second midsole portion 44, the polymeric material may be molded around any surface defining the at least one strip $52_1$-$52_3$ of the one or more strips of material 52 and/or through at least one passage 68 extends through the thickness ($T_{52}$) of the at least one strip $52_1$-$52_3$ of the one or more strips of material 52.

The at least one passage 68 may include a plurality of passages or apertures $68_1$-$68_n$. For example, the at least one passage 68 may include a first passage $68_1$, a last passage $68_n$ and one or more intermediate passages $68_2$-$68_{n-1}$. In an example, as shown in FIG. 4, the plurality of passages $68_1$-$68_n$ may be arranged in any desirable pattern (e.g., in: (1) a row-and-column grid, (2) staggered rows and columns, or (3) a random pattern) such that the plurality of passages or apertures $68_1$-$68_n$ are arranged between the forefoot region 16 and the heel region 20 of the sole structure 14 (i.e., across substantially most or all of the length ($L_{14}$) of the sole structure 14) and between the medial side 22 and the lateral side 24 of the article of footwear 10 (i.e., across the width ($W_{14}$) of the sole structure 14). In other implementations, the plurality of passages $68_1$-$68_n$ may be arranged in a pattern (e.g., in: (1) a row-and-column grid, (2) staggered rows and columns, or (3) a random pattern) that does not extend across the forefoot region 16 and the heel region 20 of the sole structure 14 or between the medial side 22 and the lateral side 24 of the article of footwear 10. Although the plurality of passages $68_1$-$68_n$ may extend across substantially most or all of the length ($L_{14}$) of the sole structure 14 as described above, the plurality of passages $68_1$-$68_n$ may be arranged in a pattern (e.g., in: (1) a row-and-column grid, (2) staggered rows and columns, or (3) a random pattern) extending across: (1) some or all of the heel region 20 of the sole structure 14 but not the forefoot region 16 or the midfoot region 18 of the sole structure 14, (2) some or all of the forefoot region 16 of the sole structure 14 but not the midfoot region 18 or the heel region 20 of the sole structure 14 (3) some or all of the forefoot region 16 and the heel region 20 of the sole structure 14 but not the midfoot region 18 of the sole structure 14 or (4) as shown in FIG. 5, some or all of the midfoot region 18 but not the forefoot region 16 and the heel region 20.

With continued reference to FIGS. 4 and 5, each passage of the plurality of passages $68_1$-$68_n$ is shown being defined by a substantially circular or oval shape having any dimension or diameter ($D_{68}$). In some examples, the dimension or diameter ($D_{68}$) may be approximately equal to about 0.5 mm or about 3.0 mm. In other examples, the dimension or diameter ($D_{68}$) may be between approximately 0.5 mm and approximately 3.0 mm. Furthermore, each passage of the plurality of passages $68_1$-$68_n$ defines a substantially similar dimension or diameter ($D_{68}$). Although each passage of the plurality of passages $68_1$-$68_n$ may define a substantially similar sized or shaped dimension or diameter ($D_{68}$), implementations of the at least one strip $52_1$-$52_3$ of the one or more strips of material 52 may include at least one passage of the plurality of passages $68_1$-$68_n$ having a different sized or shaped dimension or diameter ($D_{68}$). For example, at least one passage of the plurality of passages $68_1$-$68_n$ may have a different sized or shaped dimension or diameter ($D_{68}$) than another passage of the plurality of passages $68_1$-$68_n$ in the heel region 20 of the sole structure 14, the forefoot region 16 of the sole structure 14, the midfoot region 18 of the sole structure 14 or the forefoot region 16 and the heel region 20 of the sole structure 14.

With reference to FIG. 2, the top surface 38 of the first midsole portion 36 may further define at least one second midsole contacting region 70 and at least one strip of material contacting region 72. The bottom surface 48 of the second midsole portion 44 may further define at least one first midsole contacting region 74 and at least one strip of material contacting region 76.

Each of the at least one second midsole contacting region 70 of the first midsole portion 36 and the at least one first midsole contacting region 74 of the second midsole portion 44 may define a size or shape that generally corresponds to a size or shape of the at least one passage 68 of the at least one strip $52_1$-$52_3$ of the one or more strips of material 52. If the at least one passage 68 of the at least one strip $52_1$-$52_3$ of the one or more strips of material 52 defines a plurality of passages $68_1$-$68_n$, each of the at least one second midsole contacting region 70 of the first midsole portion 36 and the at least one first midsole contacting region 74 of the second midsole portion 44 may define a corresponding plurality of second midsole contacting regions $70_1$-$70_n$, and a plurality of first midsole contacting regions $74_1$-$74_n$. Furthermore, each passage and contacting region of the plurality of passages $68_1$-$68_n$ may be respectively axially aligned with one of the plurality of second midsole contacting regions $70_1$-$70_n$ and one of the plurality of first midsole contacting regions $74_1$-$74_n$.

In an example, when the article of footwear 10 is formed, surfaces of the outsole 26, the first midsole portion 36, the second midsole portion 44 and each strip of material $52_1$-$52_3$ of the one or more strips of material 52 may be arranged near, proximate, spaced-apart-from or adjacent one another. For example, the at least one strip of material contacting region 72 of the top surface 38 of the first midsole portion 36 may be disposed adjacent the bottom surface 56 of each strip of material $52_1$-$52_3$ of the one or more strips of material 52, and the at least one strip of material contacting region 76 of the bottom surface 48 of the second midsole portion 44 may be disposed adjacent the top surface 54 of each strip of material $52_1$-$52_3$ of the one or more strips of material 52.

Once each strip of material $52_1$-$52_3$ of the one or more strips of material 52 is arranged relative to the first midsole portion 36 and the second midsole portion 44, as described above, each strip of material $52_1$-$52_3$ of the one or more strips of material 52 may be said to be arranged between the first midsole portion 36 and the second midsole portion 44. Even though each strip of material $52_1$-$52_3$ of the one or more strips of material 52 may be disposed between the first midsole portion 36 and the second midsole portion 44, one or more portions of the first midsole portion 36 may be in direct contact with one or more portions of the second midsole portion 44 as a result of, for example, one or a combination of (1) a longitudinal spacing between each strip of material $52_1$-$52_3$ of the one or more strips of material 52 and (2) the formation of the at least one passage 68 of at least one strip $52_1$-$52_3$ of the one or more strips of material 52 such that: (A) portions of the top surface 38 of the first midsole portion 36 and the bottom surface 48 of the second midsole portion 44 that are not separated by the one or more strips of material 52 may contact one another and (B) at least one second midsole contacting region 70 of the top surface 38 of the first midsole portion 36 may be disposed adjacent the at least one first midsole contacting region 74 of the bottom surface 48 of the second midsole portion 44. After arranging the first midsole portion 36 adjacent the second midsole portion 44 as described above with respect to each strip of material $52_1$-$52_3$ of the one or more strips of material 52, the midsole 28 defined by the first midsole portion 36, the second midsole portion 44 and each strip of material $52_1$-$52_3$ of the one or more strips of material 52 may be arranged in a mold tool 92 (see, e.g., FIGS. 10-11) for directly bonding the first midsole portion 36 to the second midsole portion 44.

The mold tool 92 includes an upper mold half $92_U$ and a lower mold half $92_L$. Each of the upper mold half $92_U$ and the lower mold half $92_L$ may define a mold surface for bonding the first midsole portion 36 to the second midsole portion 44 under heat and pressure.

Figure 10:
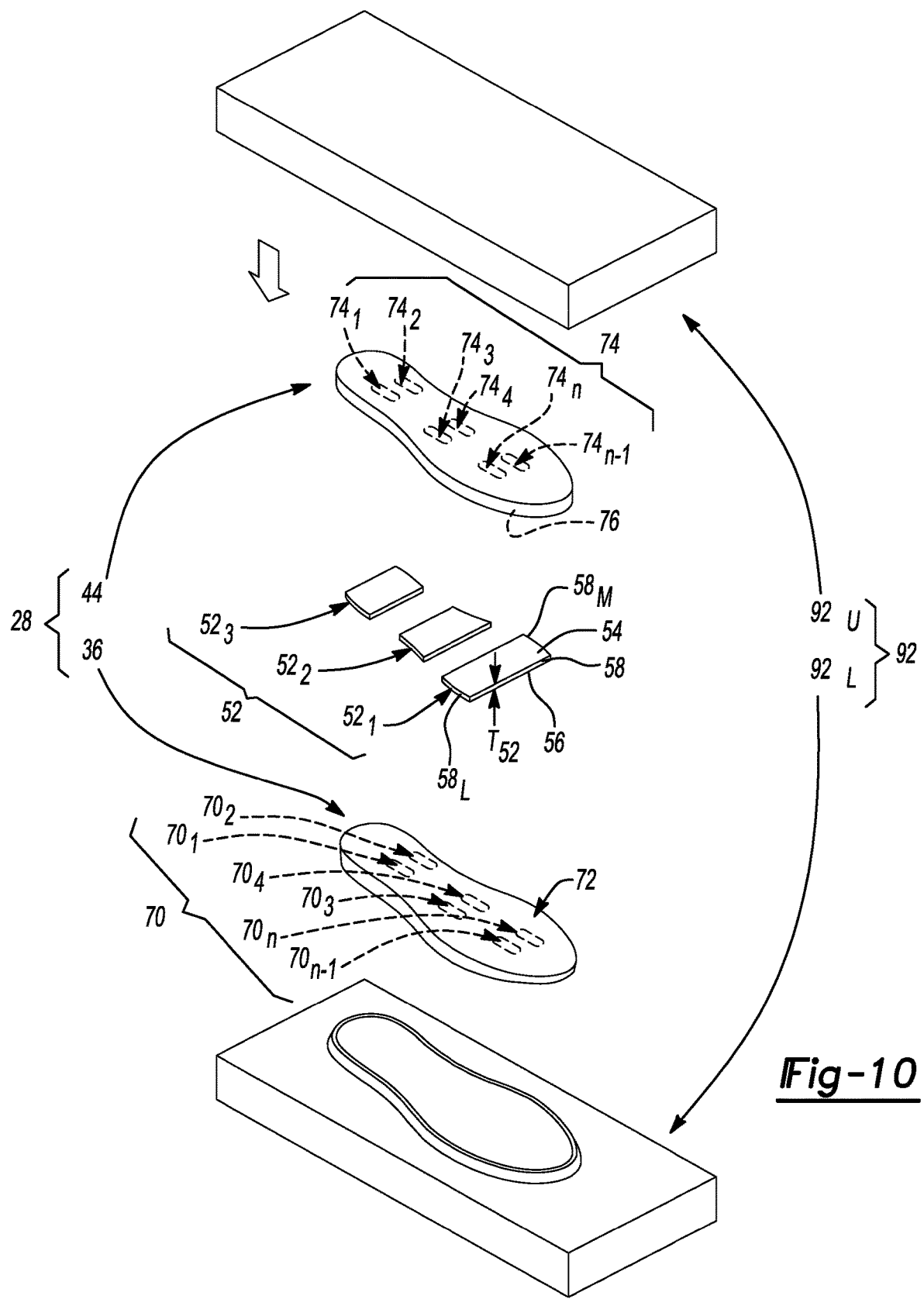
FIG. 10 is a perspective view of an exemplary mold tool and the portion of the article of footwear corresponding to FIG. 2.

As shown in FIG. 10, the mold tool 92 is arranged in an open configuration by spacing apart the upper mold half $92_U$ and the lower mold half $92_L$ such that the first midsole portion 36, the second midsole portion 44 and each strip of material $52_1$-$52_3$ of the one or more strips of material 52 are arranged therebetween. Then, as shown in FIG. 11, after arranging the mold tool 92 in a closed configuration for a period of time, the mold tool 92 may be returned to the open configuration with the first midsole portion 36 bonded to the second midsole portion 44 and each strip of material $52_1$-$52_3$ of the one or more strips of material 52 secured therebetween.

Thereafter, the midsole-contacting surface 30 of the outsole 26 may be disposed adjacent the bottom surface 40 of the first midsole portion 36 for joining the outsole 26 to the first midsole portion 36. In an example, the outsole 26 may be joined to the first midsole portion 36 with an adhesive or by way of a molding tool in a substantially similar manner as described above.

With reference to FIG. 8 or 9, if the width ($W_{52-1}$), ($W_{52-2}$), ($W_{52-3}$) of each strip of material $52_1$-$52_3$ of the one or more strips of material 52 is selectively sized such that each of the medial sidewall surface portion $58_M$ and the lateral sidewall surface portion $58_L$ of each strip of material $52_1$-$52_3$ of the one or more strips of material 52 extends beyond the medial sidewall surface portion $42_M$, $50_M$ and the lateral sidewall surface portion $42_L$, $50_L$ of each of the first midsole portion 36 and the second midsole portion 44, the first portion ($W_{52-P1}$) of each width ($W_{52-1}$), ($W_{52-2}$), ($W_{52-3}$) of each strip of material $52_1$-$52_3$ of the one or more strips of material 52 and the second portion (not shown) of each width ($W_{52-1}$), ($W_{52-2}$), ($W_{52-3}$) of each strip of material $52_1$-$52_3$ of the one or more strips of material 52 may be respectively folded or extended upwardly adjacent or along, for example: as shown in FIGS. 8 and 9 (1) the medial sidewall surface portion $42_M$, $50_M$ and the lateral sidewall surface portion $42_L$, $50_L$ of each of the first midsole portion 36 and the second midsole portion 44 and, in an alternative embodiment as shown in FIG. 9 but not in FIG. 8 (2) at least a portion of, respectively, the medial side and the lateral side of the upper 12.

Although the mold tool 92 may be utilized for joining the first midsole portion 36 to the second midsole portion 44 under heat and pressure, in some configurations, an optional adhesive (not shown) may also or alternatively be utilized for adhering the first midsole portion 36 to the second midsole portion 44. In some instances, the optional adhesive may be provided in the form of a sheet. In other examples, the optional adhesive may conform to any desirable shape, pattern or configuration, such as, for example, the shape, pattern or configuration of the of the at least one passage 68 of the at least one strip $52_1$-$52_3$ of the one or more strips of material 52.

In an example, a first optional adhesive may be arranged between the first midsole portion 36 and the second midsole portion 44; furthermore, the first optional adhesive may be arranged between the top surface 38 of the first midsole portion 36 and the bottom surface 56 of each strip of material $52_1$-$52_3$ of the one or more strips of material 52 such that the first optional adhesive is axially aligned with and radially extends across at least a portion of the shape, pattern or configuration of the of the at least one passage 68 of the at least one strip $52_1$-$52_3$ of the one or more strips of material 52. The first optional adhesive adhesively bonds the first midsole portion 36, the second midsole portion 44 and each strip of material $52_1$-$52_3$ of the one or more strips of material 52 together.

In another example, a second optional adhesive may be arranged between the first midsole portion 36 and the second midsole portion 44; furthermore, the second optional adhesive may be arranged between the top surface 54 of each strip of material $52_1$-$52_3$ of the one or more strips of material 52 and the bottom surface 48 of the second midsole portion 44 such that the second optional adhesive is axially aligned with and radially extends across at least a portion of the shape, pattern or configuration of the of the at least one passage 68 of the at least one strip $52_1$-$52_3$ of the one or more strips of material 52. The second optional adhesive adhesively bonds the first midsole portion 36, the second midsole portion 44 and each strip of material $52_1$-$52_3$ of the one or more strips of material 52 together.

In yet another example, the first optional adhesive and the second optional adhesive may be arranged between the first midsole portion 36 and the second midsole portion 44. The first optional adhesive may be arranged between the top surface 38 of the first midsole portion 36 and the bottom surface 56 of each strip of material $52_1$-$52_3$ of the one or more strips of material 52 such that the first optional adhesive is axially aligned with and radially extends across at least a portion of the shape, pattern or configuration of the of the at least one passage 68 of the at least one strip $52_1$-$52_3$ of the one or more strips of material 52. The second optional adhesive may be arranged between the top surface 54 of each strip of material $52_1$-$52_3$ of the one or more strips of material 52 and the bottom surface 48 of the second midsole portion 44 such that the second optional adhesive is axially aligned with and radially extends across at least a portion of the shape, pattern or configuration of the of the at least one passage 68 of the at least one strip $52_1$-$52_3$ of the one or more strips of material 52. The first optional adhesive and the second optional adhesive adhesively bonds the first midsole portion 36, the second midsole portion 44 and each strip of material $52_1$-$52_3$ of the one or more strips of material 52 together.

Figure 12:
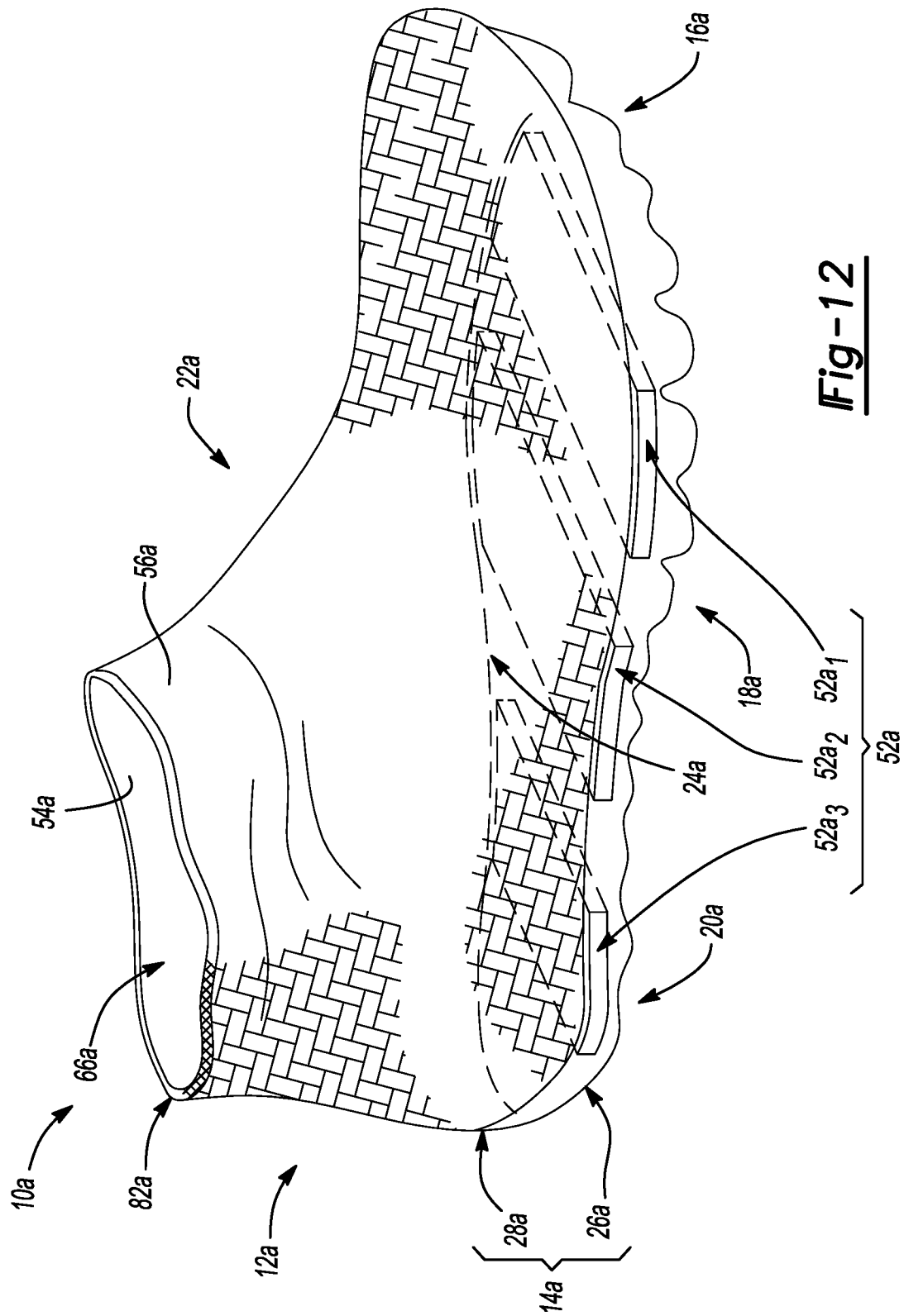
FIG. 12 is a perspective view of an article of footwear incorporating a sole structure in accordance with the principles of the present disclosure.

With reference to FIG. 12, an exemplary article of footwear 10a is provided and includes an upper 12a and a sole structure 14a attached to the upper 12a. The article of footwear 10a may be divided into one or more regions. The regions may include a forefoot region 16a, a midfoot region 18a, and a heel region 20a. The forefoot region 16a may correspond with toes and joints connecting metatarsal bones with phalanx bones of a foot. The midfoot region 18a may correspond with an arch area of the foot while the heel region 18a may correspond with rear portions of the foot, including a calcaneus bone. The article of footwear 10a may additionally include a medial side 22a and a lateral side 24a that correspond with opposite sides of the article of footwear 10a and extend through the regions 16a, 18a, 20a.

Figure 13:
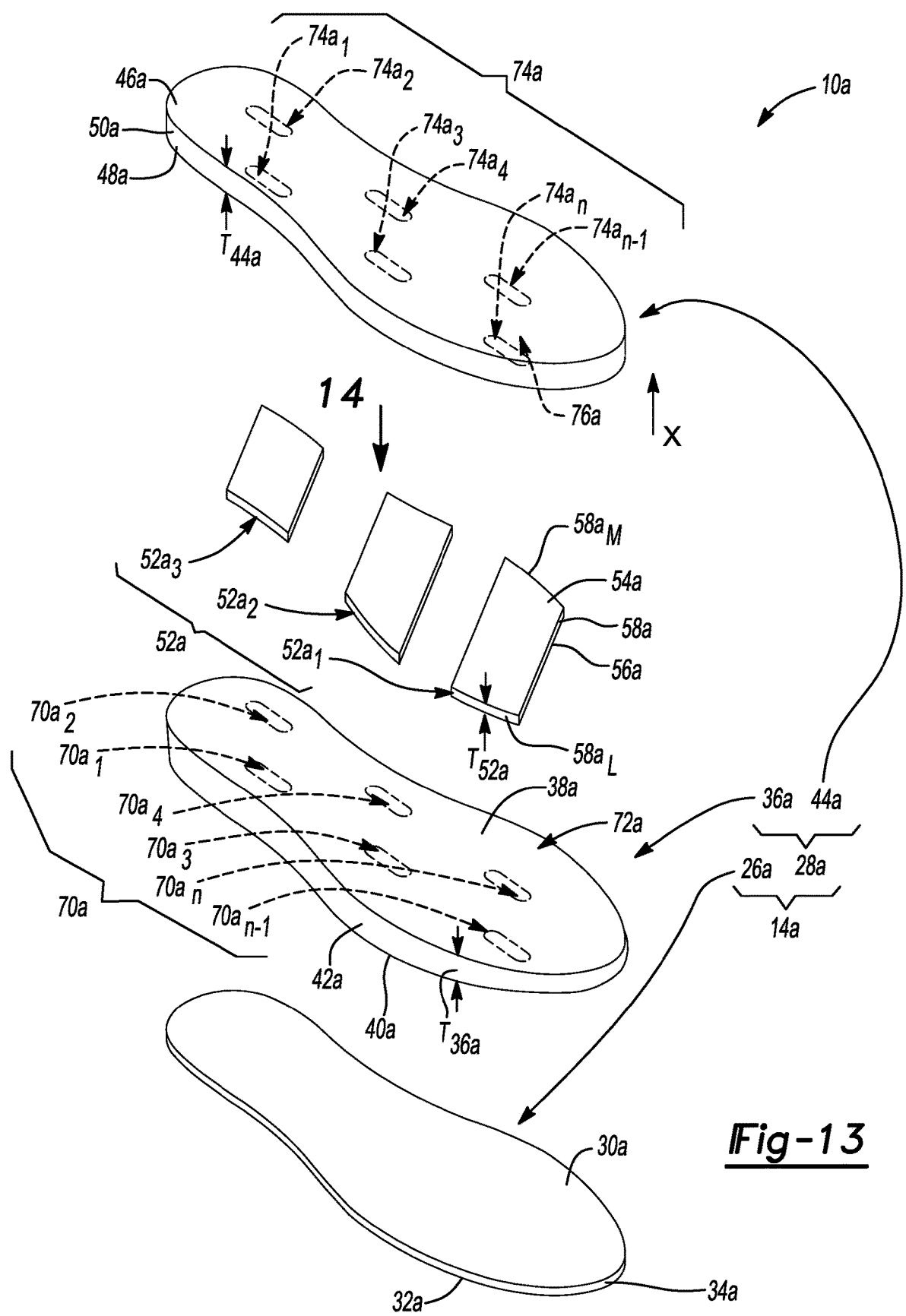
FIG. 13 is a perspective exploded view of a portion of the article of footwear of FIG. 12.

The sole structure 14a optionally includes an outsole 26a. With reference to FIGS. 12 and 13, the sole structure 14a may include a midsole 28a. A cushioning arrangement (not shown) may optionally be disposed generally between the outsole 26a and the midsole 28a.

Referring to FIG. 13, the outsole 26a includes a midsole-contacting surface 30a and a ground-contacting surface 32a. The outsole 26a further includes a sidewall surface 34a extending between the midsole-contacting surface $30a$ and the ground-contacting surface $32a$.

As also shown in, for example, FIG. 13, the midsole $28a$ includes a first midsole portion $36a$ and a second midsole portion $44a$. The first midsole portion $36a$ includes a top surface $38a$, a bottom surface $40a$ and a sidewall surface $42a$ extending between the top surface $38a$ and the bottom surface $40a$. The sidewall surface $42a$ may define a thickness ($T_{36a}$) of the first midsole portion $36a$ extending between the top surface $38a$ and the bottom surface $40a$.

The top surface $38a$ and the bottom surface $40a$ of the first midsole portion $36a$ may generally define an outer surface profile of the first midsole portion $36a$. In an example, each of the top surface $38a$ and the bottom surface $40a$ of the first midsole portion $36a$ may be substantially flat (e.g., planar). In this regard, each of the top surface $38a$ and the bottom surface $40a$ may not be interrupted with one or more recesses, trenches, valleys, or other similar features. Furthermore, in an example, the top surface $38a$ of the first midsole portion $36a$ may be substantially parallel to the bottom surface $40a$ of the first midsole portion $36a$ such that the thickness ($T_{36a}$) of the first midsole portion $36a$ is substantially the same across a length ($L_{14a}$) of the sole structure $14a$ as shown in, for example, FIG. 22.

With continued reference to FIG. 13, the second midsole portion $44a$ includes a top surface $46a$, a bottom surface $48a$ and a sidewall surface $50a$ extending between the top surface $46a$ and the bottom surface $48a$. The sidewall surface $50a$ may define a thickness ($T_{44a}$) of the second midsole portion $44a$ extending between the top surface $46a$ and the bottom surface $48a$.

The top surface $46a$ and the bottom surface $48a$ of the second midsole portion $44a$ may generally define an outer surface profile of the second midsole portion $44a$. In an example, each of the top surface $46a$ and the bottom surface $48a$ of the second midsole portion $44a$ may be substantially flat (e.g., planar). In this regard, each of the top surface $46a$ and the bottom surface $48a$ may not be interrupted with one or more recesses, trenches, valleys, or other similar features. Furthermore, in an example, the top surface $46a$ of the second midsole portion $44a$ may be substantially parallel to the bottom surface $48a$ of the second midsole portion $44a$ such that the thickness ($T_{44a}$) of the second midsole portion $44a$ is substantially the same across the length ($L_{14a}$) of the sole structure $14a$ as shown in, for example, FIG. 22.

In some examples, at least one of the first midsole portion $36a$ and the second midsole portion $44a$ are formed from a foamed material. In some instances, one or both of the first midsole portion $36a$ and the second midsole portion $44a$ are formed from a polymeric material. In some examples, the first midsole portion $36a$ and the second midsole portion $44a$ are formed from the same material. In another example, the first midsole portion $36a$ and the second midsole portion $44a$ are formed from different materials. The first midsole portion $36a$ may be formed from a first material and the second midsole portion $44a$ may be formed from a second material. The first material forming the first midsole portion $36a$ may have substantially the same stiffness as the second material forming the second midsole portion $44a$. In some instances, the first material forming the first midsole portion $36a$ has a different stiffness than the second material forming the second midsole portion $44a$. In other examples, the first material forming the first midsole portion $36a$ is the same as the second material forming the second midsole portion $44a$. In yet another example, the first material forming the first midsole portion $36a$ is different than the second material forming the second midsole portion $44a$.

Figure 14:
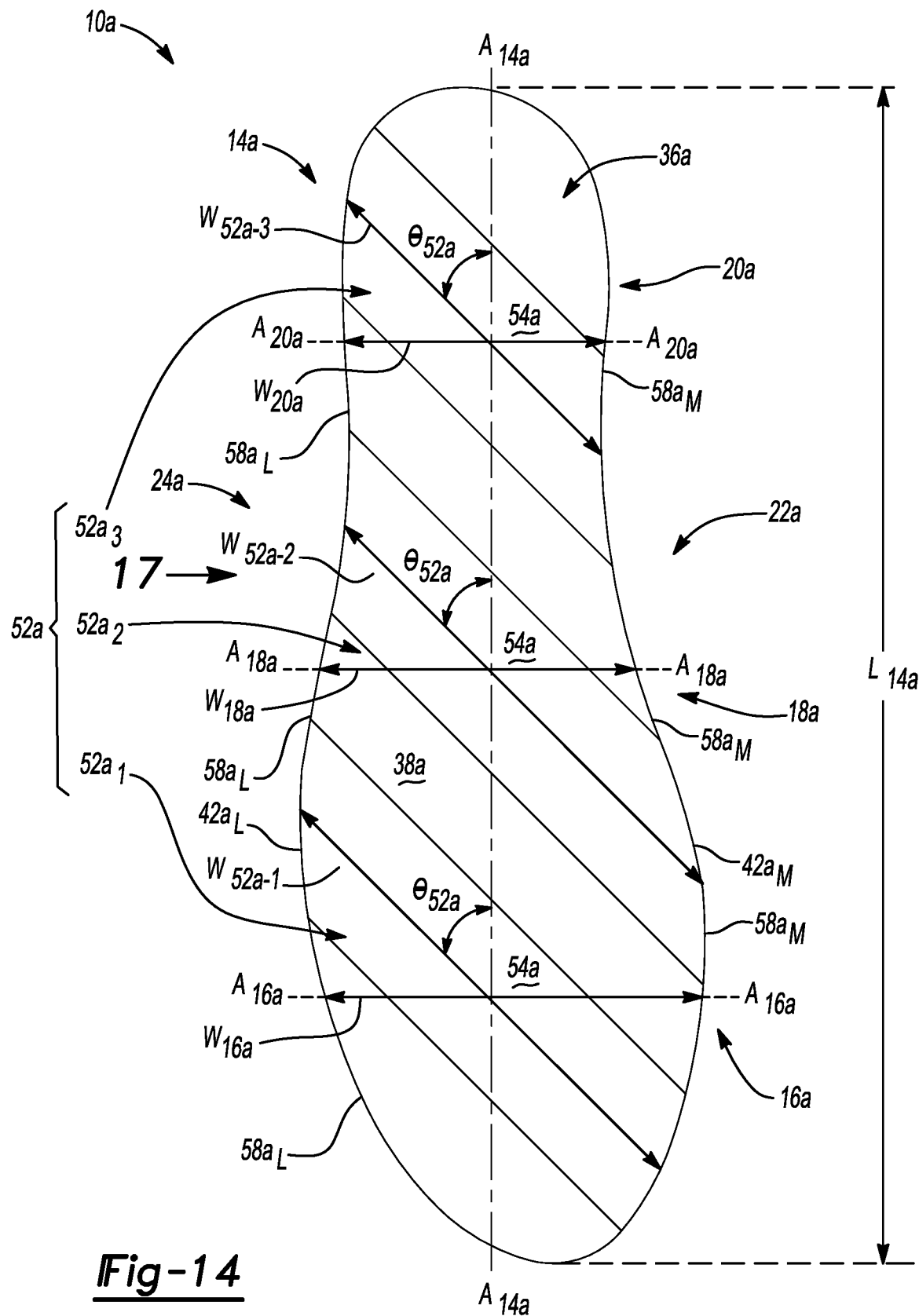
FIG. 14 is an exemplary top view of the article of footwear according to arrow 14 of FIG. 13.

As shown in FIGS. 13-14, the article of footwear $10a$ further includes one or more strips of material $52a$. In an example, the one or more strips of material $52a$ may include three strips of material $52a_1$-$52a_3$.

Figure 15:
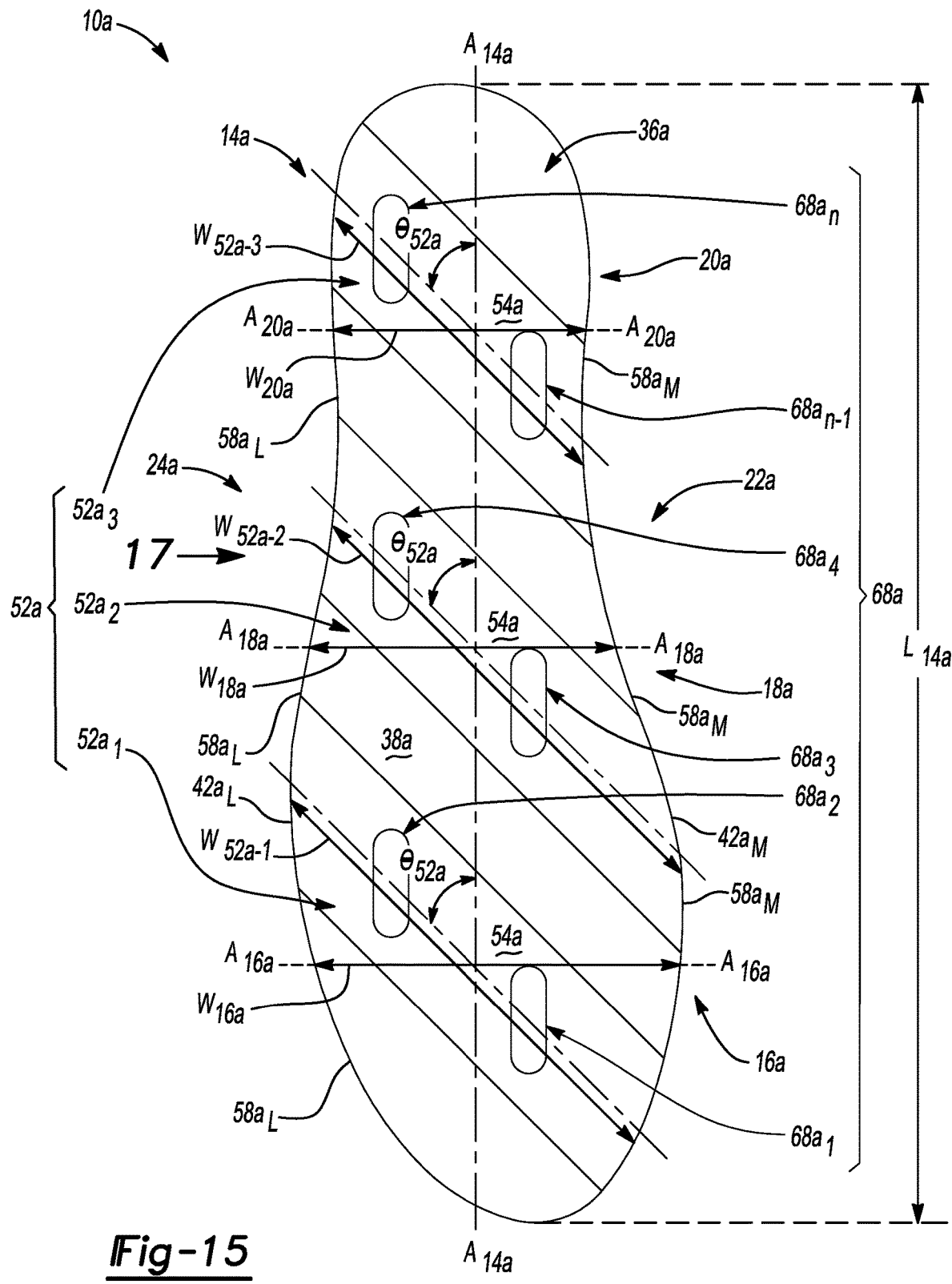
FIG. 15 is an exemplary alternative top view of the article of footwear according to arrow 14 of FIG. 13.
Figure 16:
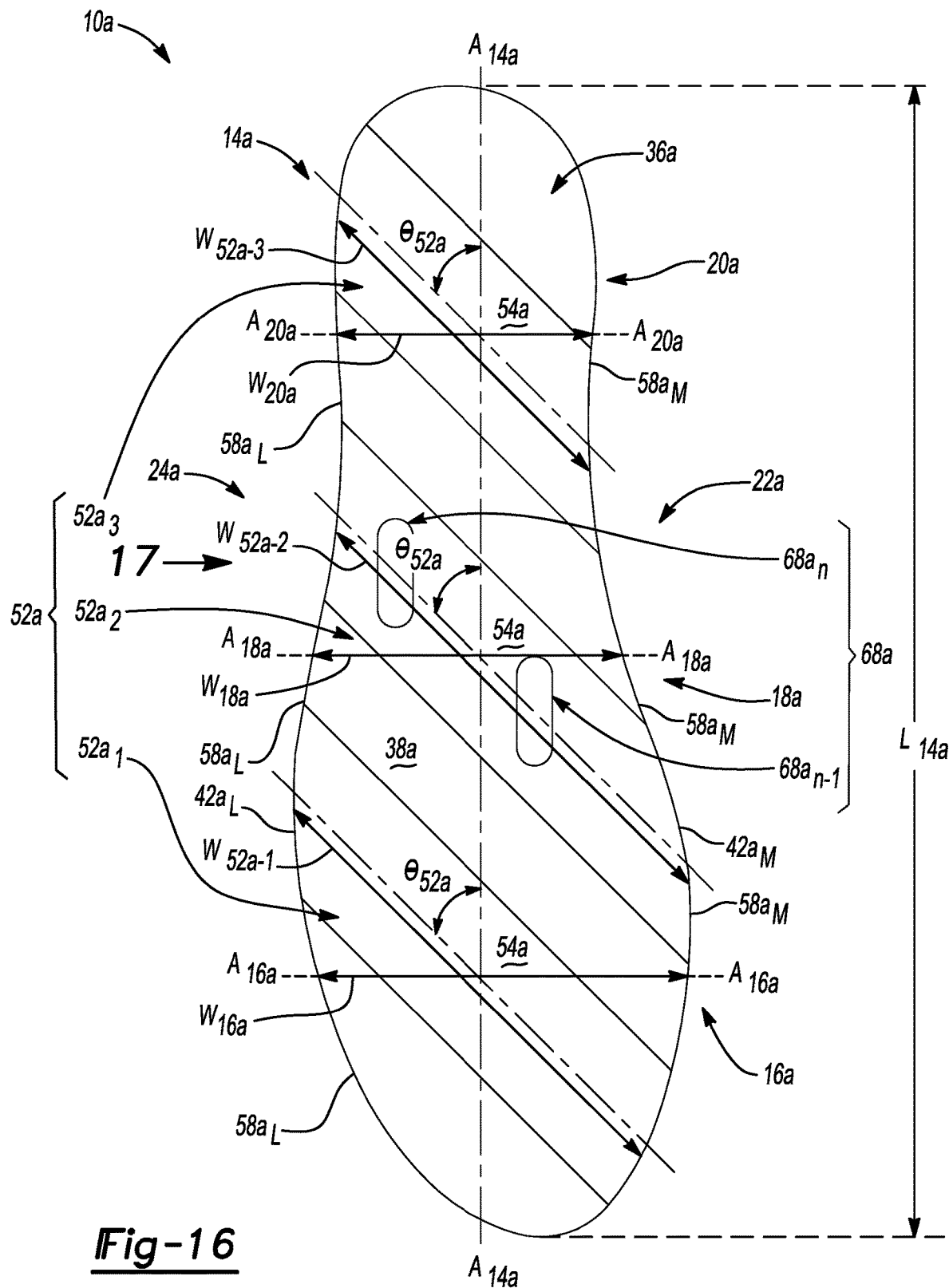
FIG. 16 is another exemplary alternative top view of the article of footwear according to arrow 14 of FIG. 13.

With reference to FIGS. 14, 15 and 16, if the one or more strips of material $52a$ includes, for example, three strips of material $52a_1$-$52a_3$, in some instances the one or more strips of material $52a$ may be arranged as follows: (1) a width ($W_{52a-1}$) of a first strip of material $52a_1$ extends across a width ($W_{16a}$) of the forefoot region $16a$ of the article of footwear $10a$ from the medial side $22a$ to the lateral side $24a$ of the article of footwear $10a$, (2) a width ($W_{52a-2}$) of a second strip of material $52a_2$ extends across a width ($W_{18a}$) of the midfoot region $18a$ of the article of footwear $10a$ from the medial side $22a$ to the lateral side $24a$ of the article of footwear $10a$, and (3) a width ($W_{52a-1}$) of a third strip of material $52a_3$ extends across a width ($W_{20a}$) of the heel region $20a$ of the article of footwear $10a$ from the medial side $22a$ to the lateral side $24a$ of the article of footwear $10a$. As shown in FIGS. 14, 15, and 16, the width ($W_{52a-1}$), ($W_{52a-2}$), ($W_{52a-3}$) of each strip of material $52a_1$-$52a_3$ of the one or more strips of material $52a$ extends substantially non-perpendicularly $\theta_{52a}$ with respect to respective axes $A_{16a}$-$A_{16a}$, $A_{18a}$-$A_{18a}$, $A_{20a}$-$A_{20a}$, corresponding to the widths ($W_{16a}$, $W_{18a}$, $W_{20a}$) of the forefoot region $16a$, the midfoot region $18a$ and the heel region $20a$ of the article of footwear $10a$ with respect to an axis $A_{14a}$-$A_{14a}$ extending along the length ($L_{14a}$) of the sole structure $14a$.

Referring back to FIG. 13, each strip of material $52a_1$-$52a_3$ of the one or more strips of material $52a$ includes a top surface $54a$, a bottom surface $56a$ and a sidewall surface $58a$ extending between the top surface $54a$ and the bottom surface $56a$. The sidewall surface $58a$ may define a thickness ($T_{52a}$) of each strip of material $52a_1$-$52a_3$ of the one or more strips of material $52a$ extending between the top surface $54a$ and the bottom surface $56a$.

In an example, each strip of material $52a_1$-$52a_3$ of the one or more strips of material $52a$ is formed from a flexible material. Each strip of material $52a_1$-$52a_3$ of the one or more strips of material $52a$ may include a fabric material, a woven textile (see, e.g., enlarged view of the each strip of material $52a$ in FIG. 13), or a knitted textile (see, e.g., enlarged view of the each strip of material $52a$ in FIG. 13). In some instances, each strip of material $52a_1$-$52a_3$ of the one or more strips of material $52a$ is porous. Each strip of material $52a_1$-$52a_3$ of the one or more strips of material $52a$ may be formed from a polymeric material such as, for example, a thermoplastic polymeric material. An exemplary thermoplastic polymeric material may include, for example, a thermoset polymeric material or the like. In some examples, each strip of material $52a_1$-$52a_3$ of the one or more strips of material $52a$ may be a thermoformable material. In some examples, if each strip of material $52a$ is a woven or knit structure (as seen in, e.g., the enlarged view of FIG. 13), the woven or knit structure may be formed from a polyester yarn. Furthermore, in other examples, if each strip of material $52a$ is a woven or knit structure (as seen in, e.g., the enlarged view of FIG. 13), each passage or aperture formed by overlapping members defining the woven or knit structure of each strip of material $52a$ may be at least 0.5 mm in length in a largest dimension or at least 1.0 mm in length in a largest dimension. Furthermore, each passage or aperture formed by overlapping members defining the woven or knit structure of each strip of material $52a$ may permit one or both of the first midsole portion $36a$ and the second midsole portion $44a$ to directly contact one another. In other implementations, one or both of the first midsole portion $36a$ and the second midsole portion 44a may be injection molded around or through each passage or aperture formed by overlapping members defining the woven or knit structure of each strip of material 52a.

In some instances, each strip of material $52a_1$-$52a_3$ of the one or more strips of material 52a is an embroidered textile. In some examples, each strip of material $52a_1$-$52a_3$ of the one or more strips of material 52a has one or more first regions including embroidery and one or more second regions without embroidery or with a lower percentage of embroidered surface area as comparted to the one or more first regions. The embroidery can provide reduced stretch or a "lock down" feature to areas of each strip of material $52a_1$-$52a_3$ of the one or more strips of material 52a. Such areas of each strip of material $52a_1$-$52a_3$ of the one or more strips of material 52a provide a reduced stretch quality may be located, for example, at a region of each strip of material $52a_1$-$52a_3$ of the one or more strips of material 52a that is arranged between the first midsole portion 36a and the second midsole portion 44a, or, alternatively at a region that extends beyond the sidewall surface 58a of each strip of material $52a_1$-$52a_3$ of the one or more strips of material 52a.

Figure 22:
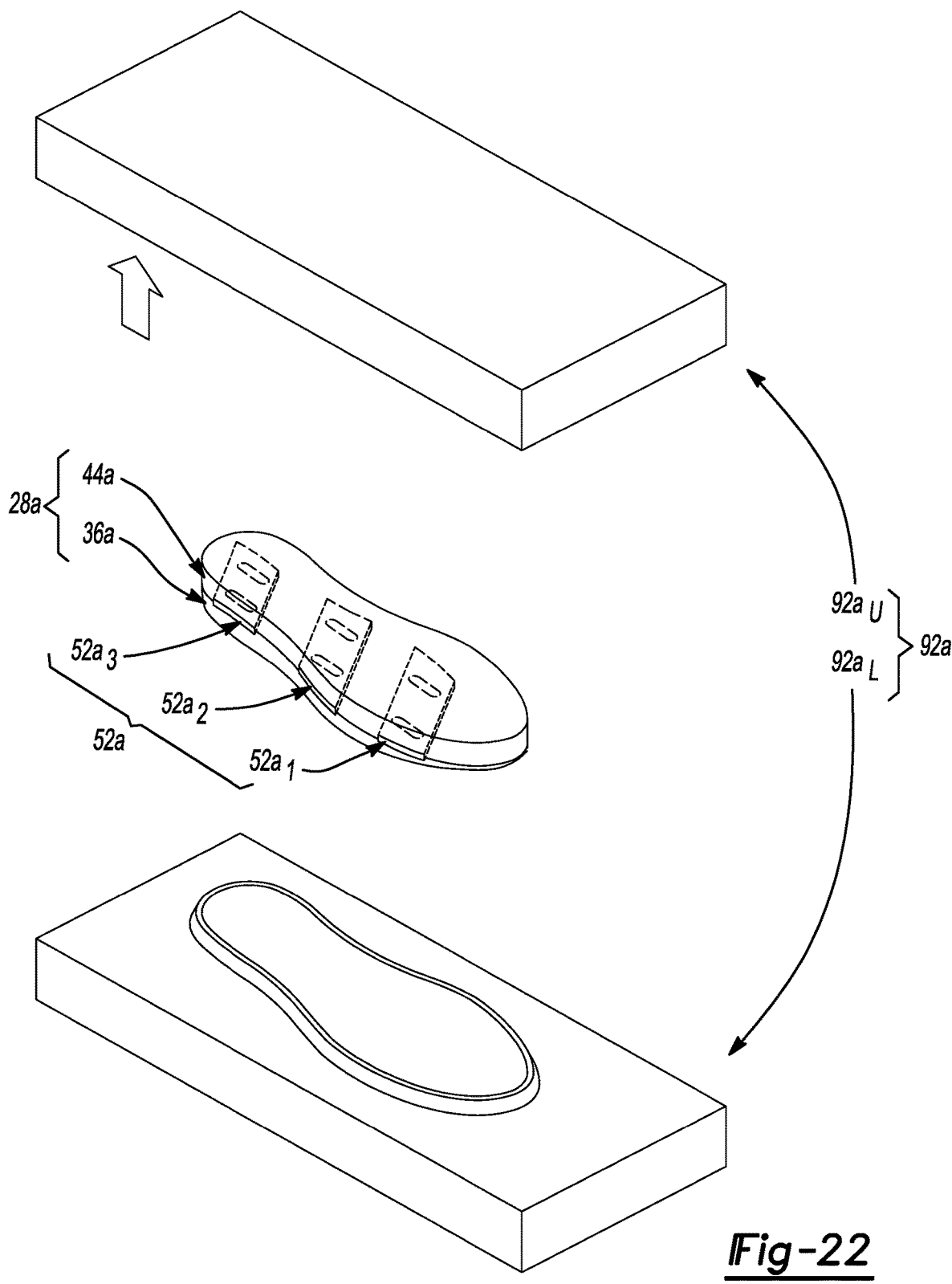
FIG. 22 is a further perspective view of the mold tool and the portion of the article of footwear of FIG. 21 arranged in an assembled state.

With reference to FIG. 13, the first midsole portion 36a is disposed between the outsole 26a and the upper 12a. When the sole structure 14a is attached to the upper 12a as shown in FIG. 12, the second midsole portion 44a is disposed between the first midsole portion 36a and the upper 12a. As shown in FIGS. 13 and 22, each strip of material $52a_1$-$52a_3$ of the one or more strips of material 52a is disposed between the first midsole portion 36a and the second midsole portion 44a. The bottom surface 56a of each strip of material $52a_1$-$52a_3$ of the one or more strips of material 52a extends across the top surface 38a of the first midsole portion 36a. The top surface 54a of each strip of material $52a_1$-$52a_3$ of the one or more strips of material 52a extends across the bottom surface 48a of the second midsole portion 44a.

As shown in FIG. 13, the sidewall surface 58a of each strip of material $52a_1$-$52a_3$ of the one or more strips of material 52a may be further defined by a medial sidewall surface portion $58a_M$ and a lateral sidewall surface portion $58a_L$. The width ($W_{52a-1}$, $W_{52a-2}$, $W_{52a-3}$) of each strip of material $52a_1$-$52a_3$ of the one or more strips of material 52a extends between the medial sidewall surface portion $58a_M$ and the lateral sidewall surface portion $58a_L$ of each strip of material $52a_1$-$52a_3$ of the one or more strips of material 52a. Furthermore, the sidewall surface 42a, 50a of each of the first midsole portion 36a and the second midsole portion 44a may be further defined by a medial sidewall surface portion $42a_M$, $50a_M$ and a lateral sidewall surface portion $42a_L$, $50a_L$ that respectively define a width ($W_{36a}$, $W_{44a}$) of each of the first midsole portion 36a and the second midsole portion 44a. The width ($W_{36a}$, $W_{44a}$) of each of the first midsole portion 36a and the second midsole portion 44a correspondingly varies and defines, for example, the widths ($W_{16a}$, $W_{18a}$, $W_{20a}$) of the forefoot region 16a, the midfoot region 18a and the heel region 20a of the sole structure 14a of the article of footwear 10a.

Figure 17:
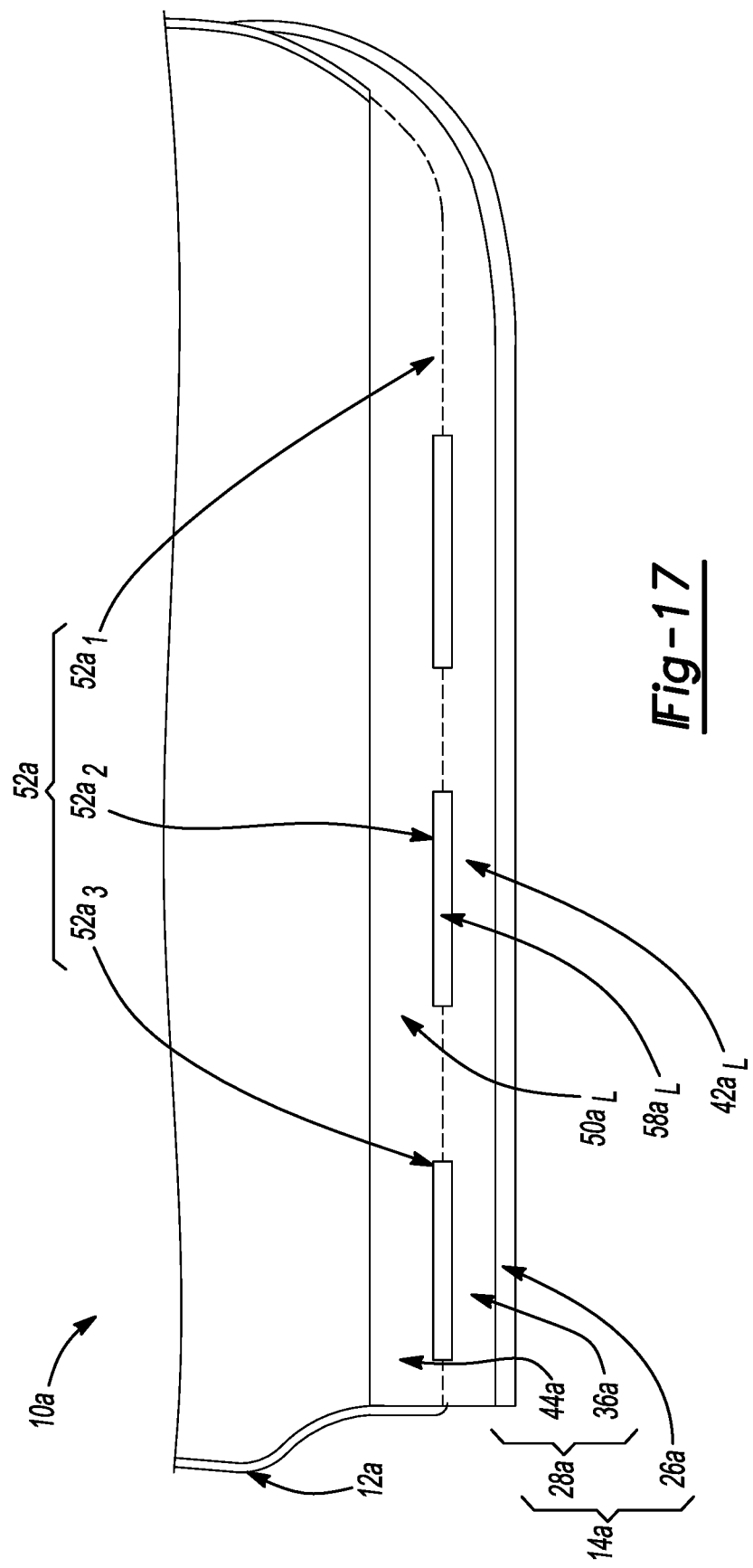
FIG. 17 is an exemplary partial side view of the article of footwear according to arrow 17 of any of FIG. 14, 15, or 16.

With reference to FIG. 13 and FIGS. 17, 18, 19 and 20, the width ($W_{52a-1}$), ($W_{52a-2}$, ($W_{52a-3}$) extending between the medial sidewall surface portion $58a_M$ and the lateral sidewall surface portion $58a_L$ of each strip of material $52a_1$-$52a_3$ of the one or more strips of material 52a may be selectively sized with respect to the width ($W_{36a}$, $W_{44a}$) of each of the first midsole portion 36a and the second midsole portion 44a. As shown in FIGS. 13, 14 and 17, the width ($W_{52a-1}$), ($W_{52a-2}$), ($W_{52a-3}$) of each strip of material $52a_1$-$52a_3$ of the one or more strips of material 52a is selectively sized such that each of the medial sidewall surface portion $58a_M$ and the lateral sidewall surface portion $58a_L$ of each strip of material $52a_1$-$52a_3$ of the one or more strips of material 52a is respectively aligned with the medial sidewall surface portion $42a_M$, $50a_M$ and the lateral sidewall surface portion $42a_L$, $50a_L$ of each of the first midsole portion 36a and the second midsole portion $44_a$. As a result of the alignment of the respective medial sidewall surface portions $42a_M$, $50a_M$, $58a_M$ and the lateral sidewall surface portions $42a_L$, $50a_L$, $58a_L$ described above, the medial sidewall surface portion $58a_M$ or the lateral sidewall surface portion $58a_L$ of each strip of material $52a_1$-$52a_3$ of the one or more strips of material 52a is visible when viewing the medial side 22a or the lateral side 24a the of the sole structure 14a.

Figure 18:
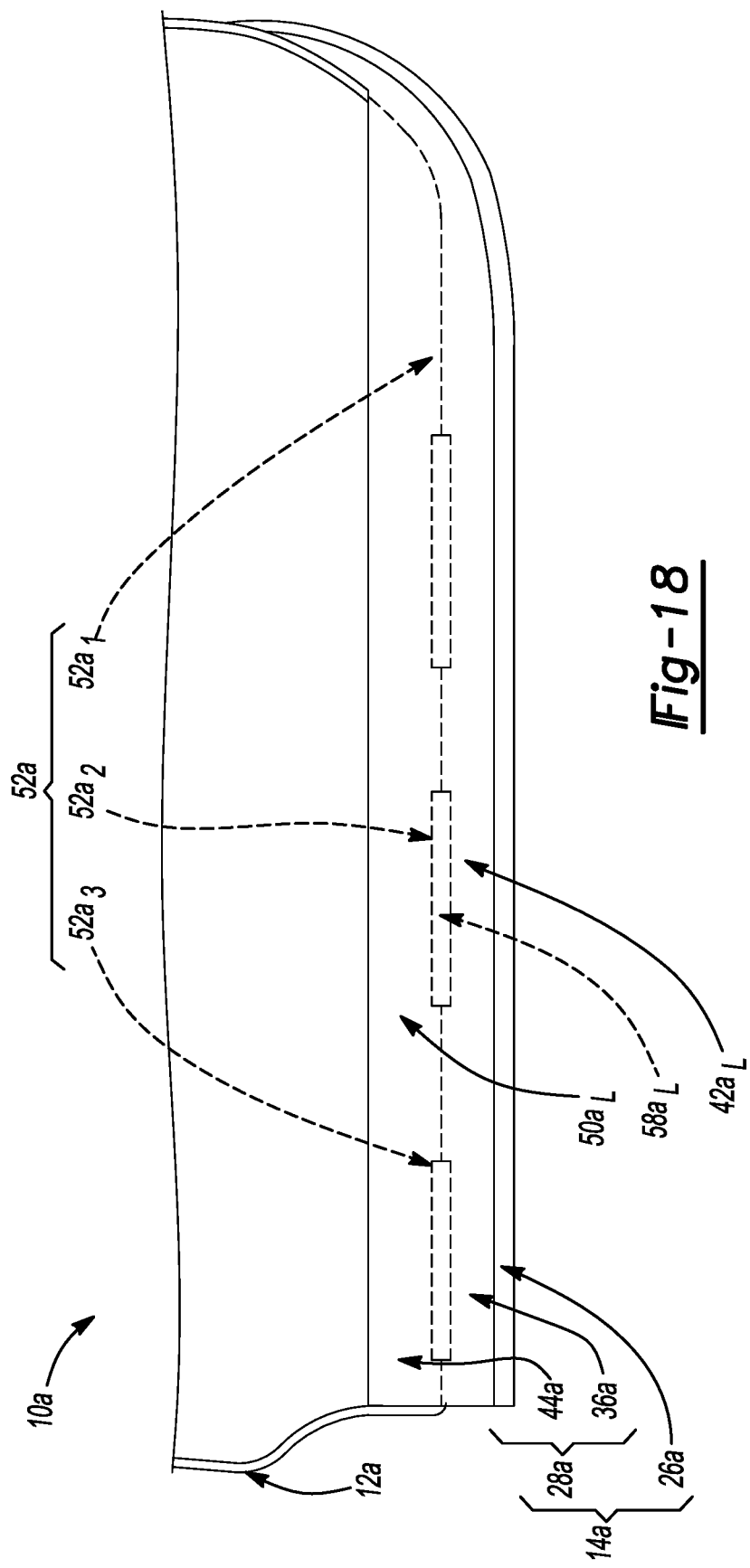
FIG. 18 is an exemplary alternative partial side view of the article of footwear according to arrow 17 of any of FIG. 14, 15, or 16.

In another example as shown in FIG. 18, the width ($W_{52a-1}$) ($W_{52a-2}$), ($W_{52a-3}$) of each strip of material $52a_1$-$52a_3$ of the one or more strips of material 52a is selectively sized such that each of the medial sidewall surface portion $58a_M$ and the lateral sidewall surface portion $58a_L$ of each strip of material $52a_1$-$52a_3$ of the one or more strips of material 52a is not aligned with and does extend beyond the medial sidewall surface portion $42a_M$, $50a_M$ and the lateral sidewall surface portion $42a_L$, $50a_L$ of each of the first midsole portion 36a and the second midsole portion 44a. As a result of the non-alignment of the respective medial sidewall surface portions $42a_M$, $50a_M$, $58a_M$ and the lateral sidewall surface portions $42a_L$, $50a_L$, $58a_L$ described above, the medial sidewall surface portion $58a_M$ or the lateral sidewall surface portion $58a_L$ of each strip of material $52a_1$-$52a_3$ of the one or more strips of material 52a is not visible when viewing the medial side 22a or the lateral side 24a the of the sole structure 14a.

Figure 19:
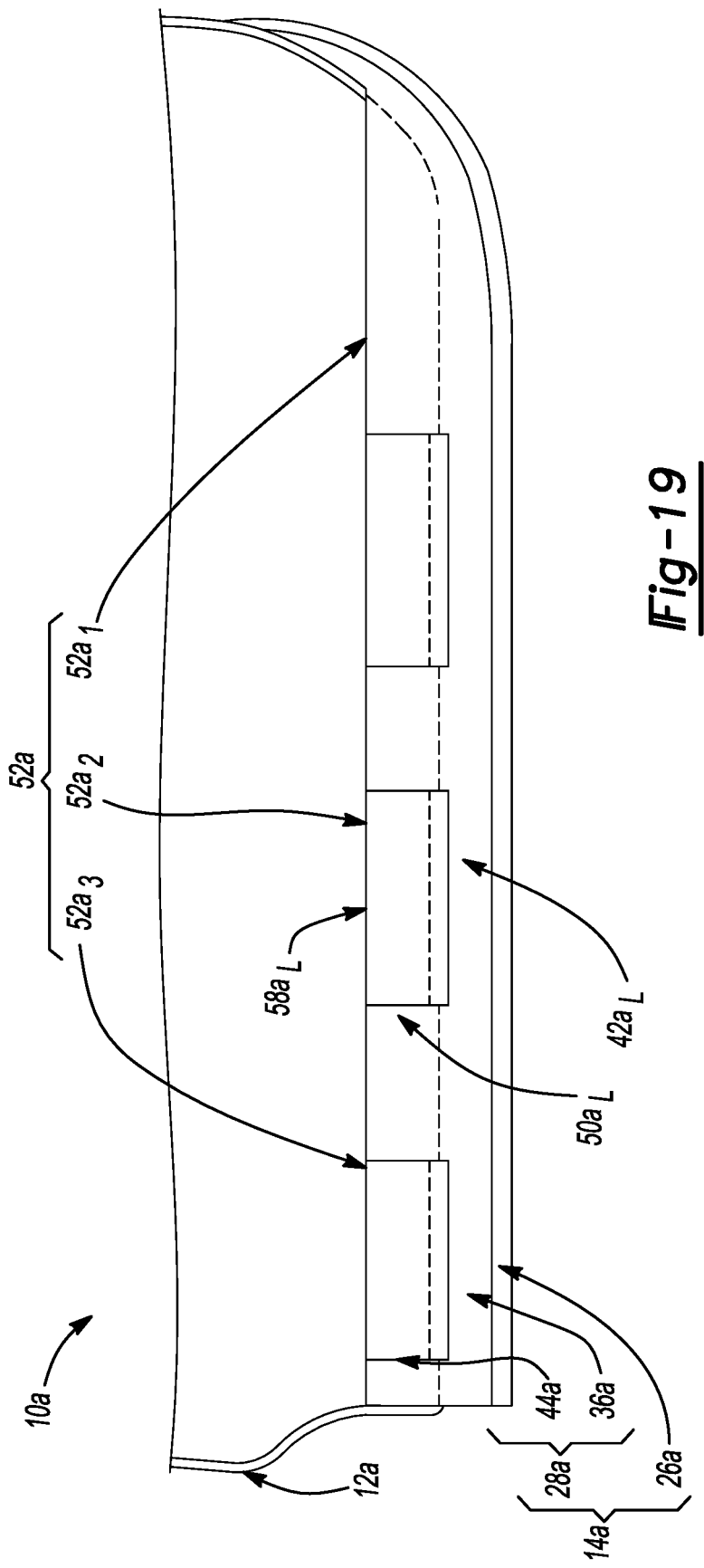
FIG. 19 is another exemplary partial alternative side view of the article of footwear according to arrow 17 of any of FIG. 14, 15, or 16.

In yet another example as shown in FIG. 19, the width ($W_{52a-1}$), ($W_{52a-2}$), ($W_{52a-3}$) of each strip of material $52a_1$-$52a_3$ of the one or more strips of material 52a is selectively sized such that each of the medial sidewall surface portion $58a_M$ and the lateral sidewall surface portion $58a_L$ of each strip of material $52a_1$-$52a_3$ of the one or more strips of material 52a extends beyond the medial sidewall surface portion $42a_M$, $50a_M$ and the lateral sidewall surface portion $42a_L$, $50a_L$ of each of the first midsole portion 36a and the second midsole portion 44a. Therefore, a first portion ($W_{52a-P1}$) of each width ($W_{52a-1}$), ($W_{52a-2}$) ($W_{52a-3}$) of each strip of material $52a_1$-$52a_3$ of the one or more strips of material 52a extending from of the medial sidewall surface portion $58a_M$ of each strip of material $52a_1$-$52a_3$ of the one or more strips of material 52a and a second portion (not shown) of each width ($W_{52a-1}$), ($W_{52a-2}$) ($W_{52a-3}$) of each strip of material $52a_1$-$52a_3$ of the one or more strips of material 52a extending from of the lateral sidewall surface portion $58a_L$ of each strip of material $52a_1$-$52a_3$ of the one or more strips of material 52a may respectively extend along and be arranged adjacent, for example, the medial sidewall surface portion $42a_M$, $50a_M$ and the lateral sidewall surface portion $42a_L$, $50a_L$ of each of the first midsole portion 36a and the second midsole portion 44a. However, as shown in FIG. 19, the first portion ($W_{52a-P1}$) of each width ($W_{52a-1}$), ($W_{52a-2}$), ($W_{52a-3}$) of each strip of material $52a_1$-$52a_3$ of the one or more strips of material 52a and the second portion (not shown) of each width ($W_{52a-1}$), ($W_{52a-2}$), ($W_{52a-3}$) of each strip of material $52a_1$-$52a_3$ of the one or more strips of material 52a do not respectively extend along and are not respectively arranged adjacent the upper 12a of the article of footwear 10a. As a result, the first portion ($W_{52a-P1}$) of each width ($W_{52a-1}$), ($W_{52a-2}$), ($W_{52a-3}$) of each strip of material $52a_1$-$52a_3$ of the one or more strips of material 52a and the second portion (not shown) of each width ($W_{52a-1}$), ($W_{52a-2}$), ($W_{52a-3}$) of each strip of material $52a_1$-$52a_3$ of the one or more strips of material $52a$ is visible when viewing the medial side $22a$ or the lateral side $24a$ the of the sole structure $14a$.

Figure 20:
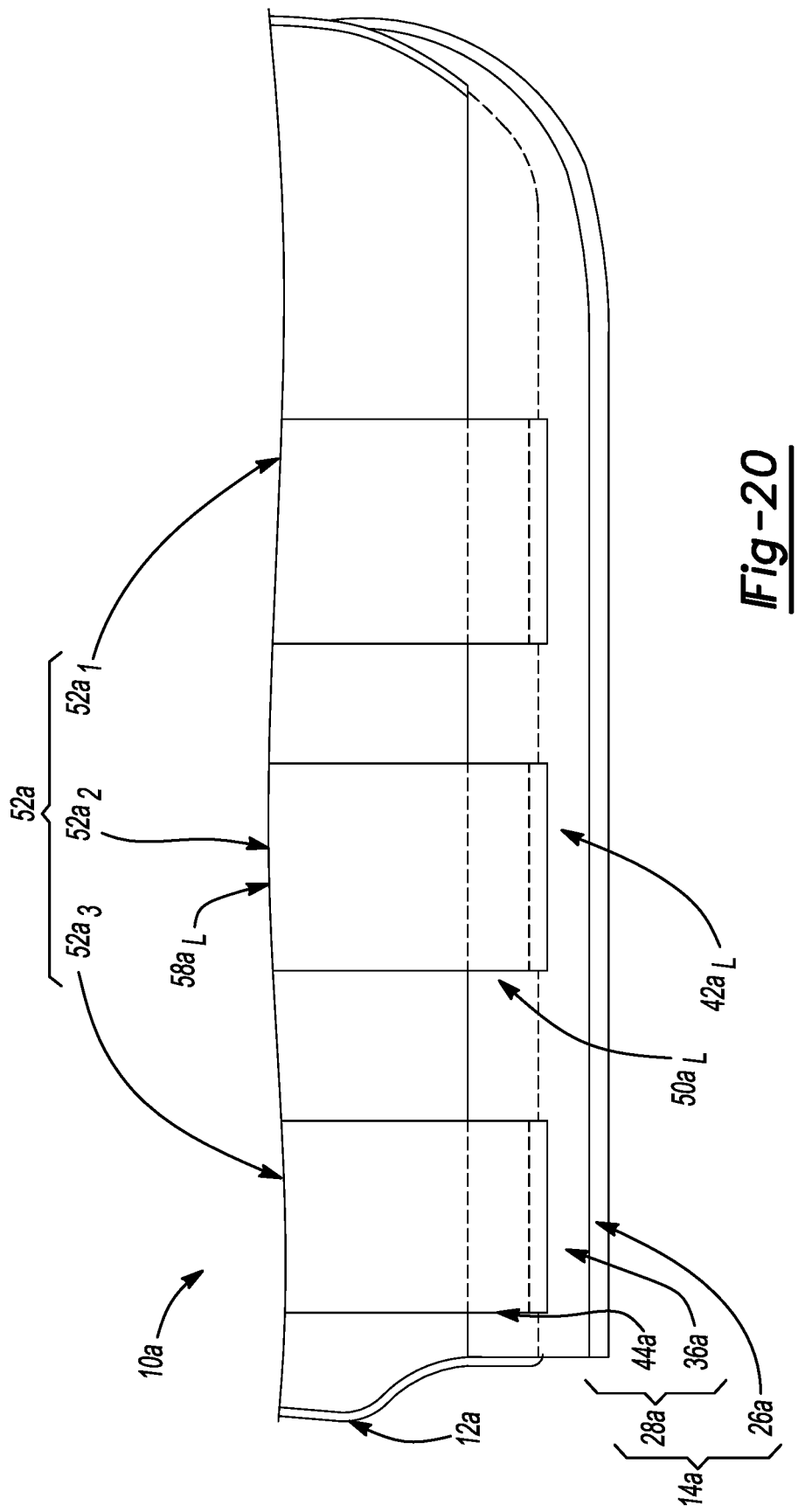
FIG. 20 is yet another exemplary partial alternative side view of the article of footwear according to arrow 17 of any of FIGS.

In another example as shown in FIG. 20, the width ($W_{52a-1}$), ($W_{52a-2}$), ($W_{52a-3}$) of each strip of material $52a_1$-$52a_3$ of the one or more strips of material $52a$ is selectively sized such that each of the medial sidewall surface portion $58a_M$ and the lateral sidewall surface portion $58a_L$ of each strip of material $52a_1$-$52a_3$ of the one or more strips of material $52a$ extends beyond the medial sidewall surface portion $42a_M$, $50a_M$ and the lateral sidewall surface portion $42a_L$, $50a_L$ of each of the first midsole portion $36a$ and the second midsole portion $44a$. Therefore, a first portion ($W_{52a-P1}$) of each width ($W_{52a-1}$), ($W_{52a-2}$), ($W_{52a-3}$) of each strip of material $52a_1$-$52a_3$ of the one or more strips of material $52a$ extending from of the medial sidewall surface portion $58a_M$ of each strip of material $52a_1$-$52a_3$ of the one or more strips of material $52a$ and a second portion (not shown) of each width ($W_{52a-1}$), ($W_{52a-2}$), ($W_{52a-3}$), of each strip of material $52a_1$-$52a_3$ of the one or more strips of material $52a$ extending from of the lateral sidewall surface portion $58a_L$ of each strip of material $52a_1$-$52a_3$ of the one or more strips of material $52a$ may respectively extend along and be arranged adjacent, for example: (1) the medial sidewall surface portion $42a_M$, $50a_M$ and the lateral sidewall surface portion $42a_L$, $50a_L$ of each of the first midsole portion $36a$ and the second midsole portion $44a$ and (2) at least a portion of, respectively, the medial side and the lateral side of the upper $12a$. As a result, the first portion ($W_{52a-P1}$) of each width ($W_{52a-1}$), ($W_{52a-2}$), ($W_{52a-3}$), of each strip of material $52a_1$-$52a_3$ of the one or more strips of material $52a$ and the second portion (not shown) of each width ($W_{52a-1}$), ($W_{52a-2}$), ($W_{52a-3}$), of each strip of material $52a_1$-$52a_3$ of the one or more strips of material $52a$ is visible when viewing the medial side $22a$ or the lateral side $24a$ the of the sole structure $14a$.

With reference to FIGS. 15 and 16, one or more regions of at least one strip $52a_1$-$52a_3$ (see, e.g., all of the strips $52a_1$-$52a_3$ in FIG. 15 or one strip $52a_2$ in FIG. 16) of the one or more strips of material $52a$ may further define at least one passage or aperture $68a$ or absence of at least one strip $52a_1$-$52a_3$ of the one or more strips of material $52a$. The at least one passage $68a$ extends through the thickness ($T_{52a}$) of the at least one strip $52a_1$-$52a_3$ of the one or more strips of material $52a$ between the top surface $54a$ and the bottom surface $56a$. If a polymeric material defines one or both of the first midsole portion $36a$ and the second midsole portion $44a$, the polymeric material may be molded around any surface defining the at least one strip $52a_1$-$52a_3$ of the one or more strips of material $52a$ and/or through at least one passage $68a$ extends through the thickness ($T_{52a}$) of the at least one strip $52a_1$-$52a_3$ of the one or more strips of material $52a$.

The at least one passage $68a$ may include a plurality of passages or apertures $68a_1$-$68a_n$. For example, the at least one passage $68a$ may include a first passage $68a_1$, a last passage $68a_n$ and one or more intermediate passages $68a_2$-$68a_{n-1}$. In an example, as shown in FIG. 15, the plurality of passages $68a_1$-$68a_n$ may be arranged in any desirable pattern (e.g., in: (1) a row-and-column grid, (2) staggered rows and columns, or (3) a random pattern) such that the plurality of passages or apertures $68a_1$-$68a_n$ are arranged between the forefoot region $16a$ and the heel region $20a$ of the sole structure $14a$ (i.e., across substantially most or all of the length ($L_{14a}$) of the sole structure $14a$) and between the medial side $22a$ and the lateral side $24a$ of the article of footwear $10a$ (i.e., across the width ($W_{14a}$) of the sole structure $14a$). In other implementations, the plurality of passages $68a_1$-$68a_n$ may be arranged in a pattern (e.g., in: (1) a row-and-column grid, (2) staggered rows and columns, or (3) a random pattern) that does not extend across the forefoot region $16a$ and the heel region $20a$ of the sole structure $14a$ or between the medial side $22a$ and the lateral side $24a$ of the article of footwear $10a$. Although the plurality of passages $68a_1$-$68a_n$ may extend across substantially most or all of the length ($L_{14a}$) of the sole structure $14a$ as described above, the plurality of passages $68a_1$-$68a_n$ may be arranged in a pattern (e.g., in: (1) a row-and-column grid, (2) staggered rows and columns, or (3) a random pattern) extending across: (1) some or all of the heel region $20a$ of the sole structure $14a$ but not the forefoot region $16a$ or the midfoot region $18a$ of the sole structure $14a$, (2) some or all of the forefoot region $16a$ of the sole structure $14a$ but not the midfoot region $18a$ or the heel region $20a$ of the sole structure $14a$ (3) some or all of the forefoot region $16a$ and the heel region $20a$ of the sole structure $14a$ but not the midfoot region $18a$ of the sole structure $14a$ or (4) as shown in FIG. 16, some or all of the midfoot region $18a$ but not the forefoot region $16a$ and the heel region $20a$.

With continued reference to FIGS. 15 and 16, each passage of the plurality of passages $68a_1$-$68a_n$ is shown being defined by a substantially circular or oval shape having any dimension or diameter ($D_{68a}$). In some examples, the dimension or diameter ($D_{68a}$) may be approximately equal to about 0.5 mm or about 3.0 mm. In other examples, the dimension or diameter ($D_{68a}$) may be between approximately 0.5 mm and approximately 3.0 mm. Furthermore, each passage of the plurality of passages $68a_1$-$68a_n$ define a substantially similar dimension or diameter ($D_{68a}$). Although each passage of the plurality of passages $68a_1$-$68a_n$ may define a substantially similar sized or shaped dimension or diameter ($D_{68a}$), implementations of the at least one strip $52a_1$-$52a_3$ of the one or more strips of material $52a$ may include at least one passage of the plurality of passages $68a_1$-$68a_n$ having a different sized or shaped dimension or diameter ($D_{68a}$). For example, at least one passage of the plurality of passages $68a_1$-$68a_n$ may have a different sized or shaped dimension or diameter ($D_{68a}$) than another passage of the plurality of passages $68a_1$-$68a_n$ in the heel region $20a$ of the sole structure $14a$, the forefoot region $16a$ of the sole structure $14a$, the midfoot region $18a$ of the sole structure $14a$ or the forefoot region $16a$ and the heel region $20a$ of the sole structure $14a$.

With reference to FIG. 13, the top surface $38a$ of the first midsole portion $36a$ may further define at least one second midsole contacting region $70a$ and at least one strip of material contacting region $72a$. The bottom surface $48a$ of the second midsole portion $44a$ may further define at least one first midsole contacting region $74a$ and at least one strip of material contacting region $76a$.

Each of the at least one second midsole contacting region $70a$ of the first midsole portion $36a$ and the at least one first midsole contacting region $74a$ of the second midsole portion $44a$ may define a size or shape that generally corresponds to a size or shape of the at least one passage $68a$ of the at least one strip $52a_1$-$52a_3$ of the one or more strips of material $52a$. If the at least one passage $68a$ of the at least one strip $52a_1$-$52a_3$ of the one or more strips of material $52a$ defines a plurality of passages $68a_1$-$68a_n$ each of the at least one second midsole contacting region $70a$ of the first midsole portion $36a$ and the at least one first midsole contacting region $74a$ of the second midsole portion $44a$ may define a corresponding plurality of second midsole contacting regions $70a_1$-$70a_n$ and a plurality of first midsole contacting regions $74a_1$-$74a_n$. Furthermore, each passage and contacting region of the plurality of passages $68a_1$-$68a_n$ may be respectively axially aligned with one of the plurality of second midsole contacting regions $70a_1$-$70a_n$ and one of the plurality of first midsole contacting regions $74a_1$-$74a_n$.

In an example, when the article of footwear 10a is formed, surfaces of the outsole 26a, the first midsole portion 36a, the second midsole portion 44a and each strip of material $52a_1$-$52a_3$ of the one or more strips of material 52a may be arranged near, proximate, spaced-apart-from or adjacent one another. For example, the at least one strip of material contacting region 72a of the top surface 38a of the first midsole portion 36a may be disposed adjacent the bottom surface 56a of each strip of material $52a_1$-$52a_3$ of the one or more strips of material 52a, and the at least one strip of material contacting region 76a of the bottom surface 48a of the second midsole portion 44a may be disposed adjacent the top surface 54a of each strip of material $52a_1$-$52a_3$ of the one or more strips of material 52a.

Once each strip of material $52a_1$-$52a_3$ of the one or more strips of material 52a is arranged relative to the first midsole portion 36a and the second midsole portion 44a, as described above, each strip of material $52a_1$-$52a_3$ of the one or more strips of material 52a may be said to be arranged between the first midsole portion 36a and the second midsole portion 44a. Even though each strip of material $52a_1$-$52a_3$ of the one or more strips of material 52a may be disposed between the first midsole portion 36a and the second midsole portion 44a, one or more portions of the first midsole portion 36a may be in direct contact with one or more portions of the second midsole portion 44a as a result of, for example, one or a combination of (1) a longitudinal spacing between each strip of material $52a_1$-$52a_3$ of the one or more strips of material 52a and (2) the formation of the at least one passage 68a of at least one strip $52a_1$-$52a_3$ of the one or more strips of material 52a such that: (A) portions of the top surface 38a of the first midsole portion 36a and the bottom surface 48a of the second midsole portion 44a that are not separated by the one or more strips of material 52a may contact one another and (B) at least one second midsole contacting region 70a of the top surface 38a of the first midsole portion 36a may be disposed adjacent the at least one first midsole contacting region 74a of the bottom surface 48a of the second midsole portion 44a. After arranging the first midsole portion 36a adjacent the second midsole portion 44a as described above with respect to each strip of material $52a_1$-$52a_3$ of the one or more strips of material 52a, the midsole 28a defined by the first midsole portion 36a, the second midsole portion 44a and each strip of material $52a_1$-$52a_3$ of the one or more strips of material 52a may be arranged in a mold tool 92a (see, e.g., FIGS. 21-22) for directly bonding the first midsole portion 36a to the second midsole portion 44a.

The mold tool 92a includes an upper mold half $92a_U$ and a lower mold half $92a_L$. Each of the upper mold half $92a_U$ and the lower mold half $92a_L$ may define a mold surface for bonding the first midsole portion 36a to the second midsole portion 44a under heat and pressure.

Figure 21:
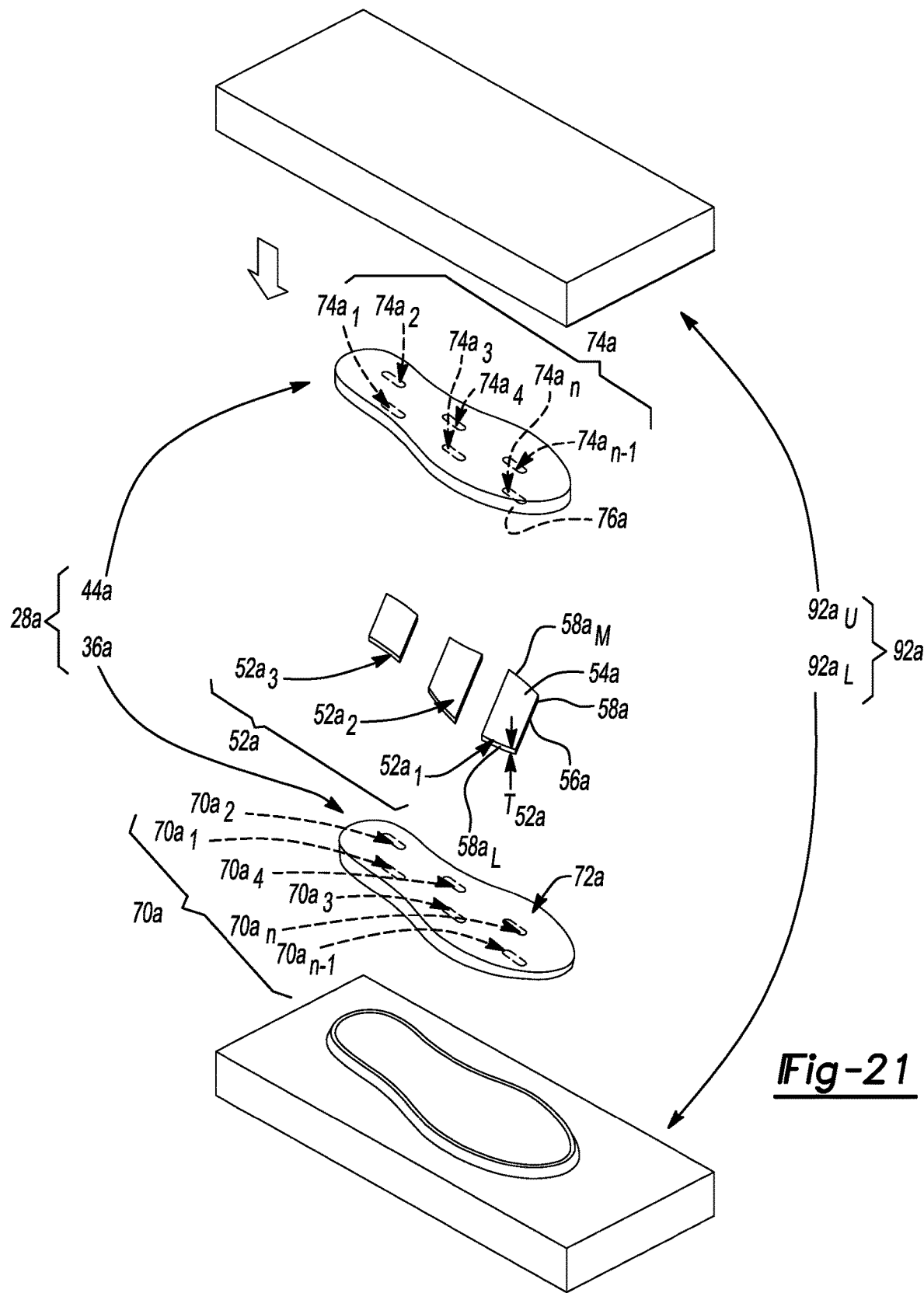
FIG. 21 is a perspective view of an exemplary mold tool and the portion of the article of footwear corresponding to FIG. 13.

As shown in FIG. 21, the mold tool 92a is arranged in an open configuration by spacing apart the upper mold half $92a_U$ and the lower mold half $92a_L$ such that the first midsole portion 36a, the second midsole portion 44a and each strip of material $52a_1$-$52a_3$ of the one or more strips of material 52a are arranged therebetween. Then, as shown in FIG. 22, after arranging the mold tool 92a in a closed configuration for a period of time, the mold tool 92a may be returned to the open configuration with the first midsole portion 36a bonded to the second midsole portion 44a and each strip of material $52a_1$-$52a_3$ of the one or more strips of material 52a secured therebetween.

Thereafter, the midsole-contacting surface 30a of the outsole 26a may be disposed adjacent the bottom surface 40a of the first midsole portion 36a for joining the outsole 26a to the first midsole portion 36a. In an example, the outsole 26a may be joined to the first midsole portion 36a with an adhesive or by way of a molding tool in a substantially similar manner as described above.

With reference to FIG. 19 or 20, if the width ($W_{52a-1}$), ($W_{52a-2}$), ($W_{52a-3}$) of each strip of material $52a_1$-$52a_3$ of the one or more strips of material 52a is selectively sized such that each of the medial sidewall surface portion $58a_M$ and the lateral sidewall surface portion $58a_L$ of each strip of material $52a_1$-$52a_3$ of the one or more strips of material 52a extends beyond the medial sidewall surface portion $42a_M$, $50a_M$ and the lateral sidewall surface portion $42a_L$, $50a_L$ of each of the first midsole portion 36a and the second midsole portion 44a, the first portion ($W_{52a-1-P1}$) of each width ($W_{52a-1}$), ($W_{52a-2}$), ($W_{52a-3}$) of each strip of material $52a_1$-$52a_3$ of the one or more strips of material 52a and the second portion (not shown) of each width ($W_{52a-1}$), ($W_{52-2}$), ($W_{52a-3}$) of each strip of material $52a_1$-$52a_3$ of the one or more strips of material 52a may be respectively folded or extended upwardly adjacent or along, for example: as shown in FIGS. 19 and 20 (1) the medial sidewall surface portion $42a_M$, $50a_M$ and the lateral sidewall surface portion $42a_L$, $50a_L$ of each of the first midsole portion 36a and the second midsole portion 44a and, in an alternative embodiment as shown in FIG. 20 but not in FIG. 19 (2) at least a portion of, respectively, the medial side and the lateral side of the upper 12a.

Although the mold tool 92a may be utilized for joining the first midsole portion 36a to the second midsole portion 44a under heat and pressure, in some configurations, an optional adhesive (not shown) may also or alternatively be utilized for adhering the first midsole portion 36a to the second midsole portion 44a. In some instances, the optional adhesive may be provided in the form of a sheet. In other examples, the optional adhesive may conform to any desirable shape, pattern or configuration, such as, for example, the shape, pattern or configuration of the of the at least one passage 68a of the at least one strip $52a_1$-$52a_3$ of the one or more strips of material 52a.

In an example, a first optional adhesive may be arranged between the first midsole portion 36a and the second midsole portion 44a; furthermore, the first optional adhesive may be arranged between the top surface 38a of the first midsole portion 36a and the bottom surface 56a of each strip of material $52a_1$-$52a_3$ of the one or more strips of material 52a such that the first optional adhesive is axially aligned with and radially extends across at least a portion of the shape, pattern or configuration of the of the at least one passage 68a of the at least one strip $52a_1$-$52a_3$ of the one or more strips of material 52a. The first optional adhesive adhesively bonds the first midsole portion 36a, the second midsole portion 44a and each strip of material $52a_1$-$52a_3$ of the one or more strips of material 52a together.

In another example, a second optional adhesive may be arranged between the first midsole portion 36a and the second midsole portion 44a; furthermore, the second optional adhesive may be arranged between the top surface 54a of each strip of material $52a_1$-$52a_3$ of the one or more strips of material 52a and the bottom surface 48a of the second midsole portion 44a such that the second optional adhesive is axially aligned with and radially extends across at least a portion of the shape, pattern or configuration of the of the at least one passage 68a of the at least one strip $52a_1$-$52a_3$ of the one or more strips of material 52a. The second optional adhesive adhesively bonds the first midsole portion 36a, the second midsole portion 44a and each strip of material $52a_1$-$52a_3$ of the one or more strips of material 52a together.

In yet another example, the first optional adhesive and the second optional adhesive may be arranged between the first midsole portion 36a and the second midsole portion 44a. The first optional adhesive may be arranged between the top surface 38a of the first midsole portion 36a and the bottom surface 56a of each strip of material $52a_1$-$52a_3$ of the one or more strips of material 52a such that the first optional adhesive is axially aligned with and radially extends across at least a portion of the shape, pattern or configuration of the of the at least one passage 68a of the at least one strip $52a_1$-$52a_3$ of the one or more strips of material 52a. The second optional adhesive may be arranged between the top surface 54a of each strip of material $52a_1$-$52a_3$ of the one or more strips of material 52a and the bottom surface 48a of the second midsole portion 44a such that the second optional adhesive is axially aligned with and radially extends across at least a portion of the shape, pattern or configuration of the of the at least one passage 68a of the at least one strip $52a_1$-$52a_3$ of the one or more strips of material 52a. The first optional adhesive and the second optional adhesive adhesively bonds the first midsole portion 36a, the second midsole portion 44 and each strip of material $52a_1$-$52a_3$ of the one or more strips of material 52a together.

Figure 23:
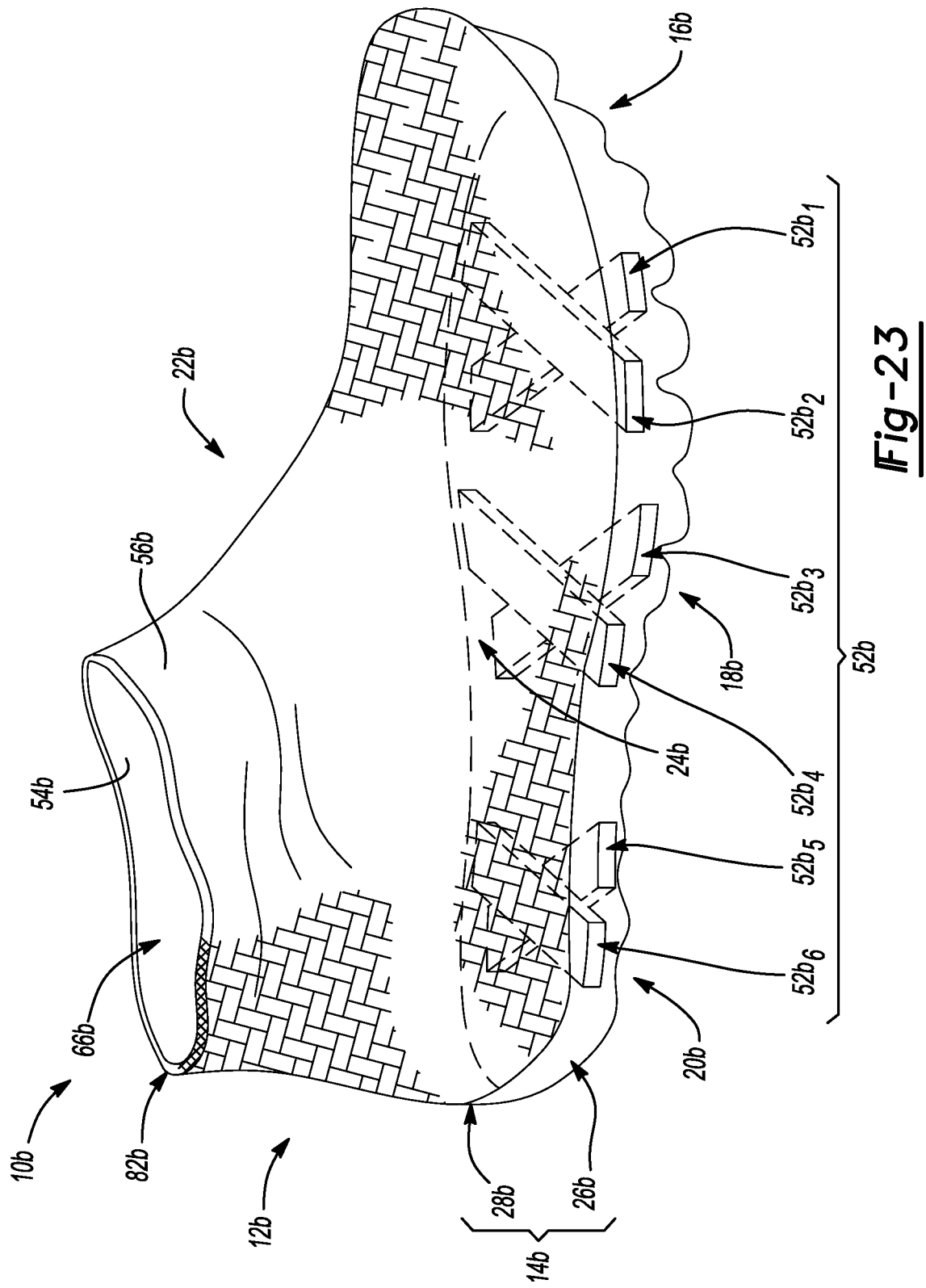
FIG. 23 is a perspective view of an article of footwear incorporating a sole structure in accordance with the principles of the present disclosure.

With reference to FIG. 23, an exemplary article of footwear 10b is provided and includes an upper 12b and a sole structure 14b attached to the upper 12b. The article of footwear 10b may be divided into one or more regions. The regions may include a forefoot region 16b, a midfoot region 18b, and a heel region 20b. The forefoot region 16b may correspond with toes and joints connecting metatarsal bones with phalanx bones of a foot. The midfoot region 18b may correspond with an arch area of the foot while the heel region 18b may correspond with rear portions of the foot, including a calcaneus bone. The article of footwear 10b may additionally include a medial side 22b and a lateral side 24b that correspond with opposite sides of the article of footwear 10b and extend through the regions 16b, 18b, 20b.

Figure 24:
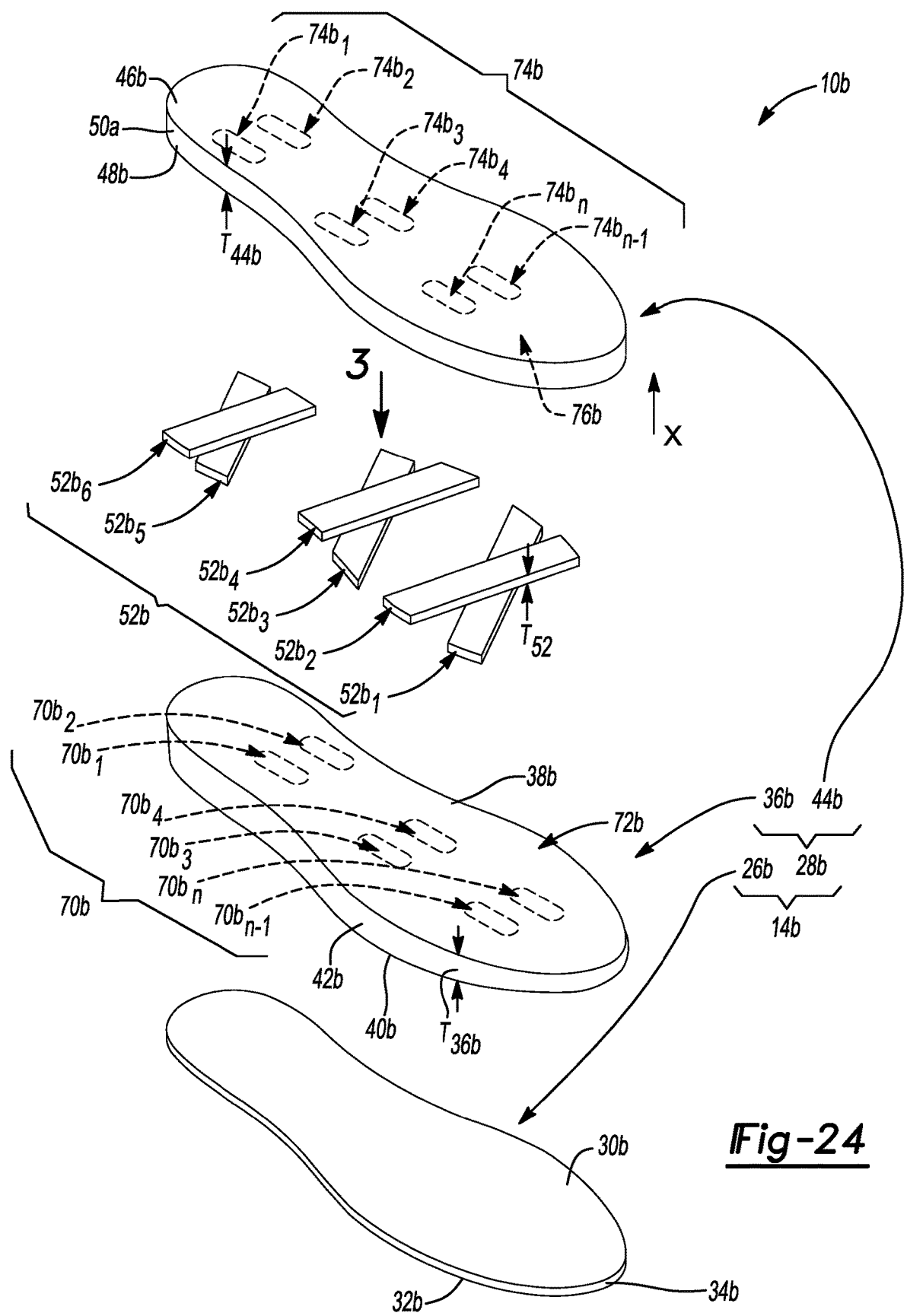
FIG. 24 is a perspective exploded view of a portion of the article of footwear of FIG. 23.

The sole structure 14b optionally includes an outsole 26b. With reference to FIGS. 23 and 24, the sole structure 14b may include a midsole 28b. A cushioning arrangement (not shown) may optionally be disposed generally between the outsole 26b and the midsole 28b.

Referring to FIG. 24, the outsole 26b includes a midsole-contacting surface 30b and a ground-contacting surface 32b. The outsole 26b further includes a sidewall surface 34b extending between the midsole-contacting surface 30b and the ground-contacting surface 32b.

As also shown in, for example, FIG. 24, the midsole 28b includes a first midsole portion 36b and a second midsole portion 44b. The first midsole portion 36b includes a top surface 38b, a bottom surface 40b and a sidewall surface 42b extending between the top surface 38b and the bottom surface 40b. The sidewall surface 42b may define a thickness ($T_{36b}$) of the first midsole portion 36b extending between the top surface 38b and the bottom surface 40b.

The top surface 38b and the bottom surface 40b of the first midsole portion 36b may generally define an outer surface profile of the first midsole portion 36b. In an example, each of the top surface 38b and the bottom surface 40b of the first midsole portion 36b may be substantially flat (e.g., planar). In this regard, each of the top surface 38b and the bottom surface 40b may not be interrupted with one or more recesses, trenches, valleys, or other similar features. Furthermore, in an example, the top surface 38b of the first midsole portion 36b may be substantially parallel to the bottom surface 40b of the first midsole portion 36b such that the thickness ($T_{36b}$) of the first midsole portion 36b is substantially the same across a length ($L_{14b}$) of the sole structure 14b as shown in, for example, FIG. 33.

With continued reference to FIG. 24, the second midsole portion 44b includes a top surface 46b, a bottom surface 48b and a sidewall surface 50b extending between the top surface 46b and the bottom surface 48b. The sidewall surface 50b may define a thickness ($T_{44b}$) of the second midsole portion 44b extending between the top surface 46b and the bottom surface 48b.

The top surface 46b and the bottom surface 48b of the second midsole portion 44b may generally define an outer surface profile of the second midsole portion 44b. In an example, each of the top surface 46b and the bottom surface 48b of the second midsole portion 44b may be substantially flat (e.g., planar). In this regard, each of the top surface 46b and the bottom surface 48b may not be interrupted with one or more recesses, trenches, valleys, or other similar features. Furthermore, in an example, the top surface 46b of the second midsole portion 44b may be substantially parallel to the bottom surface 48b of the second midsole portion 44b such that the thickness ($T_{44b}$) of the second midsole portion 44b is substantially the same across the length ($L_{14b}$) of the sole structure 14b as shown in, for example, FIG. 33.

In some examples, at least one of the first midsole portion 36b and the second midsole portion 44b are formed from a foamed material. In some instances, one or both of the first midsole portion 36b and the second midsole portion 44b are formed from a polymeric material. In some examples, the first midsole portion 36b and the second midsole portion 44b are formed from the same material. In another example, the first midsole portion 36b and the second midsole portion 44b are formed from different materials. The first midsole portion 36b may be formed from a first material and the second midsole portion 44b may be formed from a second material. The first material forming the first midsole portion 36b may have substantially the same stiffness as the second material forming the second midsole portion 44b. In some instances, the first material forming the first midsole portion 36b has a different stiffness than the second material forming the second midsole portion 44b. In other examples, the first material forming the first midsole portion 36b is the same as the second material forming the second midsole portion 44b. In yet another example, the first material forming the first midsole portion 36b is different than the second material forming the second midsole portion 44b.

Figure 25:
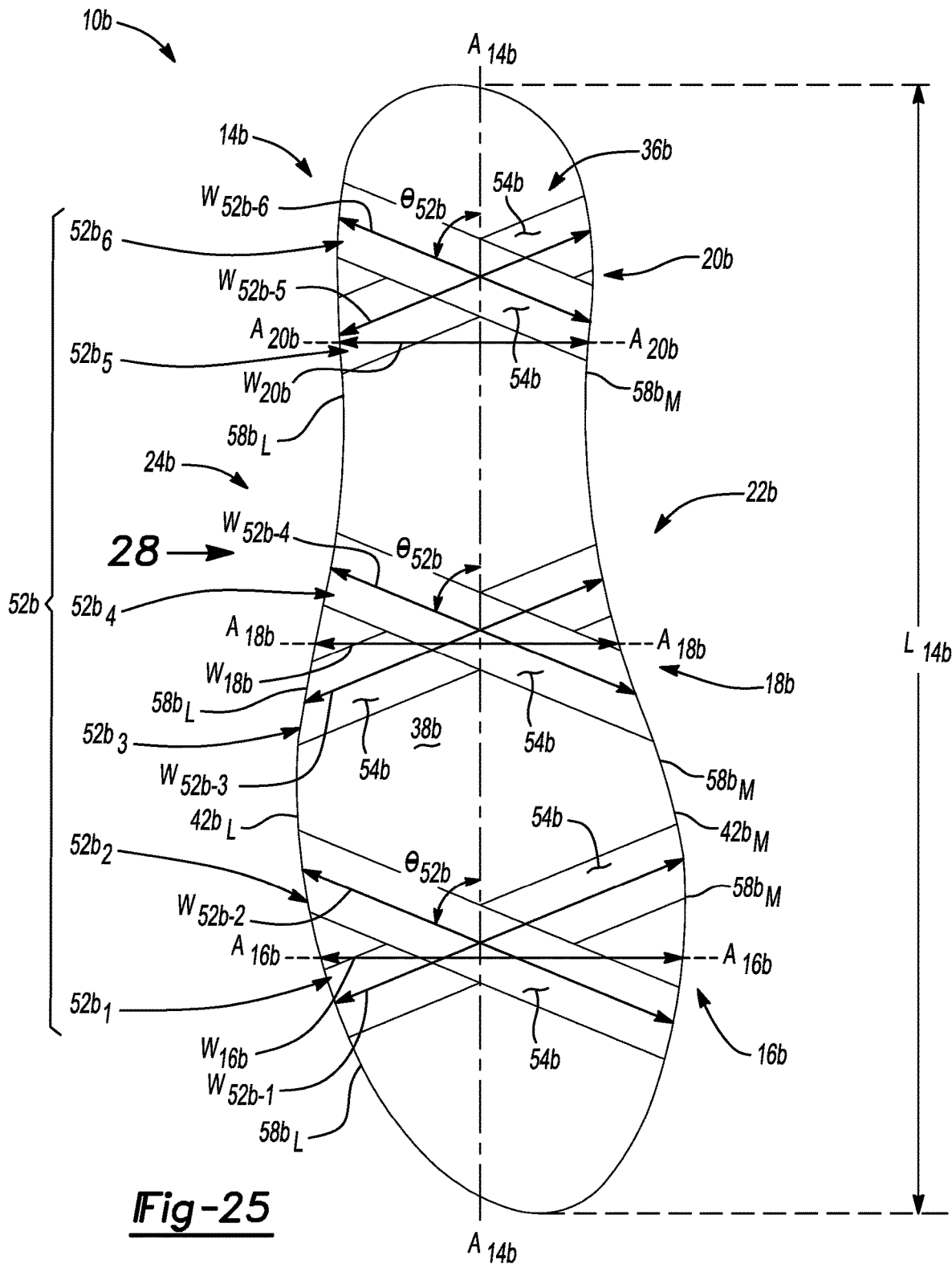
FIG. 25 is an exemplary top view of the article of footwear according to arrow 25 of FIG. 24.

As shown in FIGS. 24-25, the article of footwear 10b further includes one or more strips of material 52b. In an example, the one or more strips of material 52b may include six strips of material $52b_1$-$52b_6$. In an example, the six strips of material $52b_1$-$52b_6$ may be grouped into three pairs of strips of material defined by first and second strips of material $52b_1$-$52b_2$, third and fourth strips of material $52b_3$-$52b_4$ and fifth and sixth strips of material $52b_5$-$52b_6$. As shown in FIG. 25, the strips of material defining each pair of strips of material $52b_1$-$52b_2$, $52b_3$-$52b_4$ and $52b_5$-$52b_6$ are arranged in an overlapping or "crisscross" pattern forming an "X" configuration. Although the overlapping or "crisscross" pattern forming an "X" configuration are defined by two strips of material, in another implementation, the "crisscross" pattern forming an "X" configuration may be formed from one unit of material that is stamped, shaped, cut or otherwise formed to define the "crisscross" pattern forming an "X" configuration (i.e., each "crisscross" pattern forming an "X" configuration may be defined by one unit of material and not two strips of material).

Figure 26:
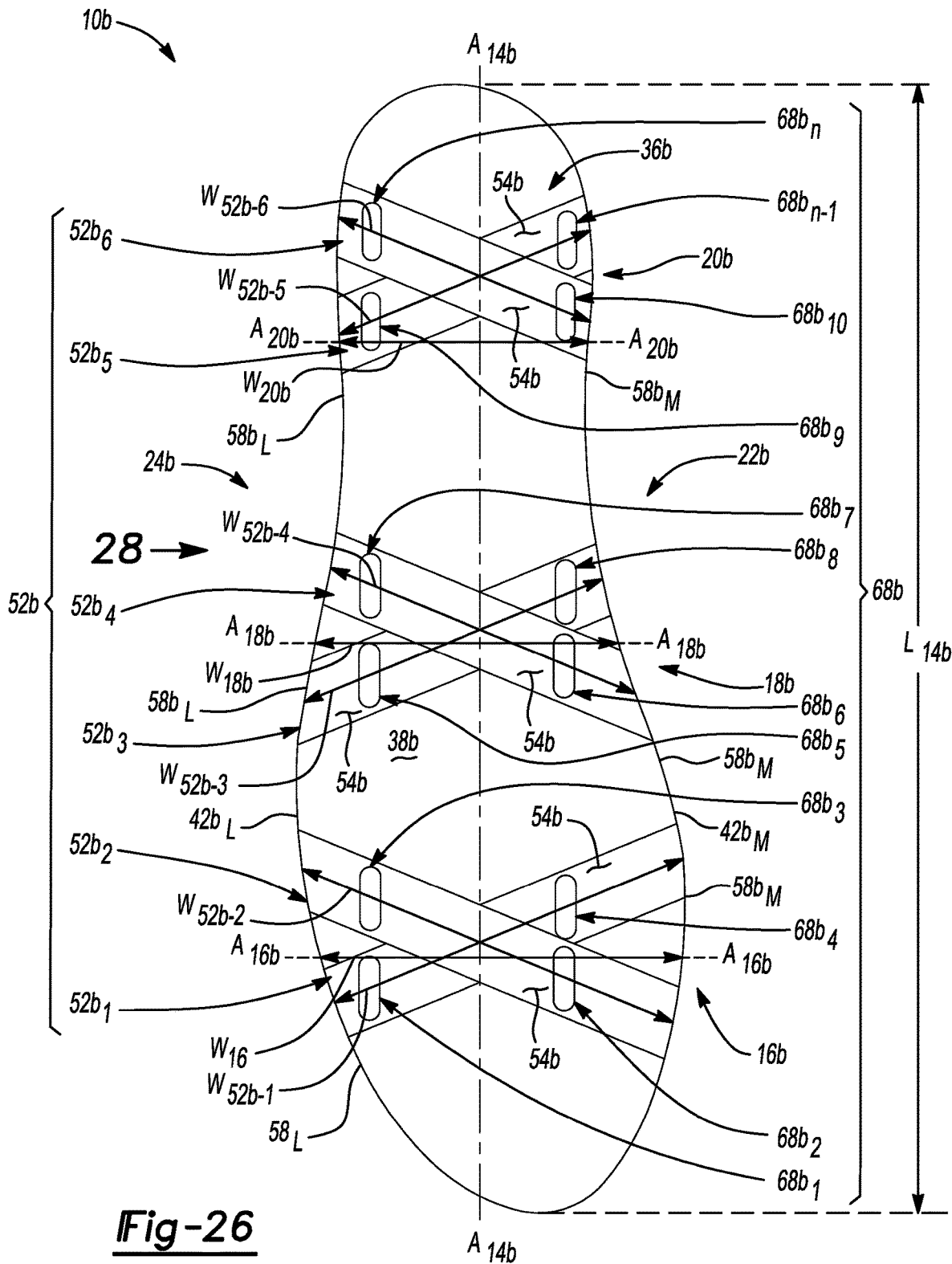
FIG. 26 is an exemplary alternative top view of the article of footwear according to arrow 25 of FIG. 24.
Figure 27:
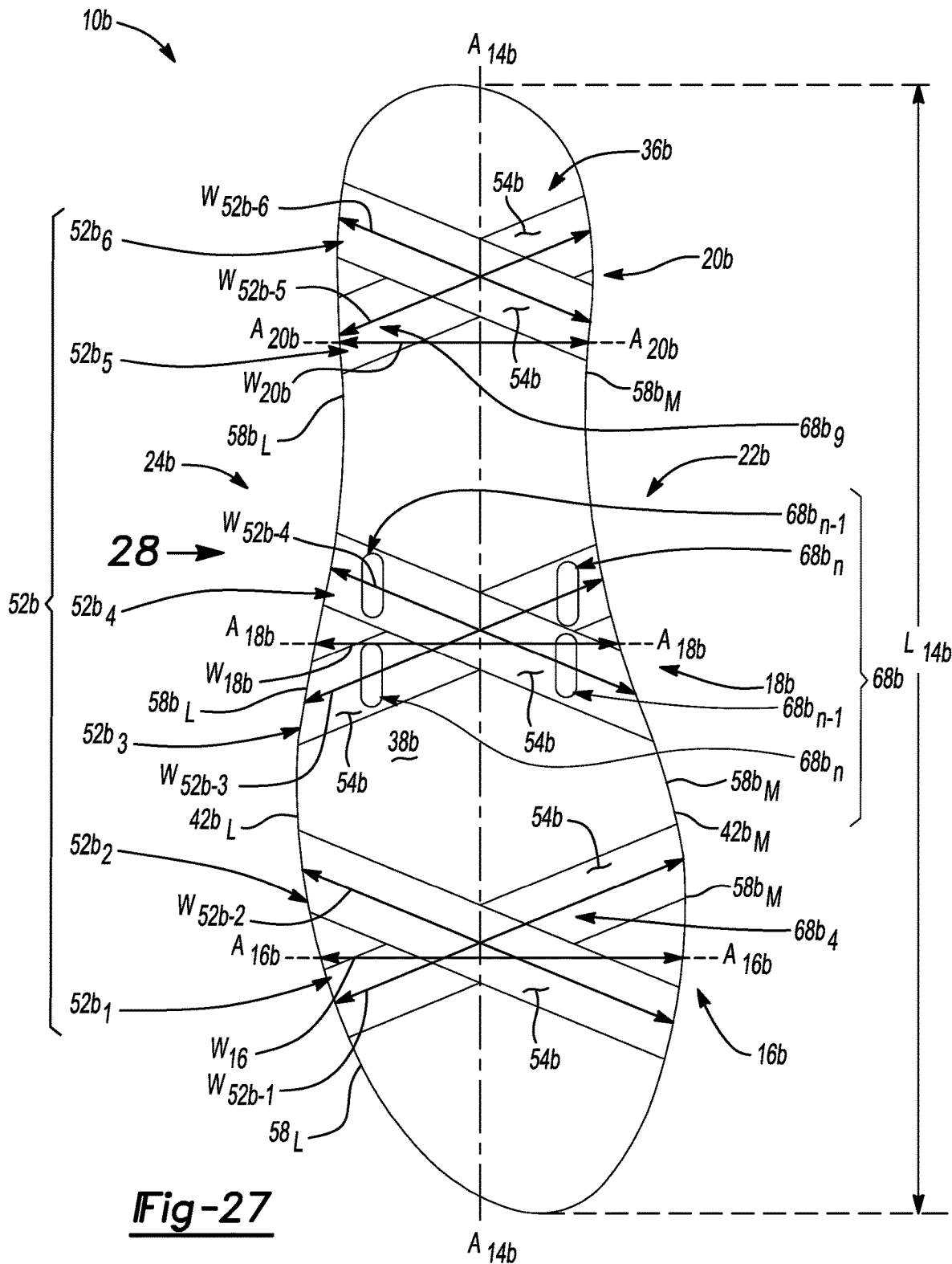
FIG. 27 is another exemplary alternative top view of the article of footwear according to arrow 25 of FIG. 24.

With reference to FIGS. 25, 26 and 27, if the one or more strips of material 52b includes, for example, six strips of material $52b_1$-$52b_6$, in some instances the one or more strips of material 52b may be arranged as follows: (1) a width ($W_{52b\text{-}1}$) of the first strip of material $52b_1$ and the second strip of material $52b_2$ extends across a width ($W_{16b}$) of the forefoot region 16b of the article of footwear 10b from the medial side 22b to the lateral side 24b of the article of footwear 10b, (2) a width ($W_{52b\text{-}2}$) of the third strip of material $52_3$ and the fourth strip of material $52b_4$ extends across a width ($W_{18b}$) of the midfoot region 18b of the article of footwear 10b from the medial side 22b to the lateral side 24b of the article of footwear 10b, and (3) a width ($W_{52b\text{-}1}$) of the fifth strip of material $52b_5$ and the sixth strip of material $52b_6$ extends across a width ($W_{20b}$) of the heel region 20b of the article of footwear 10b from the medial side 22b to the lateral side 24b of the article of footwear 10b. As shown in FIGS. 25, 26 and 27, the width ($W_{52b\text{-}1}$), ($W_{52b\text{-}2}$), ($W_{52b\text{-}3}$) of each strip of material $52b_1$-$52b_6$ of the one or more strips of material 52b extends substantially non-perpendicularly $\theta_{52b}$ with respect to respective axes $A_{16b}$-$A_{16b}$, $A_{18b}$-$A_{18b}$, $A_{20b}$-$A_{20b}$, corresponding to the widths ($W_{16a}$, $W_{18a}$, $W_{20a}$) of the forefoot region 16a, the midfoot region 18a and the heel region 20a of the article of footwear 10a with respect to an axis $A_{14a}$-$A_{14a}$ extending along the length ($L_{14a}$) of the sole structure 14a.

Referring back to FIG. 24, each strip of material $52b_1$-$52b_6$ of the one or more strips of material 52b includes a top surface 54b, a bottom surface 56b and a sidewall surface 58b extending between the top surface 54b and the bottom surface 56b. The sidewall surface 58b may define a thickness ($T_{52b}$) of each strip of material $52b_1$-$52b_6$ of the one or more strips of material 52b extending between the top surface 54b and the bottom surface 56b.

In an example, each strip of material $52b_1$-$52b_6$ of the one or more strips of material 52b is formed from a flexible material. Each strip of material $52b_1$-$52b_6$ of the one or more strips of material 52b may include a fabric material, a woven textile (see, e.g., enlarged view of the each strip of material 52b in FIG. 24), or a knitted textile (see, e.g., enlarged view of the each strip of material 52b in FIG. 24). In some instances, each strip of material $52b_1$-$52b_6$ of the one or more strips of material 52b is porous. Each strip of material $52b_1$-$52b_6$ of the one or more strips of material 52b may be formed from a polymeric material such as, for example, a thermoplastic polymeric material. An exemplary thermoplastic polymeric material may include, for example, a thermoset polymeric material or the like. In some examples, each strip of material $52b_1$-$52b_6$ of the one or more strips of material 52b may be a thermoformable material. In some examples, if each strip of material 52b is a woven or knit structure (as seen in, e.g., the enlarged view of FIG. 24), the woven or knit structure may be formed from a polyester yarn. Furthermore, in other examples, if each strip of material 52b is a woven or knit structure (as seen in, e.g., the enlarged view of FIG. 24), each passage or aperture formed by overlapping members defining the woven or knit structure of each strip of material 52b may be at least 0.5 mm in length in a largest dimension or at least 1.0 mm in length in a largest dimension. Furthermore, each passage or aperture formed by overlapping members defining the woven or knit structure of each strip of material 52b may permit one or both of the first midsole portion 36b and the second midsole portion 44b to directly contact one another. In other implementations, one or both of the first midsole portion 36b and the second midsole portion 44b may be injection molded around or through each passage or aperture formed by overlapping members defining the woven or knit structure of each strip of material 52b.

In some instances, each strip of material $52b_1$-$52b_6$ of the one or more strips of material 52b is an embroidered textile. In some examples, each strip of material $52b_1$-$52b_6$ of the one or more strips of material 52b has one or more first regions including embroidery and one or more second regions without embroidery or with a lower percentage of embroidered surface area as comparted to the one or more first regions. The embroidery can provide reduced stretch or a "lock down" feature to areas of each strip of material $52b_1$-$52b_6$ of the one or more strips of material 52b. Such areas of each strip of material $52b_1$-$52b_6$ of the one or more strips of material 52b provide a reduced stretch quality may be located, for example, at a region of each strip of material $52b_1$-$52b_6$ of the one or more strips of material 52b that is arranged between the first midsole portion 36b and the second midsole portion 44b, or, alternatively at a region that extends beyond the sidewall surface 58b of each strip of material $52b_1$-$52b_6$ of the one or more strips of material 52b.

Figure 33:
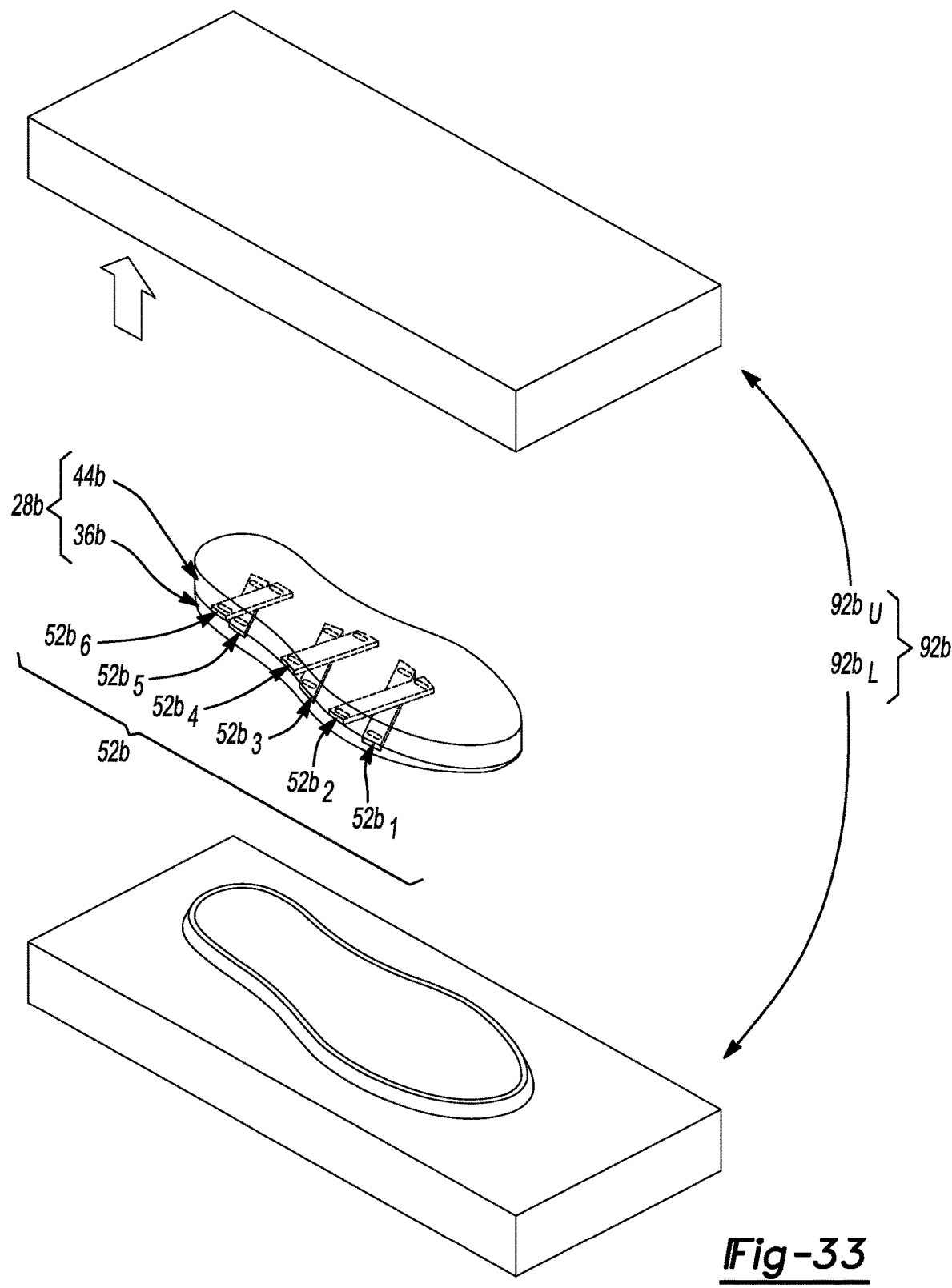
FIG. 33 is a further perspective view of the mold tool and the portion of the article of footwear of FIG. 32 arranged in an assembled state.

With reference to FIG. 24, the first midsole portion 36b is disposed between the outsole 26b and the upper 12b. When the sole structure 14b is attached to the upper 12b as shown in FIG. 23, the second midsole portion 44b is disposed between the first midsole portion 36b and the upper 12b. As shown in FIGS. 24 and 33, each strip of material $52b_1$-$52b_6$ of the one or more strips of material 52b is disposed between the first midsole portion 36b and the second midsole portion 44b. The bottom surface 56b of each strip of material $52b_1$-$52b_6$ of the one or more strips of material 52b extends across the top surface 38b of the first midsole portion 36b. The top surface 54b of each strip of material $52b_1$-$52b_6$ of the one or more strips of material 52b extends across the bottom surface 48b of the second midsole portion 44b.

As shown in FIG. 24, the sidewall surface 58b of each strip of material $52b_1$-$52b_6$ of the one or more strips of material 52b may be further defined by a medial sidewall surface portion $58b_M$ and a lateral sidewall surface portion $58b_L$. The width ($W_{52b\text{-}1}$, $W_{52b\text{-}2}$, $W_{52b\text{-}3}$) of each strip of material $52b_1$-$52b_6$ of the one or more strips of material 52b extends between the medial sidewall surface portion $58b_M$ and the lateral sidewall surface portion $58b_L$ of each strip of material $52b_1$-$52b_6$ of the one or more strips of material $52_b$. Furthermore, the sidewall surface 42b, 50b of each of the first midsole portion 36b and the second midsole portion 44b may be further defined by a medial sidewall surface portion $42b_M$, $50b_M$ and a lateral sidewall surface portion $42b_L$, $50b_L$ that respectively define a width ($W_{36b}$, $W_{44b}$) of each of the first midsole portion 36b and the second midsole portion 44b. The width ($W_{36b}$, $W_{44b}$) of each of the first midsole portion 36b and the second midsole portion 44b correspondingly varies and defines, for example, the widths ($W_{16b}$, $W_{18b}$, $W_{20b}$) of the forefoot region 16b, the midfoot region 18b and the heel region 20b of the sole structure 14b of the article of footwear 10b.

Figure 28:
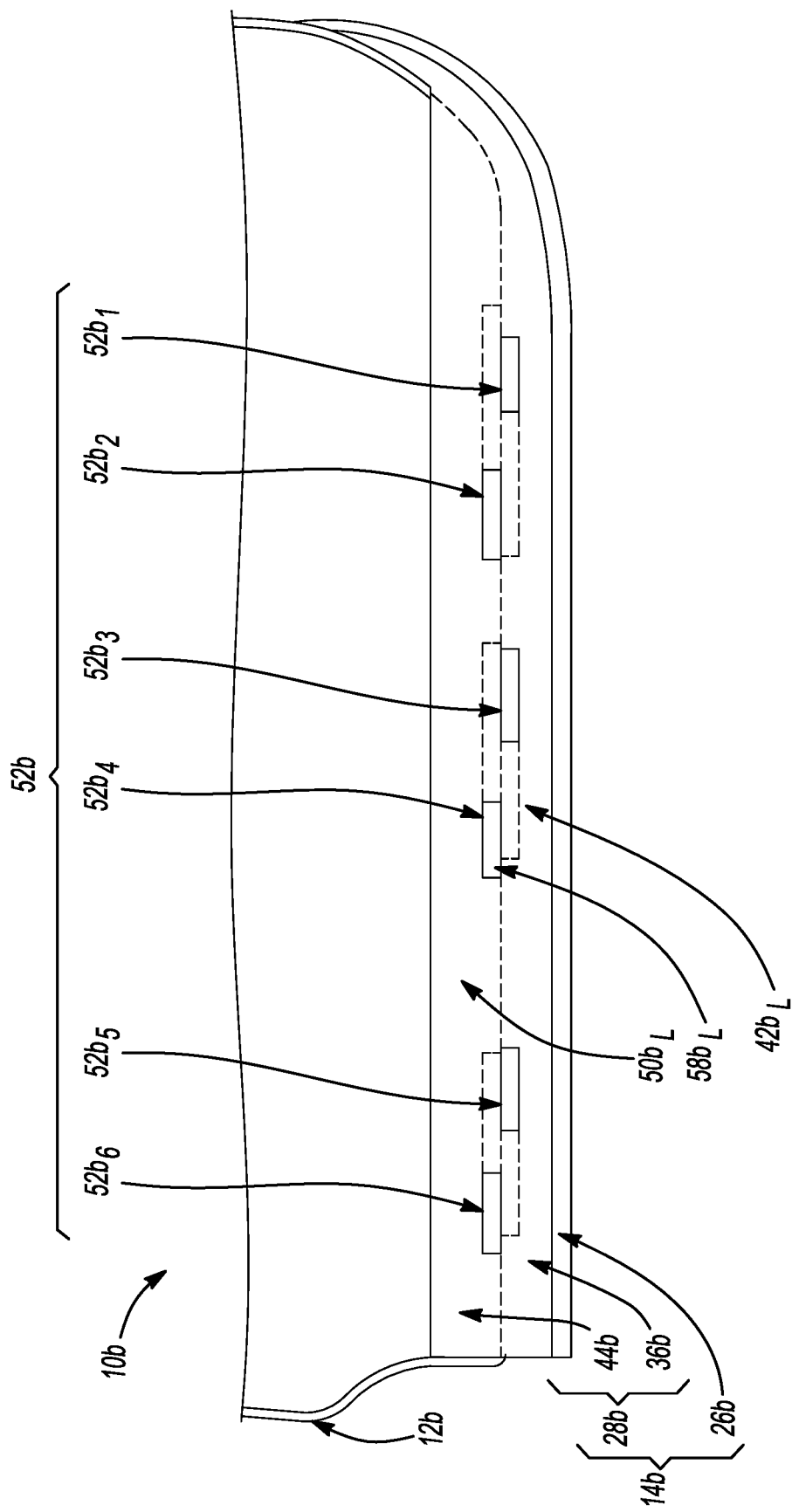
FIG. 28 is an exemplary partial side view of the article of footwear according to arrow 28 of any of FIG. 25, 26 or 27.

With reference to FIG. 24 and FIGS. 28, 29, 30 and 31, the width $W_{52b\text{-}1}$), $W_{52b\text{-}2}$), $W_{52b\text{-}3}$) extending between the medial sidewall surface portion $58b_M$ and the lateral sidewall surface portion $58b_L$ of each strip of material $52b_1$-$52b_6$ of the one or more strips of material 52b may be selectively sized with respect to the width ($W_{36b}$, $W_{44b}$) of each of the first midsole portion 36b and the second midsole portion 44b. As shown in FIGS. 24, 25 and 28, the width $W_{52b-1}$), $W_{52b-2}$), $W_{52b-3}$) of each strip of material $52b_1$-$52b_6$ of the one or more strips of material 52b is selectively sized such that each of the medial sidewall surface portion $58b_M$ and the lateral sidewall surface portion $58b_L$ of each strip of material $52b_1$-$52b_6$ of the one or more strips of material 52b is respectively aligned with the medial sidewall surface portion $42b_M$, $50b_M$ and the lateral sidewall surface portion $42b_L$, $50b_L$ of each of the first midsole portion 36b and the second midsole portion 44b. As a result of the alignment of the respective medial sidewall surface portions $42b_M$, $50b_M$, $58b_M$ and the lateral sidewall surface portions $42b_L$, $50b_L$, $58b_L$ described above, the medial sidewall surface portion $58b_M$ or the lateral sidewall surface portion $58b_L$ of each strip of material $52b_1$-$52b_6$ of the one or more strips of material 52b is visible when viewing the medial side 22b or the lateral side 24b the of the sole structure 14b.

Figure 29:
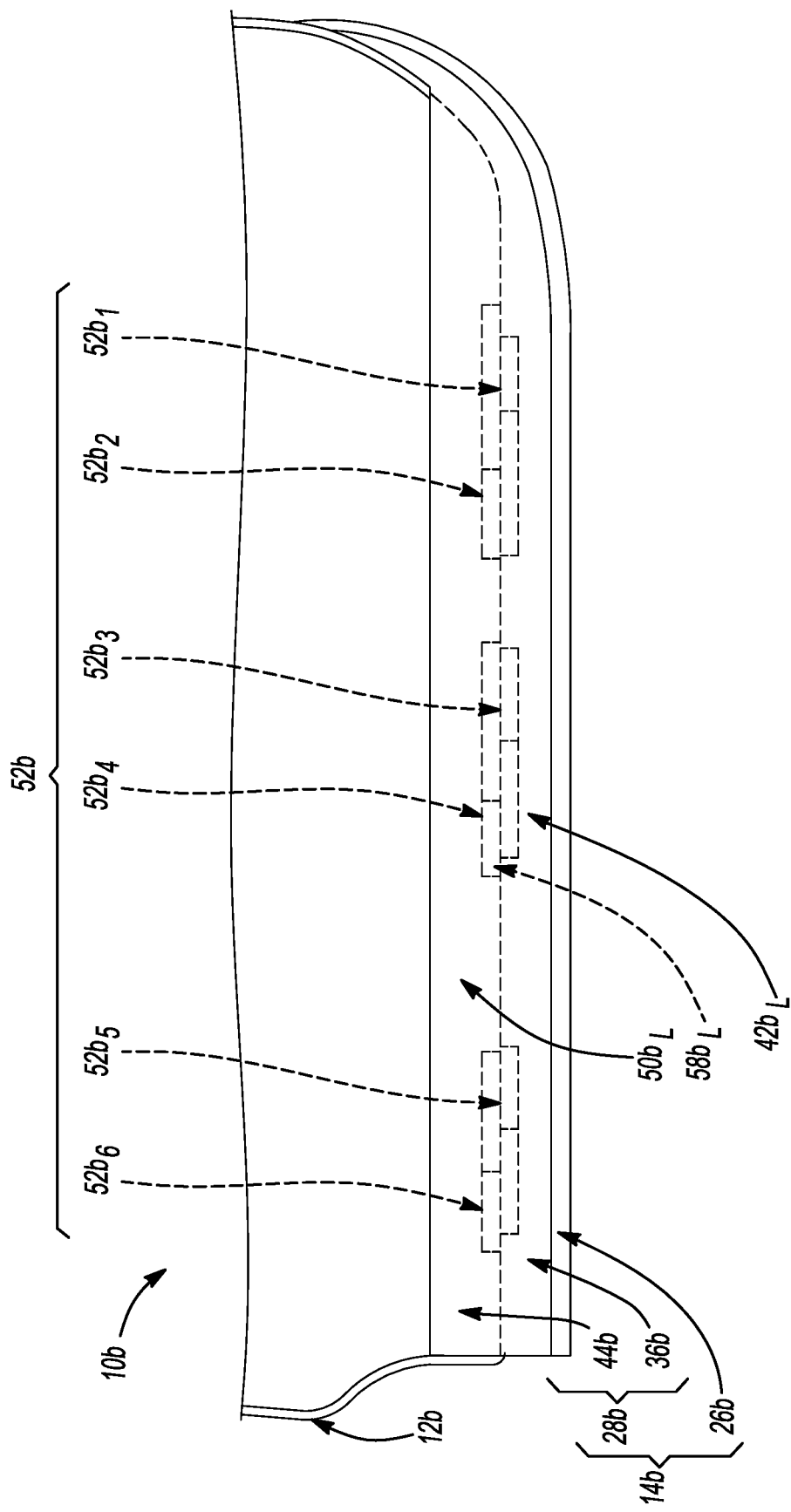
FIG. 29 is an exemplary partial alternative side view of the article of footwear according to arrow 28 of any of FIG. 25, 26 or 27.

In another example as shown in FIG. 29, the width $W_{52b-1}$), $W_{52b-2}$), $W_{52b-3}$) of each strip of material $52b_1$-$52b_6$ of the one or more strips of material 52b is selectively sized such that each of the medial sidewall surface portion $58b_M$ and the lateral sidewall surface portion $58b_L$ of each strip of material $52b_1$-$52b_6$ of the one or more strips of material 52b is not aligned with and does extend beyond the medial sidewall surface portion $42b_M$, $50b_M$ and the lateral sidewall surface portion $42b_L$, $50b_L$ of each of the first midsole portion 36b and the second midsole portion 44b. As a result of the non-alignment of the respective medial sidewall surface portions $42b_M$, $50b_M$, $58b_M$ and the lateral sidewall surface portions $42b_L$, $50b_L$, $58b_L$ described above, the medial sidewall surface portion $58b_M$ or the lateral sidewall surface portion $58b_L$ of each strip of material $52b_1$-$52b_6$ of the one or more strips of material 52b is not visible when viewing the medial side 22b or the lateral side 24b the of the sole structure 14b.

Figure 30:
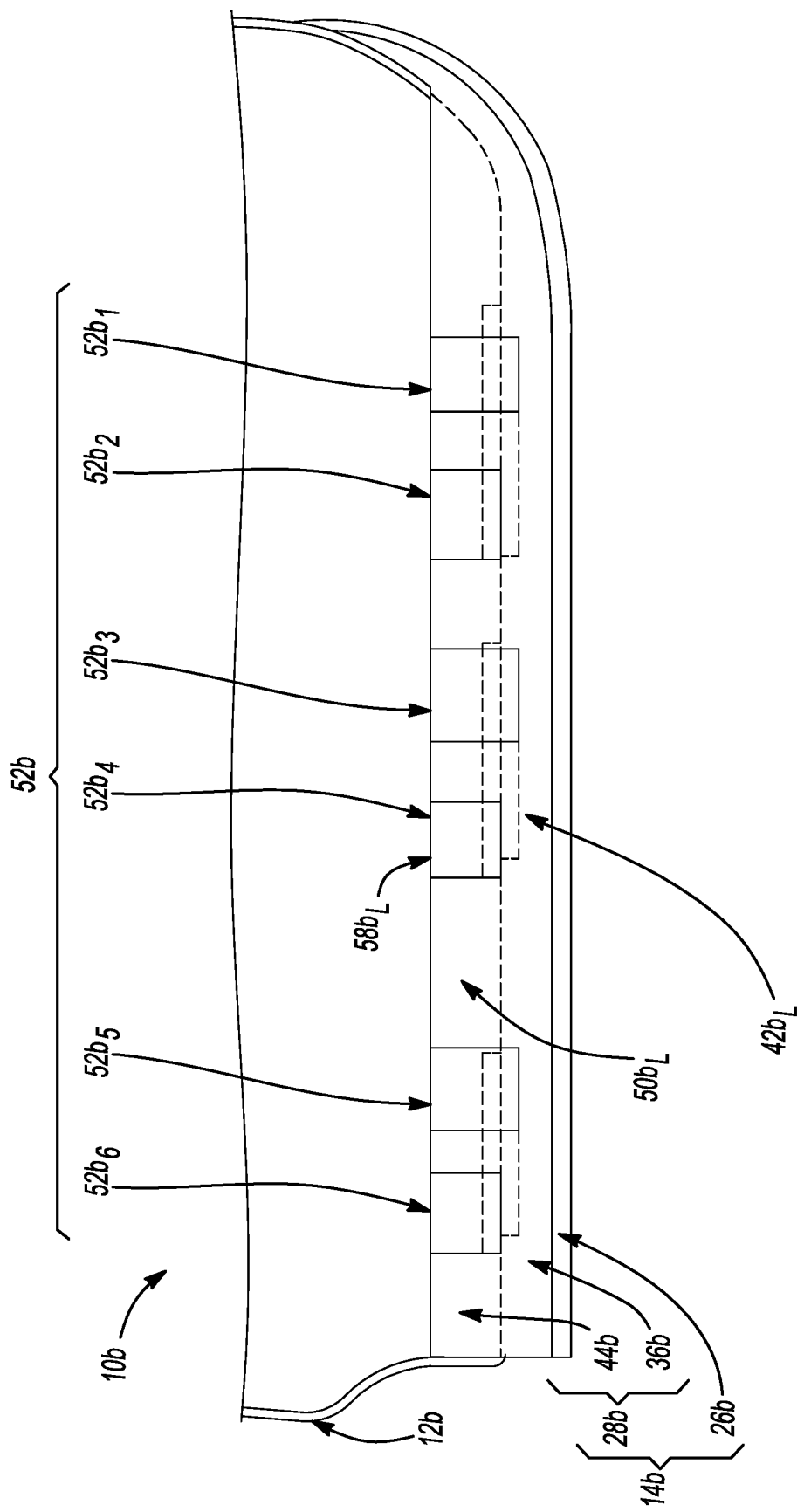
FIG. 30 is another exemplary partial alternative side view of the article of footwear according to arrow 28 of any of FIG. 25, 26 or 27.

In yet another example as shown in FIG. 30, the width $W_{52b-1}$), $W_{52b-2}$), ($W_{52-3}$) of each strip of material $52b_1$-$52b_6$ of the one or more strips of material 52b is selectively sized such that each of the medial sidewall surface portion $58b_M$ and the lateral sidewall surface portion $58b_L$ of each strip of material $52b_1$-$52b_6$ of the one or more strips of material 52b extends beyond the medial sidewall surface portion $42b_M$, $50b_M$ and the lateral sidewall surface portion $42b_L$, $50b_L$ of each of the first midsole portion 36b and the second midsole portion 44b. Therefore, a first portion ($W_{52b-P1}$) of each width ($W_{52b-1}$), $W_{52b-2}$), $W_{52b-3}$) of each strip of material $52b_1$-$52b_6$ of the one or more strips of material 52b extending from of the medial sidewall surface portion $58b_M$ of each strip of material $52b_1$-$52b_6$ of the one or more strips of material 52b and a second portion (not shown) of each width ($W_{52b-1}$), $W_{52b-2}$), $W_{52b-3}$) of each strip of material $52b_1$-$52b_6$ of the one or more strips of material 52b extending from of the lateral sidewall surface portion $58b_L$ of each strip of material $52b_1$-$52b_6$ of the one or more strips of material 52b may respectively extend along and be arranged adjacent, for example, the medial sidewall surface portion $42b_M$, $50b_M$ and the lateral sidewall surface portion $42b_L$, $50b_L$ of each of the first midsole portion 36b and the second midsole portion 44b. However, as shown in FIG. 30, the first portion ($W_{52b-P1}$) of each width $W_{52b-1}$), $W_{52b-2}$), $W_{52b-3}$) of each strip of material $52b_1$-$52b_6$ of the one or more strips of material 52b and the second portion (not shown) of each width ($W_{52b-1}$), $W_{52b-2}$), $W_{52b-3}$) of each strip of material $52b_1$-$52b_6$ of the one or more strips of material 52b do not respectively extend along and are not respectively arranged adjacent the upper 12b of the article of footwear 10b. As a result, the first portion ($W_{52b-P1}$) of each width $W_{52b-1}$), $W_{52b-2}$), $W_{52b-3}$) of each strip of material $52b_1$-$52b_6$ of the one or more strips of material 52b and the second portion (not shown) of each width $W_{52b-1}$), $W_{52b-2}$), $W_{52b-3}$) of each strip of material $52b_1$-$52b_6$ of the one or more strips of material 52b is visible when viewing the medial side 22b or the lateral side 24b the of the sole structure 14b.

Figure 31:
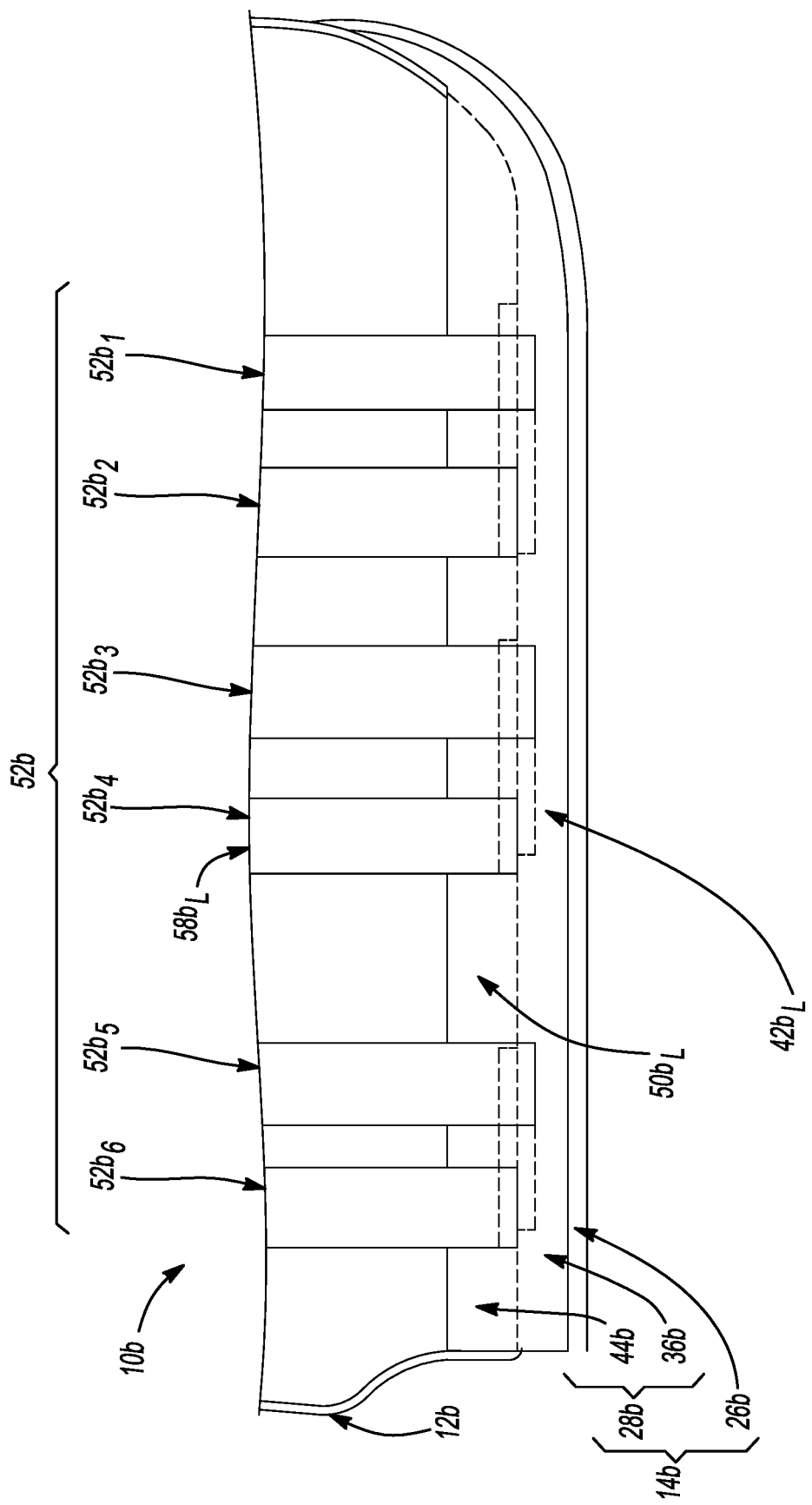
FIG. 31 is yet another exemplary partial alternative side view of the article of footwear according to arrow 28 of any of FIG. 25, 26 or 27.

In another example as shown in FIG. 31, the width $W_{52b-1}$), $W_{52b-2}$), $W_{52b-3}$) of each strip of material $52b_1$-$52b_6$ of the one or more strips of material 52b is selectively sized such that each of the medial sidewall surface portion $58b_M$ and the lateral sidewall surface portion $58b_L$ of each strip of material $52b_1$-$52b_6$ of the one or more strips of material 52b extends beyond the medial sidewall surface portion $42b_M$, $50b_M$ and the lateral sidewall surface portion $42b_L$, $50b_L$ of each of the first midsole portion 36b and the second midsole portion 44b. Therefore, a first portion ($W_{52b-P1}$) of each width $W_{52b-1}$), $W_{52b-2}$), $W_{52b-3}$) of each strip of material $52b_1$-$52b_6$ of the one or more strips of material 52b extending from of the medial sidewall surface portion $58b_M$ of each strip of material $52b_1$-$52b_6$ of the one or more strips of material 52b and a second portion (not shown) of each width ($W_{52b-1}$), $W_{52b-2}$), $W_{52b-3}$) of each strip of material $52b_1$-$52b_6$ of the one or more strips of material 52b extending from of the lateral sidewall surface portion $58b_L$ of each strip of material $52b_1$-$52b_6$ of the one or more strips of material 52b may respectively extend along and be arranged adjacent, for example: (1) the medial sidewall surface portion $42b_M$, $50b_M$ and the lateral sidewall surface portion $42b_L$, $50b_L$ of each of the first midsole portion 36b and the second midsole portion 44b and (2) at least a portion of, respectively, the medial side and the lateral side of the upper 12b. As a result, the first portion ($W_{52b-P1}$) of each width $W_{52b-1}$), $W_{52b-2}$), $W_{52b-3}$) of each strip of material $52b_1$-$52b_6$ of the one or more strips of material 52b and the second portion (not shown) of each width ($W_{52b-1}$), $W_{52b-2}$), $W_{52b-3}$) of each strip of material $52b_1$-$52b_6$ of the one or more strips of material 52b is visible when viewing the medial side 22b or the lateral side 24b the of the sole structure 14b.

With reference to FIGS. 26 and 27, one or more regions of at least one strip $52b_1$-$52b_6$ (see, e.g., all of the strips $52b_1$-$52b_6$ in FIG. 26 or two strips $52b_3$-$52b_4$ in FIG. 27) of the one or more strips of material 52b may further define at least one passage or aperture 68b or absence of at least one strip $52b_1$-$52b_6$ of the one or more strips of material 52b. The at least one passage 68b extends through the thickness ($T_{52b}$) of the at least one strip $52b_1$-$52b_6$ of the one or more strips of material 52b between the top surface 54b and the bottom surface 56b. If a polymeric material defines one or both of the first midsole portion 36b and the second midsole portion 44b, the polymeric material may be molded around any surface defining the at least one strip $52b_1$-$52b_6$ of the one or more strips of material 52b and/or through at least one passage 68b extends through the thickness ($T_{52b}$) of the at least one strip $52b_1$-$52b_6$ of the one or more strips of material 52b.

The at least one passage 68b may include a plurality of passages or apertures $68b_1$-$68b_n$. For example, the at least one passage 68b may include a first passage $68b_1$, a last passage $68b_n$ and one or more intermediate passages $68b_2$-$68b_{n-1}$. In an example, as shown in FIG. 26, the plurality of passages $68b_1$-$68b_n$ may be arranged in any desirable pattern (e.g., in: (1) a row-and-column grid, (2) staggered rows and columns, or (3) a random pattern) such that the plurality of passages or apertures $68b_1$-$68b_n$ are arranged between the forefoot region 16b and the heel region 20b of the sole structure $14b$ (i.e., across substantially most or all of the length ($L_{14b}$) of the sole structure $14b$) and between the medial side $22b$ and the lateral side $24b$ of the article of footwear $10b$ (i.e., across the width ($W_{14b}$) of the sole structure $14b$). In other implementations, the plurality of passages $68b_1$-$68b_n$ may be arranged in a pattern (e.g., in: (1) a row-and-column grid, (2) staggered rows and columns, or (3) a random pattern) that does not extend across the forefoot region $16b$ and the heel region $20b$ of the sole structure $14b$ or between the medial side $22b$ and the lateral side $24b$ of the article of footwear $10b$. Although the plurality of passages $68b_1$-$68b_n$ may extend across substantially most or all of the length ($L_{14b}$) of the sole structure $14b$ as described above, the plurality of passages $68b_1$-$68b_n$ may be arranged in a pattern (e.g., in: (1) a row-and-column grid, (2) staggered rows and columns, or (3) a random pattern) extending across: (1) some or all of the heel region $20b$ of the sole structure $14b$ but not the forefoot region $16b$ or the midfoot region $18b$ of the sole structure $14b$, (2) some or all of the forefoot region $16b$ of the sole structure $14b$ but not the midfoot region $18b$ or the heel region $20b$ of the sole structure $14b$ (3) some or all of the forefoot region $16b$ and the heel region $20b$ of the sole structure $14b$ but not the midfoot region $18b$ of the sole structure $14b$ or (4) as shown in FIG. 27, some or all of the midfoot region $18b$ but not the forefoot region $16b$ and the heel region $20b$.

With continued reference to FIGS. 26 and 27, each passage of the plurality of passages $68b_1$-$68b_n$ is shown being defined by a substantially circular or oval shape having any dimension or diameter ($D_{68b}$). In some examples, the dimension or diameter ($D_{68b}$) may be approximately equal to about 0.5 mm or about 3.0 mm. In other examples, the dimension or diameter ($D_{68b}$) may be between approximately 0.5 mm and approximately 3.0 mm. Furthermore, each passage of the plurality of passages $68b_1$-$68b_n$ define a substantially similar dimension or diameter ($D_{68b}$). Although each passage of the plurality of passages $68b_1$-$68b_n$ may define a substantially similar sized or shaped dimension or diameter $D_{68b}$), implementations of the at least one strip $52b_1$-$52b_6$ of the one or more strips of material $52b$ may include at least one passage of the plurality of passages $68b_1$-$68b_n$ having a different sized or shaped dimension or diameter ($D_{68b}$). For example, at least one passage of the plurality of passages $68b_1$-$68b_n$ may have a different sized or shaped dimension or diameter ($D_{68b}$) than another passage of the plurality of passages $68b_1$-$68b_n$ in the heel region $20b$ of the sole structure $14b$, the forefoot region $16b$ of the sole structure $14b$, the midfoot region $18b$ of the sole structure $14b$ or the forefoot region $16b$ and the heel region $20b$ of the sole structure $14b$.

With reference to FIG. 24, the top surface $38b$ of the first midsole portion $36b$ may further define at least one second midsole contacting region $70b$ and at least one strip of material contacting region $72b$. The bottom surface $48b$ of the second midsole portion $44b$ may further define at least one first midsole contacting region $74b$ and at least one strip of material contacting region $76b$.

Each of the at least one second midsole contacting region $70b$ of the first midsole portion $36b$ and the at least one first midsole contacting region $74b$ of the second midsole portion $44b$ may define a size or shape that generally corresponds to a size or shape of the at least one passage $68b$ of the at least one strip $52b_1$-$52b_6$ of the one or more strips of material $52b$. If the at least one passage $68b$ of the at least one strip $52b_1$-$52b_6$ of the one or more strips of material $52b$ defines a plurality of passages $68b_1$-$68b_n$, each of the at least one second midsole contacting region $70b$ of the first midsole portion $36b$ and the at least one first midsole contacting region $74b$ of the second midsole portion $44b$ may define a corresponding plurality of second midsole contacting regions $70b_1$-$70b_n$ and a plurality of first midsole contacting regions $74b_1$-$74b_n$. Furthermore, each passage and contacting region of the plurality of passages $68b_1$-$68b_n$ may be respectively axially aligned with one of the plurality of second midsole contacting regions $70b_1$-$70b_n$ and one of the plurality of first midsole contacting regions $74b_1$-$74b_n$.

In an example, when the article of footwear $10b$ is formed, surfaces of the outsole $26b$, the first midsole portion $36b$, the second midsole portion $44b$ and each strip of material $52b_1$-$52b_6$ of the one or more strips of material $52b$ may be arranged near, proximate, spaced-apart-from or adjacent one another. For example, the at least one strip of material contacting region $72b$ of the top surface $38b$ of the first midsole portion $36b$ may be disposed adjacent the bottom surface $56b$ of each strip of material $52b_1$-$52b_6$ of the one or more strips of material $52b$, and the at least one strip of material contacting region $76b$ of the bottom surface $48b$ of the second midsole portion $44b$ may be disposed adjacent the top surface $54b$ of each strip of material $52b_1$-$52b_6$ of the one or more strips of material $52b$.

Once each strip of material $52b_1$-$52b_6$ of the one or more strips of material $52b$ is arranged relative to the first midsole portion $36b$ and the second midsole portion $44b$, as described above, each strip of material $52b_1$-$52b_6$ of the one or more strips of material $52b$ may be said to be arranged between the first midsole portion $36b$ and the second midsole portion $44b$. Even though each strip of material $52b_1$-$52b_6$ of the one or more strips of material $52b$ may be disposed between the first midsole portion $36b$ and the second midsole portion $44b$, one or more portions of the first midsole portion $36b$ may be in direct contact with one or more portions of the second midsole portion $44b$ as a result of, for example, one or a combination of (1) a longitudinal spacing between each strip of material $52b_1$-$52b_6$ of the one or more strips of material $52b$ and (2) the formation of the at least one passage $68b$ of at least one strip $52b_1$-$52b_6$ of the one or more strips of material $52b$ such that: (A) portions of the top surface $38b$ of the first midsole portion $36b$ and the bottom surface $48b$ of the second midsole portion $44b$ that are not separated by the one or more strips of material $52b$ may contact one another and (B) at least one second midsole contacting region $70b$ of the top surface $38b$ of the first midsole portion $36b$ may be disposed adjacent the at least one first midsole contacting region $74b$ of the bottom surface $48b$ of the second midsole portion $44b$. After arranging the first midsole portion $36b$ adjacent the second midsole portion $44b$ as described above with respect to each strip of material $52b_1$-$52b_6$ of the one or more strips of material $52b$, the midsole $28b$ defined by the first midsole portion $36b$, the second midsole portion $44b$ and each strip of material $52b_1$-$52b_6$ of the one or more strips of material $52b$ may be arranged in a mold tool $92b$ (see, e.g., FIGS. 32-33) for directly bonding the first midsole portion $36b$ to the second midsole portion $44b$.

The mold tool $92b$ includes an upper mold half $92b_U$ and a lower mold half $92b_L$. Each of the upper mold half $92b_U$ and the lower mold half $92b_L$ may define a mold surface for bonding the first midsole portion $36b$ to the second midsole portion $44b$ under heat and pressure.

Figure 32:
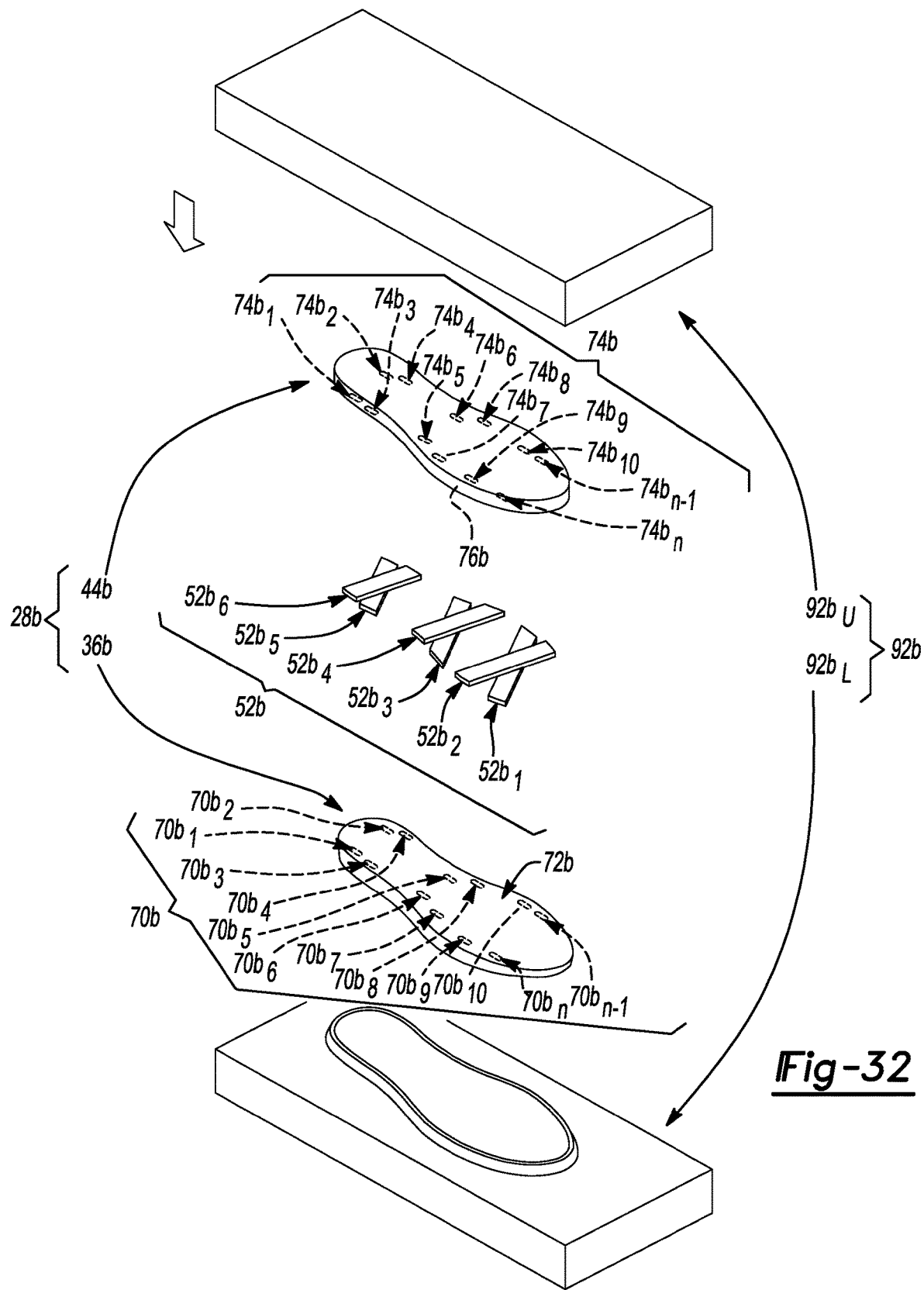
FIG. 32 is a perspective view of an exemplary mold tool and the portion of the article of footwear corresponding to FIG. 24.

As shown in FIG. 32, the mold tool $92b$ is arranged in an open configuration by spacing apart the upper mold half $92b_U$ and the lower mold half $92b_L$ such that the first midsole portion $36b$, the second midsole portion $44b$ and each strip of material $52b_1$-$52b_6$ of the one or more strips of material 52*b* are arranged therebetween. Then, as shown in FIG. 33, after arranging the mold tool 92*b* in a closed configuration for a period of time, the mold tool 92*b* may be returned to the open configuration with the first midsole portion 36*b* bonded to the second midsole portion 44*b* and each strip of material 52$b_1$-52$b_6$ of the one or more strips of material 52*b* secured therebetween.

Thereafter, the midsole-contacting surface 30*b* of the outsole 26*b* may be disposed adjacent the bottom surface 40*b* of the first midsole portion 36*b* for joining the outsole 26*b* to the first midsole portion 36*b*. In an example, the outsole 26*b* may be joined to the first midsole portion 36*b* with an adhesive or by way of a molding tool in a substantially similar manner as described above.

With reference to FIG. 30 or 31, if the width $W_{52b\text{-}1}$, $W_{52b\text{-}2}$, $W_{52b\text{-}3}$) of each strip of material 52$b_1$-52$b_6$ of the one or more strips of material 52*b* is selectively sized such that each of the medial sidewall surface portion 58$b_M$ and the lateral sidewall surface portion 58$b_L$ of each strip of material 52$b_1$-52$b_6$ of the one or more strips of material 52*b* extends beyond the medial sidewall surface portion 42$b_M$, 50$b_M$ and the lateral sidewall surface portion 42$b_L$, 50$b_L$ of each of the first midsole portion 36*b* and the second midsole portion 44*b*, the first portion ($W_{52b\text{-}P1}$) of each width ($W_{52b\text{-}1}$, $W_{52b\text{-}2}$), $W_{52b\text{-}3}$) of each strip of material 52$b_1$-52$b_6$ of the one or more strips of material 52*b* and the second portion (not shown) of each width $W_{52b\text{-}1}$), $W_{52b\text{-}2}$), $W_{52b\text{-}3}$) of each strip of material 52$b_1$-52$b_6$ of the one or more strips of material 52*b* may be respectively folded or extended upwardly adjacent or along, for example: as shown in FIGS. 30 and 31 (1) the medial sidewall surface portion 42$b_M$, 50$b_M$ and the lateral sidewall surface portion 42$b_L$, 50$b_L$ of each of the first midsole portion 36*b* and the second midsole portion 44*b* and, in an alternative embodiment as shown in FIG. 31 but not in FIG. 30 (2) at least a portion of, respectively, the medial side and the lateral side of the upper 12*b*.

Although the mold tool 92*b* may be utilized for joining the first midsole portion 36*b* to the second midsole portion 44*b* under heat and pressure, in some configurations, an optional adhesive (not shown) may also or alternatively be utilized for adhering the first midsole portion 36*b* to the second midsole portion 44*b*. In some instances, the optional adhesive may be provided in the form of a sheet. In other examples, the optional adhesive may conform to any desirable shape, pattern or configuration, such as, for example, the shape, pattern or configuration of the of the at least one passage 68*b* of the at least one strip 52$b_1$-52$b_6$ of the one or more strips of material 52*b*.

In an example, a first optional adhesive may be arranged between the first midsole portion 36*b* and the second midsole portion 44*b*; furthermore, the first optional adhesive may be arranged between the top surface 38*b* of the first midsole portion 36*b* and the bottom surface 56*b* of each strip of material 52$b_1$-52$b_6$ of the one or more strips of material 52*b* such that the first optional adhesive is axially aligned with and radially extends across at least a portion of the shape, pattern or configuration of the of the at least one passage 68*b* of the at least one strip 52$b_1$-52$b_6$ of the one or more strips of material 52*b*. The first optional adhesive adhesively bonds the first midsole portion 36*b*, the second midsole portion 44*b* and each strip of material 52$b_1$-52$b_6$ of the one or more strips of material 52*b* together.

In another example, a second optional adhesive may be arranged between the first midsole portion 36*b* and the second midsole portion 44*b*; furthermore, the second optional adhesive may be arranged between the top surface 54*b* of each strip of material 52$b_1$-52$b_6$ of the one or more strips of material 52*b* and the bottom surface 48*b* of the second midsole portion 44*b* such that the second optional adhesive is axially aligned with and radially extends across at least a portion of the shape, pattern or configuration of the of the at least one passage 68*b* of the at least one strip 52$b_1$-52$b_6$ of the one or more strips of material 52*b*. The second optional adhesive adhesively bonds the first midsole portion 36*b*, the second midsole portion 44*b* and each strip of material 52$b_1$-52$b_6$ of the one or more strips of material 52*b* together.

In yet another example, the first optional adhesive and the second optional adhesive may be arranged between the first midsole portion 36*b* and the second midsole portion 44*b*. The first optional adhesive may be arranged between the top surface 38*b* of the first midsole portion 36*b* and the bottom surface 56*b* of each strip of material 52$b_1$-52$b_6$ of the one or more strips of material 52*b* such that the first optional adhesive is axially aligned with and radially extends across at least a portion of the shape, pattern or configuration of the of the at least one passage 68*b* of the at least one strip 52$b_1$-52$b_6$ of the one or more strips of material 52*b*. The second optional adhesive may be arranged between the top surface 54*b* of each strip of material 52$b_1$-52$b_6$ of the one or more strips of material 52*b* and the bottom surface 48*b* of the second midsole portion 44*b* such that the second optional adhesive is axially aligned with and radially extends across at least a portion of the shape, pattern or configuration of the of the at least one passage 68*b* of the at least one strip 52$b_1$-52$b_6$ of the one or more strips of material 52*b*. The first optional adhesive and the second optional adhesive adhesively bonds the first midsole portion 36*b*, the second midsole portion 44*b* and each strip of material 52$b_1$-52$b_6$ of the one or more strips of material 52*b* together.

Figure 34:
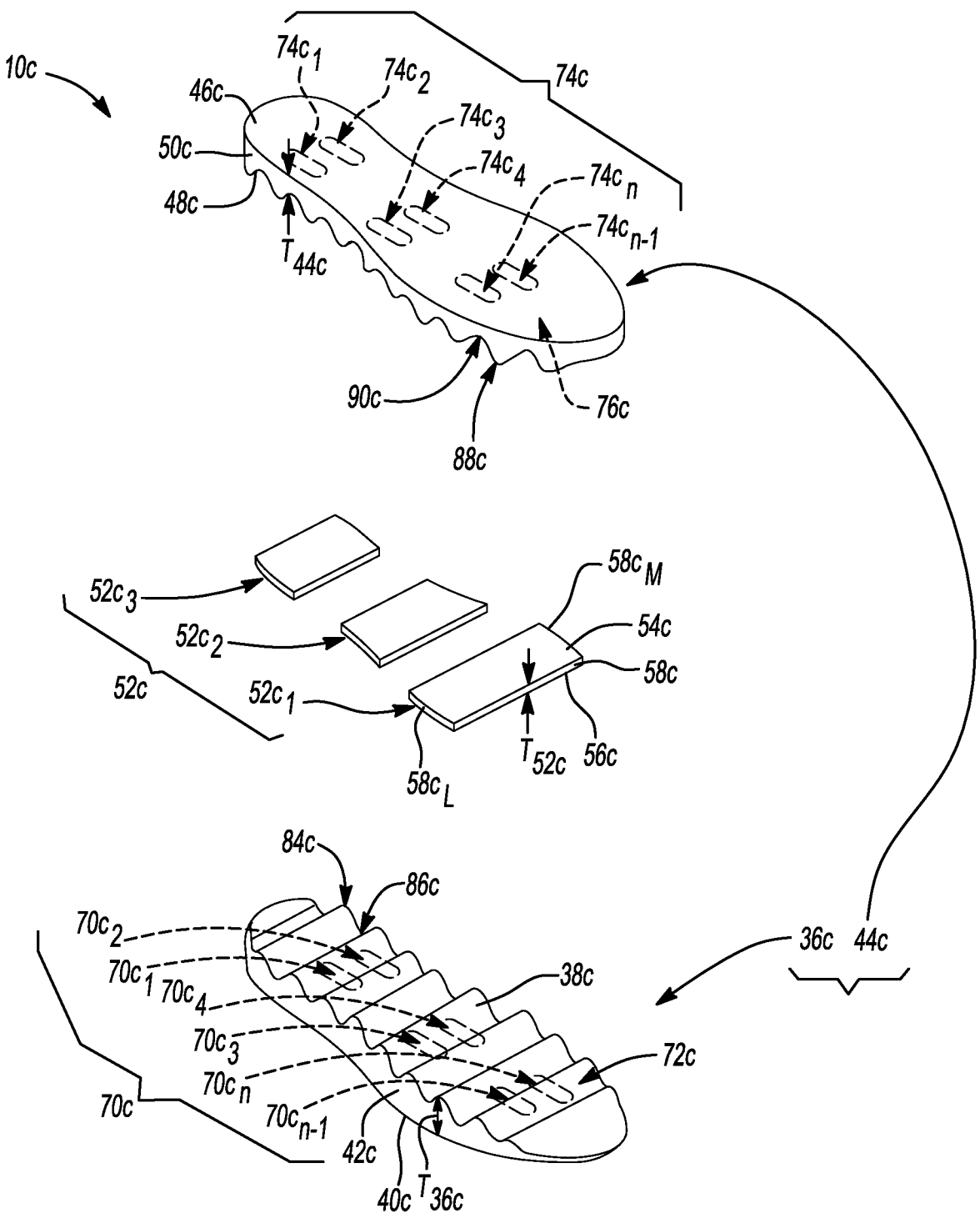
FIG. 34 is a perspective exploded view of an alternative exemplary first midsole portion having a non-flat pattern and an alternative exemplary second midsole portion having a non-flat pattern that may be included in any of the articles of footwear described above at FIGS. 1-33.

Although the top surface 38, 38*a*, 38*b* of the first midsole portion 36, 36*a*, 36*b* and the bottom surface 48, 48*a*, 48*b* of the second midsole portion 44, 44*a*, 44*b* of each of the midsoles 28, 28*a*, 28*b* of the sole structures 14, 14*a* 14*b* have been described above to be substantially flat (e.g., planar) thereby not being interrupted with one or more recesses, trenches, valleys, or other similar features, a non-flat (i.e., non-planar) top surface 38*c* of a first midsole portion 36*c* and a non-flat (i.e., non-planar) bottom surface 48*c* of a second midsole portion 44*c* of an exemplary midsole 28*c* of an exemplary sole structure 14*c* are shown at FIG. 34. In an example, each of the top surface 38*c* of the first midsole portion 36*c* and the bottom surface 48*c* of the second midsole portion 44*c* may respectively generally be defined by one or more peaks 84*c*, 88*c* and recesses, trenches or valleys 86*c*, 90*c* such that each of the top surface 38*c* of the first midsole portion 36*c* and the bottom surface 48*c* of the second midsole portion 44*c* defines a substantially mating sinusoidal pattern extending between the forefoot region 16*c* and the heel region 20*c* of the sole structure 14*c*. Furthermore, in an example, the mating sinusoidal pattern of each of the first midsole portion 36*c* and the second midsole portion 44*c* may be defined by a substantially constant or non-constant amplitude bound by each peak 84*c*, 88*c* and each valley 86*c*, 90*c* across a length ($L_{14c}$) of the sole structure 14*c*. Further, the constant or non-constant amplitude may or may not remain substantially the same as each peak 84*c*, 88*c* extends between the medial side 22*c* and the lateral side 24*c* of the sole structure 14*c*. Yet even further, in an example, the mating sinusoidal pattern of each of the first midsole portion 36*c* and the second midsole portion 44*c* may be defined by a substantially constant or non-constant frequency as the mating sinusoidal pattern extends between the forefoot region $16c$ and the heel region $20c$ of the sole structure $14c$.

Figure 35:
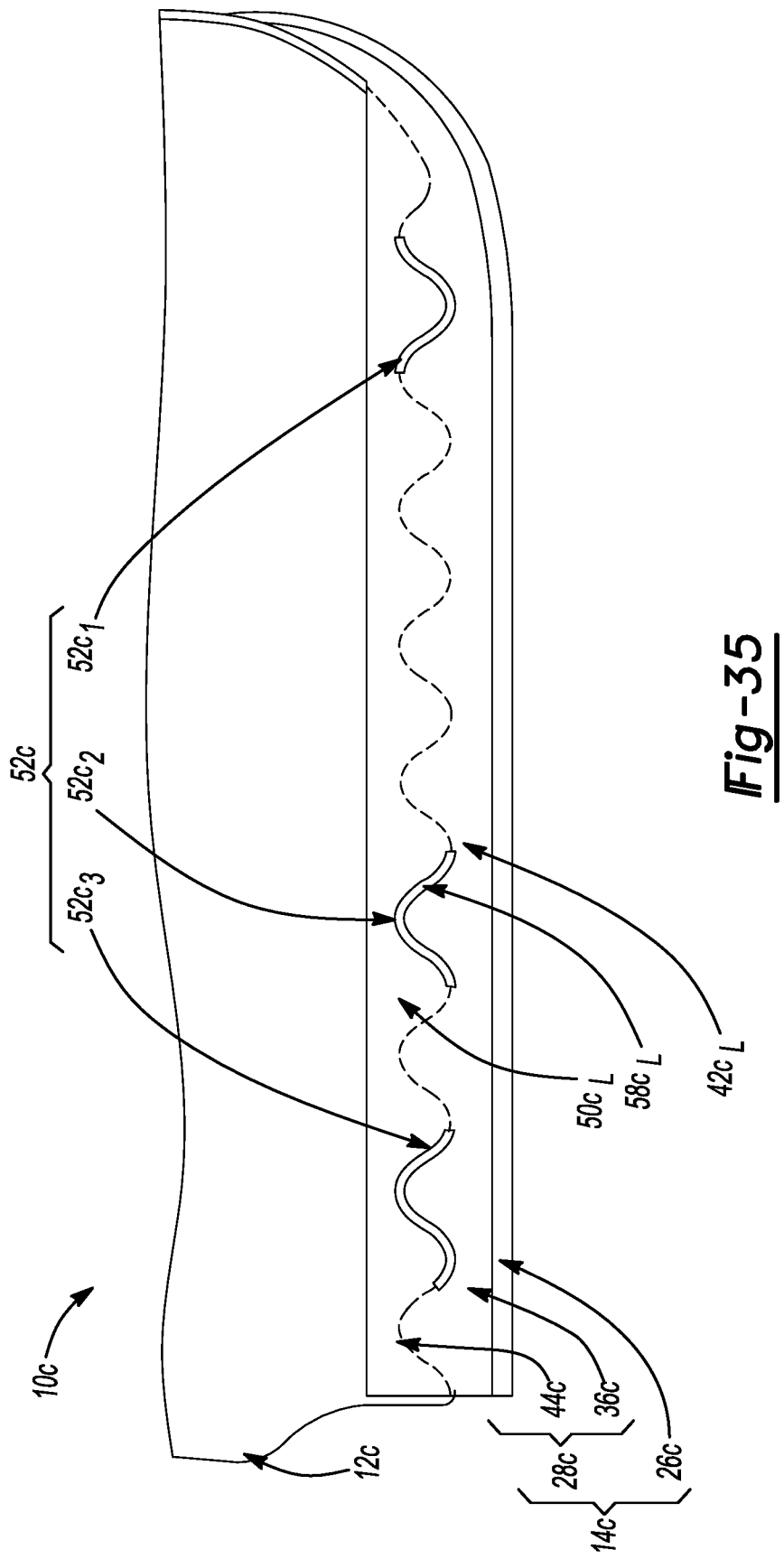
FIG. 35 is an exemplary partial side view of an article of footwear including the first midsole portion and the second midsole portion of FIG. 34.

In an example, the one or more strips of material $52c$ of the sole structure $14c$ of FIG. 35 includes a first strip of material $52c_1$ extending laterally across the forefoot region $16c$ a second strip of material $52c_2$ extending laterally across the midfoot region $18c$ and a third strip of material $52c_3$ extending laterally across the heel region $20c$. Although first, second and third strips of material $52c_1$, $52c_2$, $52c_3$ are shown respectively laterally extending across the forefoot region $16c$, the midfoot region $18c$ and the forefoot region $20c$, the sole structure $14c$ may include any desirable number of strips. For example, the sole structure $14c$ may include for example six strips of material that may be arranged in, for example, a "crisscross" pattern forming an "X" configuration. Furthermore, each strip of material $52c_1$-$52c_3$ of the one or more strips of material $52c$ may extend substantially perpendicularly or non-perpendicularly along/with respective to respective axes corresponding to the widths of the forefoot region $16c$, the midfoot region $18c$ and the heel region $20c$ with respect to an axis $A_{14c}$-$A_{14c}$ extending along the length ($L_{14c}$) of the sole structure $14c$.

With reference to FIG. 35, when the mating sinusoidal top surface $38c$ of the first midsole portion $36c$ and the mating sinusoidal bottom surface $48c$ of the second midsole portion $44c$ are joined together within, for example, a molding tool (as described above at reference numerals 92, $92a$, $92b$), the mating sinusoidal pattern of the top surface $38c$ of the first midsole portion $36c$ and the bottom surface $48c$ of the second midsole portion $44c$ may cause each strip of material $52c_1$-$52c_3$ of the one or more strips of material $52c$ captured between the first midsole portion $36c$ and the second midsole portion $44c$ to be shaped to define a corresponding sinusoidal pattern. In an example, one or both of the mating sinusoidal top surface $38c$ of the first midsole portion $36c$ and the mating sinusoidal bottom surface $48c$ of the second midsole portion $44c$ may shape each strip of material $52c_1$-$52c_3$ of the one or more strips of material $52c$ from, for example, a substantially flat/planar shape defined by each of a top surface $54c$ and a bottom surface $56c$ of each strip of material $52c_1$-$52c_3$ of the one or more strips of material $52c$ to form at least a portion of a non-flat/non-planar mating sinusoidal pattern corresponding to the mating sinusoidal pattern defined by each of the top surface $38c$ of the first midsole portion $36c$ and the bottom surface $48c$ of the second midsole portion $44c$.

In an example, each strip of material $52c_1$-$52c_3$ of the one or more strips of material $52c$ is formed from a flexible material. Each strip of material $52c_1$-$52c_3$ of the one or more strips of material $52c$ may include a fabric material, a woven textile (see, e.g., enlarged view of the each strip of material $52c$ in FIG. 34), or a knitted textile (see, e.g., enlarged view of the each strip of material $52c$ in FIG. 34). In some instances, each strip of material $52c_1$-$52c_3$ of the one or more strips of material $52c$ is porous. Each strip of material $52c_1$-$52c_3$ of the one or more strips of material $52c$ may be formed from a polymeric material such as, for example, a thermoplastic polymeric material. An exemplary thermoplastic polymeric material may include, for example, a thermoset polymeric material or the like. In some examples, each strip of material $52c_1$-$52c_3$ of the one or more strips of material $52c$ may be a thermoformable material. In some examples, if each strip of material $52c$ is a woven or knit structure (as seen in, e.g., the enlarged view of FIG. 34), the woven or knit structure may be formed from a polyester yarn. Furthermore, in other examples, if each strip of material $52c$ is a woven or knit structure (as seen in, e.g., the enlarged view of FIG. 34), each passage or aperture formed by overlapping members defining the woven or knit structure of each strip of material $52c$ may be at least 0.5 mm in length in a largest dimension or at least 1.0 mm in length in a largest dimension. Furthermore, each passage or aperture formed by overlapping members defining the woven or knit structure of each strip of material $52c$ may permit one or both of the first midsole portion $36c$ and the second midsole portion $44c$ to directly contact one another. In other implementations, one or both of the first midsole portion $36c$ and the second midsole portion $44c$ may be injection molded around or through each passage or aperture formed by overlapping members defining the woven or knit structure of each strip of material $52c$.

Figure 36:
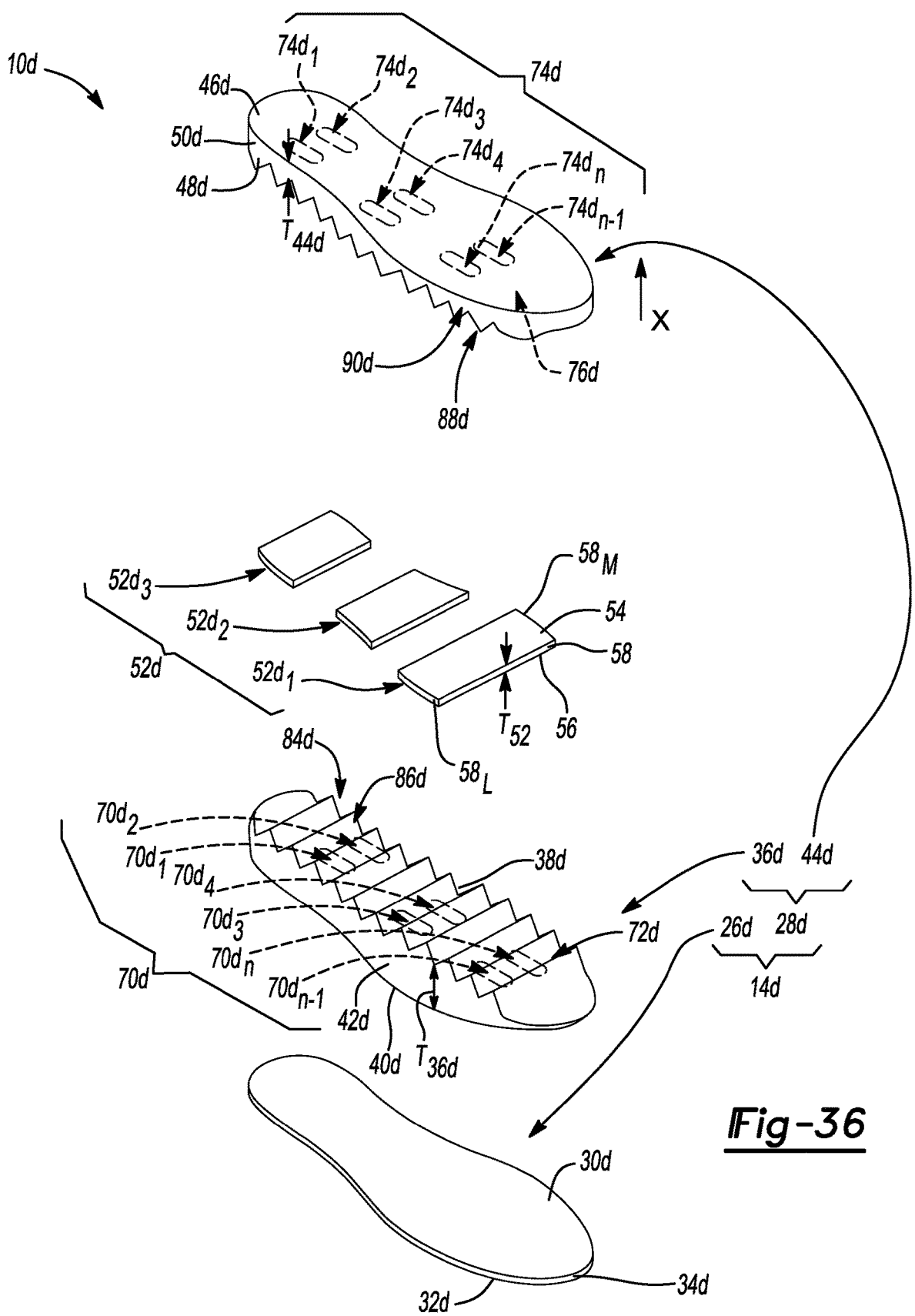
FIG. 36 is a perspective exploded view of another alternative exemplary first midsole portion having a non-flat pattern and another alternative exemplary second midsole portion having a non-flat pattern that may be included in any of the articles of footwear described above at FIGS. 1-33.

Although the top surface 38, $38a$, $38b$ of the first midsole portion 36, $36a$, $36b$ and the bottom surface 48, $48a$, $48b$ of the second midsole portion 44, $44a$, $44b$ of each of the midsoles 28, $28a$, $28b$ of the sole structures 14, $14a$ $14b$ have been described above to be substantially flat (e.g., planar) thereby not being interrupted with one or more recesses, trenches, valleys, or other similar features, a non-flat (i.e., non-planar) top surface $38d$ of a first midsole portion $36d$ and a non-flat (i.e., non-planar) bottom surface $48d$ of a second midsole portion $44d$ of an exemplary midsole $28d$ of an exemplary sole structure $14d$ are shown at FIG. 36. In an example, each of the top surface $38d$ of the first midsole portion $36d$ and the bottom surface $48d$ of the second midsole portion $44d$ may respectively generally be defined by one or more peaks $84d$, $88d$ and recesses, trenches or valleys $86d$, $90d$ such that each of the top surface $38d$ of the first midsole portion $36d$ and the bottom surface $48d$ of the second midsole portion $44d$ defines a substantially mating saw-tooth pattern extending between the forefoot region $16d$ and the heel region $20d$ of the sole structure $14d$. Furthermore, in an example, the mating saw-tooth pattern of each of the first midsole portion $36d$ and the second midsole portion $44d$ may be defined by a substantially constant or non-constant amplitude bound by each peak $84d$, $88d$ and each valley $86d$, $90d$ across a length ($L_{14d}$) of the sole structure $14d$. Further, the constant or non-constant amplitude may or may not remain substantially the same as each peak $84d$, $88d$ extends between the medial side $22d$ and the lateral side $24d$ of the sole structure $14d$. Yet even further, in an example, the mating saw-tooth pattern of each of the first midsole portion $36d$ and the second midsole portion $44d$ may be defined by a substantially constant or non-constant frequency as the mating saw-tooth pattern extends between the forefoot region $16d$ and the heel region $20d$ of the sole structure $14d$.

Figure 37:
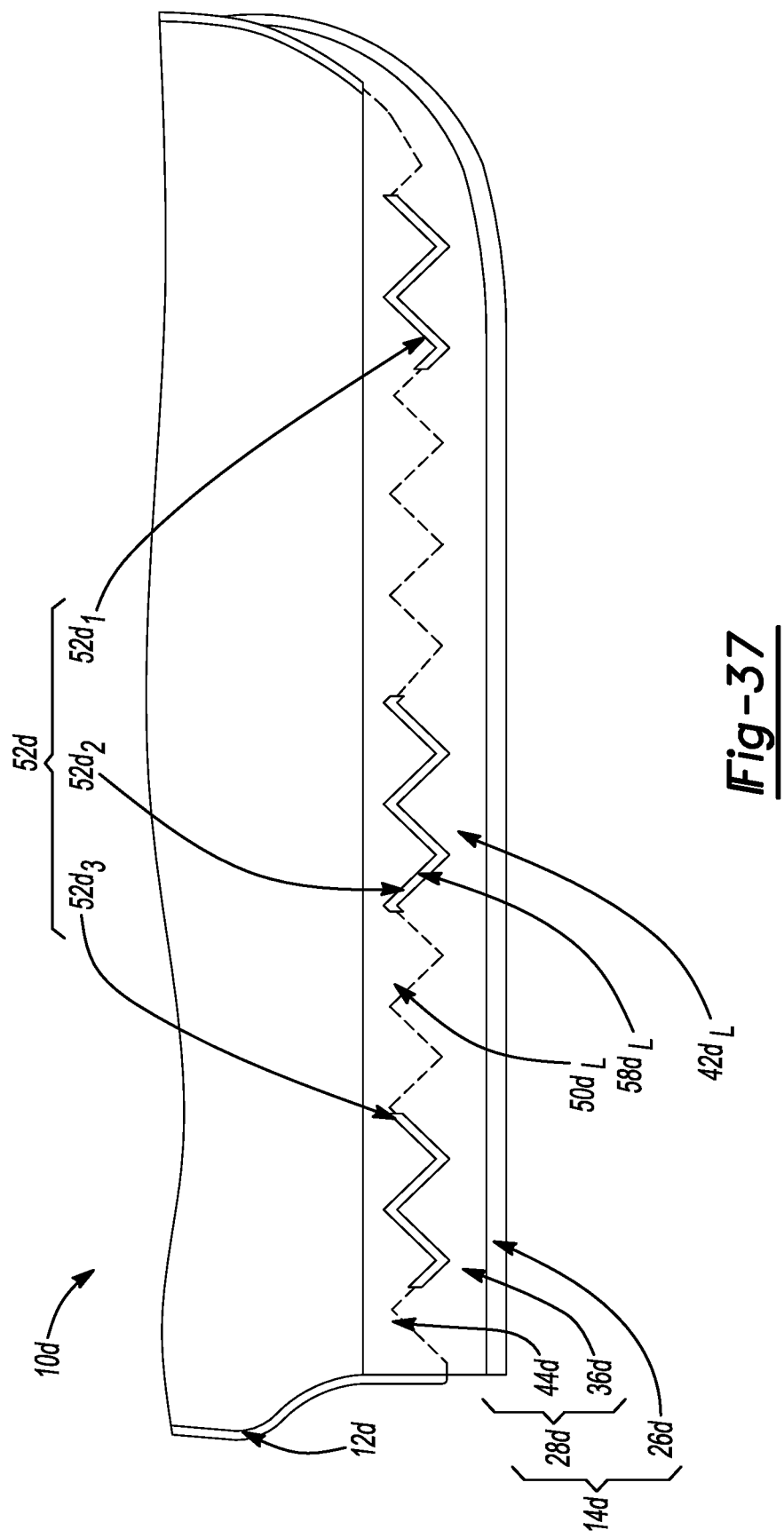
FIG. 37 is an exemplary partial side view of an article of footwear including the first midsole portion and the second midsole portion of FIG. 36.

In an example, the one or more strips of material $52d$ of the sole structure $14d$ of FIG. 37 includes a first strip of material $52d_1$ extending laterally across the forefoot region $16d$ a second strip of material $52d_2$ extending laterally across the midfoot region $18d$ and a third strip of material $52d_3$ extending laterally across the heel region $20d$. Although first, second and third strips of material $52d_1$, $52d_2$, $52d_3$ are shown respectively laterally extending across the forefoot region $16d$, the midfoot region $18d$ and the forefoot region $20d$, the sole structure $14d$ may include any desirable number of strips. For example, the sole structure $14d$ may include six strips of material that may be arranged in, for example, a "crisscross" pattern forming an "X" configuration. Furthermore, each strip of material $52b_1$-$52b_3$ of the one or more strips of material $52d$ may extend substantially perpendicularly or non-perpendicularly along/with respective to respective axes corresponding to the widths of the forefoot region 16d, the midfoot region 18d and the heel region 20d with respect to an axis $A_{14d}$-$A_{14d}$ extending along the length ($L_{14d}$) of the sole structure 14d.

With reference to FIG. 37, when the mating saw-tooth top surface 38d of the first midsole portion 36d and the mating saw-tooth bottom surface 48d of the second midsole portion 44d are joined together within, for example, a molding tool (as described above at reference numerals 92, 92a, 92b), the mating saw-tooth pattern of the top surface 38d of the first midsole portion 36d and the bottom surface 48d of the second midsole portion 44d may cause each strip of material $52d_1$-$52d_3$ of the one or more strips of material 52d captured between the first midsole portion 36d and the second midsole portion 44d to be shaped to define a corresponding sinusoidal pattern. In an example, one or both of the mating saw-tooth top surface 38d of the first midsole portion 36d and the mating saw-tooth bottom surface 48d of the second midsole portion 44d may shape each strip of material $52b_1$-$52b_3$ of the one or more strips of material 52d from, for example, a substantially flat/planar shape defined by each of a top surface 54d and a bottom surface 56d of each strip of material $52b_1$-$52b_3$ of the one or more strips of material 52d to form at least a portion of a non-flat/non-planar mating saw-tooth pattern corresponding to the mating saw-tooth pattern defined by each of the top surface 38d of the first midsole portion 36d and the bottom surface 48d of the second midsole portion 44d.

In an example, each strip of material $52b_1$-$52b_3$ of the one or more strips of material 52d is formed from a flexible material. Each strip of material $52b_1$-$52b_3$ of the one or more strips of material 52d may include a fabric material, a woven textile (see, e.g., enlarged view of the each strip of material 52d in FIG. 36), or a knitted textile (see, e.g., enlarged view of the each strip of material 52d in FIG. 36). In some instances, each strip of material $52b_1$-$52b_3$ of the one or more strips of material 52d is porous. Each strip of material $52b_1$-$52b_3$ of the one or more strips of material 52d may be formed from a polymeric material such as, for example, a thermoplastic polymeric material. An exemplary thermoplastic polymeric material may include, for example, a thermoset polymeric material or the like. In some examples, each strip of material $52d_1$-$52d_3$ of the one or more strips of material 52d may be a thermoformable material. In some examples, if each strip of material 52d is a woven or knit structure (as seen in, e.g., the enlarged view of FIG. 36), the woven or knit structure may be formed from a polyester yarn. Furthermore, in other examples, if each strip of material 52d is a woven or knit structure (as seen in, e.g., the enlarged view of FIG. 36), each passage or aperture formed by overlapping members defining the woven or knit structure of each strip of material 52d may be at least 0.5 mm in length in a largest dimension or at least 1.0 mm in length in a largest dimension. Furthermore, each passage or aperture formed by overlapping members defining the woven or knit structure of each strip of material 52d may permit one or both of the first midsole portion 36d and the second midsole portion 44d to directly contact one another. In other implementations, one or both of the first midsole portion 36d and the second midsole portion 44d may be injection molded around or through each passage or aperture formed by overlapping members defining the woven or knit structure of each strip of material 52d.

Figure 38:
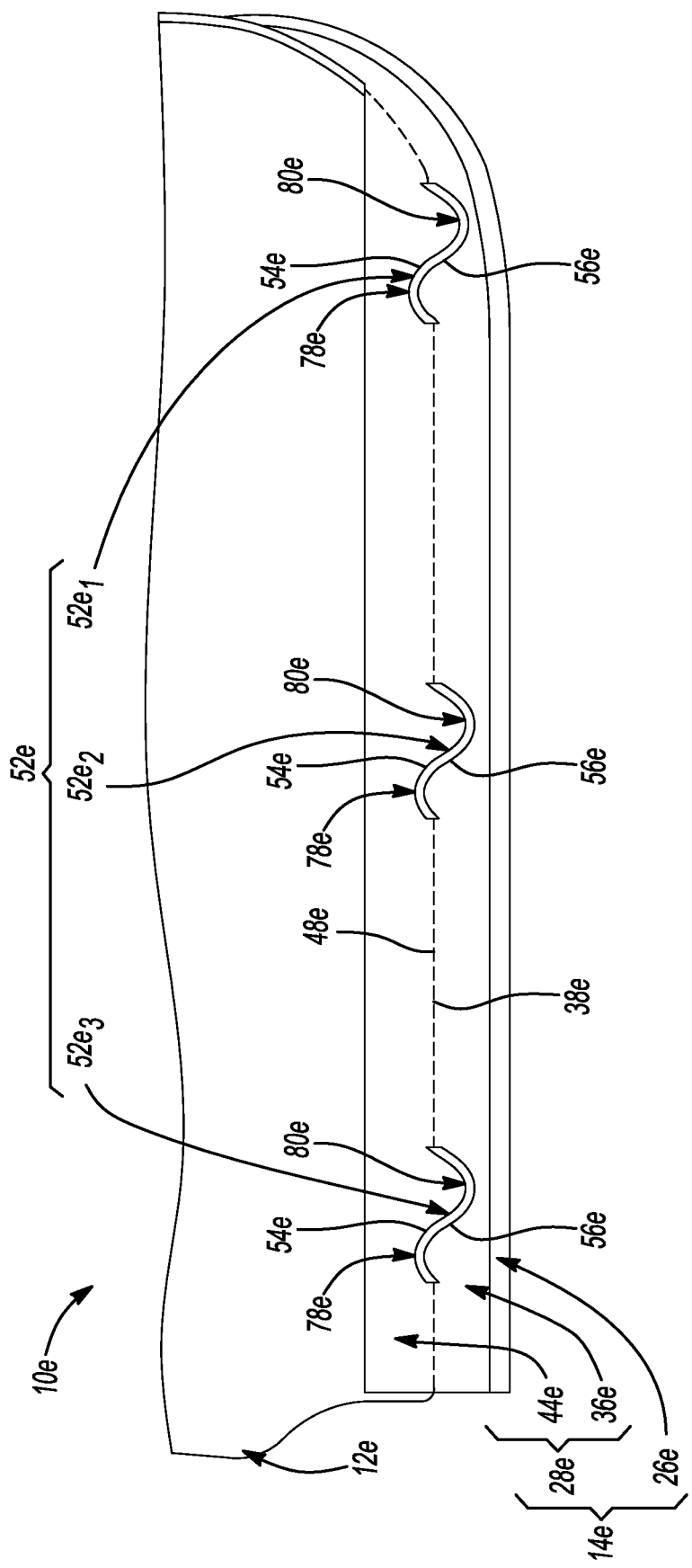
FIG. 38 is an exemplary partial side view of an article of footwear including the first midsole portion and the second midsole portion of any of FIGS. 1-33 and one or more alternative exemplary strips of material having a non-flat pattern.

Although the top surface 54, 54a, 54b and the bottom surface 56, 56a, 56b of each strip of material $52_1$-$52_3$, $52a_1$-$52a_3$, $52b_1$-$52b_6$ of the one or more strips of material 52, 52a, 52b have been described above to be substantially flat (e.g., planar) thereby not being interrupted with one or more recesses, trenches, valleys, or other similar features, a non-flat (i.e., non-planar) top surface 54e and a bottom surface 56e each strip of material $52e_1$-$52e_3$, of exemplary one or more strips of material 52e are shown at FIG. 38. In an example, each of the top surface 54e and the bottom surface 56e each strip of material $52e_1$-$52e_3$, of the one or more strips of material 52e may respectively generally be pre-formed to define one or more peaks 78e and recesses, trenches or valleys 80e such that each of the top surface 54e and the bottom surface 56e each strip of material $52e_1$-$52e_3$, of the one or more strips of material 52e respectively defines a substantially sinusoidal pattern.

In an example, the one or more strips of material 52e of the sole structure 14e of FIG. 38 includes a first strip of material $52e_1$ extending laterally across the forefoot region 16e a second strip of material $52e_2$ extending laterally across the midfoot region 18e and a third strip of material $52e_3$ extending laterally across the heel region 20e. Although first, second and third strips of material $52e_1$, $52e_2$, $52e_3$ are shown respectively laterally extending across the forefoot region 16e, the midfoot region 18e and the forefoot region 20e, the sole structure 14e may include any desirable number of strips. For example, the sole structure 14e may include six strips of material that may be arranged in, for example, a "crisscross" pattern forming an "X" configuration. Furthermore, each strip of material $52e_1$-$52e_3$ of the one or more strips of material 52e may extend substantially perpendicularly or non-perpendicularly along/with respective to respective axes corresponding to the widths of the forefoot region 16e, the midfoot region 18e and the heel region 20e with respect to an axis $A_{14e}$-$A_{14e}$ extending along the length ($L_{14e}$) of the sole structure 14e.

Furthermore, in an example, the sinusoidal pattern of each strip of material $52e_1$-$52e_3$ of the one or more strips of material 52e may be defined by a substantially constant or non-constant amplitude bound by each peak 78e and each valley 80e across the length ($L_{14e}$) of the sole structure 14e. Further, the constant or non-constant amplitude may or may not remain substantially the same as each peak 78e extends between the medial side and the lateral side of the sole structure 14e. Yet even further, in an example, the sinusoidal pattern of each of each strip of material $52e_1$-$52e_3$ of the one or more strips of material 52e may be defined by a substantially constant or non-constant frequency as the sinusoidal pattern extends between the forefoot region 16e and the heel region 20e of the sole structure 14e.

As shown in FIG. 38, when the sinusoidal top surface 54e and the sinusoidal bottom surface 56e each strip of material $52e_1$-$52e_3$, of the one or more strips of material 52e are arranged opposite respective portions of the top surface 38e of the first midsole portion 36e and the bottom surface 48e of the second midsole portion 44e such that the first midsole portion 36e, the second midsole portion 44e and the one or more strips of material 52e are joined together within, for example, a molding tool (as described above at reference numerals 92, 92a, 92b), the sinusoidal top surface 54e and the sinusoidal bottom surface 56e each strip of material $52e_1$-$52e_3$ may cause respective portions of the top surface 38e of the first midsole portion 36e and the bottom surface 48e of the second midsole portion 44e to be shaped to define a corresponding sinusoidal pattern. In an example, one or both of the sinusoidal top surface 54e and the sinusoidal bottom surface 56e each strip of material $52e_1$-$52e_3$ may shape respective portions of the top surface 38e of the first midsole portion 36e and the bottom surface 48e of the second midsole portion 44e from, for example, a substantially flat/planar shape defined by each of the top surface 38e of the first midsole portion 36e and the bottom surface 48e of the second midsole portion 44e to form at least a portion of a non-flat/non-planar sinusoidal pattern corresponding to the sinusoidal pattern defined by each of the top surface 54e and the sinusoidal bottom surface 56e each strip of material $52e_1$-$52e_3$.

In an example, each strip of material $52e_1$-$52e_3$ of the one or more strips of material 52e is formed from a flexible material. Each strip of material $52e_1$-$52e_3$ of the one or more strips of material 52e may include a fabric material, a woven textile, or a knitted textile. In some instances, each strip of material $52e_1$-$52e_3$ of the one or more strips of material 52e is porous. Each strip of material $52e_1$-$52e_3$ of the one or more strips of material 52e may be formed from a polymeric material such as, for example, a thermoplastic polymeric material. An exemplary thermoplastic polymeric material may include, for example, a thermoset polymeric material or the like. In some examples, each strip of material $52e_1$-$52e_3$ of the one or more strips of material 52e may be a thermoformable material. In some examples, if each strip of material 52e is a woven or knit structure, the woven or knit structure may be formed from a polyester yarn. Furthermore, in other examples, if each strip of material 52e is a woven or knit structure, each passage or aperture formed by overlapping members defining the woven or knit structure of each strip of material 52e may be at least 0.5 mm in length in a largest dimension or at least 1.0 mm in length in a largest dimension. Furthermore, each passage or aperture formed by overlapping members defining the woven or knit structure of each strip of material 52e may permit one or both of the first midsole portion 36e and the second midsole portion 44e to directly contact one another. In other implementations, one or both of the first midsole portion 36e and the second midsole portion 44e may be injection molded around or through each passage or aperture formed by overlapping members defining the woven or knit structure of each strip of material 52e.

Although the top surface 54, 54a, 54b and the bottom surface 56, 56a, 56b of each strip of material $52_1$-$52_3$, $52a_1$-$52a_3$, $52b_1$-$52b_6$ of the one or more strips of material 52, 52a, 52b have been described above to be substantially flat (e.g., planar) thereby not being interrupted with one or more recesses, trenches, valleys, or other similar features, a non-flat (i.e., non-planar) top surface 54f and a bottom surface 56f each strip of material $52f_1$-$52f_3$, of exemplary one or more strips of material 52f are shown at FIG. 39. In an example, each of the top surface 54f and the bottom surface 56f each strip of material $52f_1$-$52f_3$, of the one or more strips of material 52f may respectively generally be pre-formed to define one or more peaks 78f and recesses, trenches or valleys 80f such that each of the top surface 54f and the bottom surface 56f each strip of material $52f_1$-$52f_3$, of the one or more strips of material 52f respectively defines a substantially saw-tooth pattern.

In an example, the one or more strips of material 52f of the sole structure 14f of FIG. 39 includes a first strip of material $52f_1$ extending laterally across the forefoot region 16f a second strip of material $52f_2$ extending laterally across the midfoot region 18f and a third strip of material $52f_3$ extending laterally across the heel region 20f. Although first, second and third strips of material $52f_1$, $52f_2$, $52f_3$ are shown respectively laterally extending across the forefoot region 16f, the midfoot region 18f and the forefoot region 20f, the sole structure 14f may include any desirable number of strips. For example, the sole structure 14f may include six strips of material that may be arranged in, for example, a "crisscross" pattern forming an "X" configuration. Furthermore, each strip of material $52f_1$-$52f_3$ of the one or more strips of material 52f may extend substantially perpendicularly or non-perpendicularly along/with respective to respective axes corresponding to the widths of the forefoot region 16f, the midfoot region 18f and the heel region 20f with respect to an axis $A_{14f}$-$A_{14f}$ extending along the length ($L_{14f}$) of the sole structure 14f.

Furthermore, in an example, the saw-tooth pattern of each strip of material $52f_1$-$52f_3$ of the one or more strips of material 52f may be defined by a substantially constant or non-constant amplitude bound by each peak 78f and each valley 80f across the length ($L_{14f}$) of the sole structure 14f. Further, the constant or non-constant amplitude may or may not remain substantially the same as each peak 78f extends between the medial side and the lateral side of the sole structure 14f. Yet even further, in an example, the saw-tooth pattern of each of each strip of material $52f_1$-$52f_3$ of the one or more strips of material 52f may be defined by a substantially constant or non-constant frequency as the saw-tooth pattern extends between the forefoot region 16f and the heel region 20f of the sole structure 14f.

As shown in FIG. 39, when the saw-tooth top surface 54f and the saw-tooth bottom surface 56f each strip of material $52f_1$-$52f_3$, of the one or more strips of material 52f are arranged opposite respective portions of the top surface 38f of the first midsole portion 36f and the bottom surface 48f of the second midsole portion 44f such that the first midsole portion 36f, the second midsole portion 44f and the one or more strips of material 52f are joined together within, for example, a molding tool (as described above at reference numerals 92, 92a, 92b), the saw-tooth top surface 54f and the saw-tooth bottom surface 56f each strip of material $52f_1$-$52f_3$ may cause respective portions of the top surface 38f of the first midsole portion 36f and the bottom surface 48f of the second midsole portion 44f to be shaped to define a corresponding saw-tooth pattern. In an example, one or both of the saw-tooth top surface 54f and the saw-tooth bottom surface 56f each strip of material $52f_1$-$52f_3$ may shape respective portions of the top surface 38f of the first midsole portion 36f and the bottom surface 48f of the second midsole portion 44f from, for example, a substantially flat/planar shape defined by each of the top surface 38f of the first midsole portion 36f and the bottom surface 48f of the second midsole portion 44f to form at least a portion of a non-flat/non-planar saw-tooth pattern corresponding to the saw-tooth pattern defined by each of the top surface 54f and the saw-tooth bottom surface 56f each strip of material $52f_1$-$52f_3$.

In an example, each strip of material $52f_1$-$52f_3$ of the one or more strips of material 52f is formed from a flexible material. Each strip of material $52f_1$-$52f_3$ of the one or more strips of material 52f may include a fabric material, a woven textile, or a knitted textile. In some instances, each strip of material $52f_1$-$52f_3$ of the one or more strips of material 52f is porous. Each strip of material $52f_1$-$52f_3$ of the one or more strips of material 52f may be formed from a polymeric material such as, for example, a thermoplastic polymeric material. An exemplary thermoplastic polymeric material may include, for example, a thermoset polymeric material or the like. In some examples, each strip of material $52f_1$-$52f_3$ of the one or more strips of material 52f may be a thermoformable material. In some examples, if each strip of material 52f is a woven or knit structure, the woven or knit structure may be formed from a polyester yarn. Furthermore, in other examples, if each strip of material 52f is a woven or knit structure, each passage or aperture formed by overlapping members defining the woven or knit structure of each strip of material 52f may be at least 0.5 mm in length in a largest dimension or at least 1.0 mm in length in a largest dimension. Furthermore, each passage or aperture formed by overlapping members defining the woven or knit structure of each strip of material 52f may permit one or both of the first midsole portion 36f and the second midsole portion 44f to directly contact one another. In other implementations, one or both of the first midsole portion 36f and the second midsole portion 44f may be injection molded around or through each passage or aperture formed by overlapping members defining the woven or knit structure of each strip of material 52f.

Referring to FIGS. 40-47, a foam cutting system for manufacturing any of the first midsole portions 36, 36a, 36b, 36c, 36d, 36e and the second midsole portions 44, 44a, 44b, 44c, 44d, 44e is shown generally at 100. As shown in FIG. 40, the system 100 generally includes a receiver portion 102 and an insertion portion 104. The receiver portion 102 includes a conveyor 106, a compression device 108 and a separating device 110 having a blade 111. The insertion portion 104 includes one or more compression dies including a first compression die 112 and a second compression die 114 and one or more compression blocks such as, for example, a first compression block 116 and a second compression block 118.

As shown in FIG. 40, a virgin unit of foamed material F may be secured by the insertion portion 104 prior to being interfaced with the receiver portion 102. Any of the first midsole portions 36, 36a, 36b, 36c, 36d, 36e and the second midsole portions 44, 44a, 44b, 44c, 44d, 44e is/are derived from the virgin unit of foamed material F. In the example shown at FIGS. 40-47, the first and second compression dies 112, 114 and the first and second compression blocks 116, 118 may be generally shaped for forming the first midsole portion 36c and the second midsole portion 44c; however, it is understood that the first and second compression dies 112, 114 and the first and second compression blocks 116, 118 may be formed to include any desirable shape, configuration or geometry to form any of the other first midsole portions 36, 36a 36b, 36d, 36e and second midsole portions 44, 44a, 44b, 44d, 44e or any other first midsole portion or second midsole portion that is not shown or described in the present disclosure.

Referring to FIG. 41, in an example, prior to interfacing the insertion portion 104 with the receiver portion 102, a virgin unit of foamed material F is disposed upon the first compression die 112 such that a lower surface $F_L$ of the virgin unit of foamed material F opposes a patterned surface $112_P$ of the first compression die 112. In an example, the patterned surface $112_P$ of the first compression die 112 generally corresponds to a sinusoidal pattern having a generally constant amplitude and frequency. Furthermore, the first compression block 116 is disposed upon an upper surface $F_U$ of the virgin unit of foamed material F. The first compression block 116 may be derived from a foamed material that is defined by a hardness or stiffness that is greater than that of the virgin unit of foamed material F.

As shown in FIGS. 41-42, the conveyor 106 advances the insertion portion 104 (defined by the first compression die 112 and the first compression block 116) and the virgin unit of foamed material F secured thereby toward the compression device 108, which may be defined by a plurality of roller members. The plurality of roller members of the compression device 108 may be spaced apart from an upper surface of the conveyor 106 at a distance D that is less than a combination of the collective thickness of the first compression die 112, the first compression block 116 and the virgin unit of foamed material F.

As shown in FIG. 42, once the insertion portion 104 and the virgin unit of foamed material F are interfaced with the receiver portion 102, the plurality of roller members compress both of the first compression block 116 and the virgin unit of foamed material F such that the first compression block 116 urges at least a first portion F1 (see, e.g., FIGS. 43-44) of the virgin unit of foamed material F into a cavity 113 (see, e.g., FIG. 41) defined by the patterned surface $112_P$ of the first compression die 112. Referring to FIGS. 42-43, with the first portion F1 of the virgin unit of foamed material F urged into the cavity 113 of the first compression die 112, the blade 111 of the separating device 110 separates a second portion F2 (see, e.g., FIGS. 43-44) of the virgin unit of foamed material F from the first portion F1 of the virgin unit of foamed material F.

Figure 44:
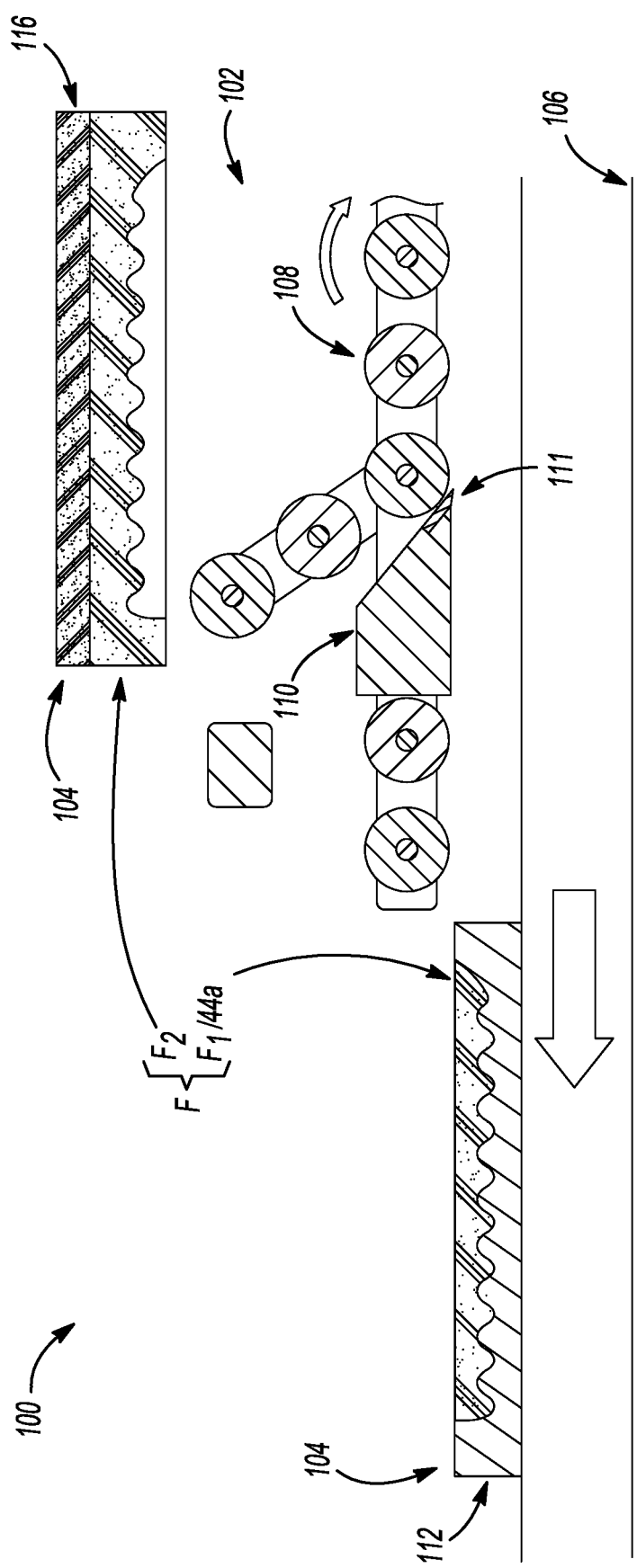
FIG. 44 is a further side view of the foam cutting system and the foam workpiece portion of FIG. 43 illustrating the foam workpiece portion separated for defining the midsole component portion and the scrap piece portion.

Referring to FIG. 44, the first portion F1 of the virgin unit of foamed material F, which is defined by the patterned surface $112_P$ and cavity 113 of the first compression die 112 may generally define the size, shape and geometry of the second midsole portion 44a described above. Furthermore, as shown in FIG. 44, the second portion F2 of the virgin unit of foamed material F may be scrap piece of material defined by a negative impression corresponding to the first portion F1 of the virgin unit of foamed material F/the second midsole portion 44a described above.

Referring to FIG. 45, in another example, prior to interfacing the insertion portion 104 with the receiver portion 102, a virgin unit of foamed material F is disposed upon the second compression die 114 such that a lower surface $F_L$ of the virgin unit of foamed material F opposes a patterned surface $114_P$ of the first compression die 112. In an example, the patterned surface $114_P$ of the second compression die 114 generally corresponds to a flat, non-sinusoidal pattern. Furthermore, the first compression block 116 is disposed upon an upper surface $F_U$ of the virgin unit of foamed material F. The first compression block 116 may be derived from a foamed material that is defined by a hardness or stiffness that is greater than that of the virgin unit of foamed material F. Yet even further, a lower surface $118_L$ of the second compression block 118 is disposed upon an upper surface $116_U$ of the first compression block 116 whereby the lower surface $118_L$ of the second compression block 118 is defined by a sinusoidal pattern having a generally constant amplitude and frequency. Like the first compression block 116, the second compression block 118 may be defined by hardness or stiffness that is greater than that of the virgin unit of foamed material F.

As shown in FIGS. 45-46, the conveyor 106 advances the insertion portion 104 (defined by the second compression die 114, the first compression block 116 and the second compression block 118) and the virgin unit of foamed material F secured thereby toward the compression device 108, which may be defined by a plurality of roller members. The plurality of roller members of the compression device 108 may be spaced apart from an upper surface of the conveyor 106 at a distance D that is less than a combination of the collective thickness of the first compression die 112, the first compression block 116, the second compression device 118 and the virgin unit of foamed material F.

Figure 47:
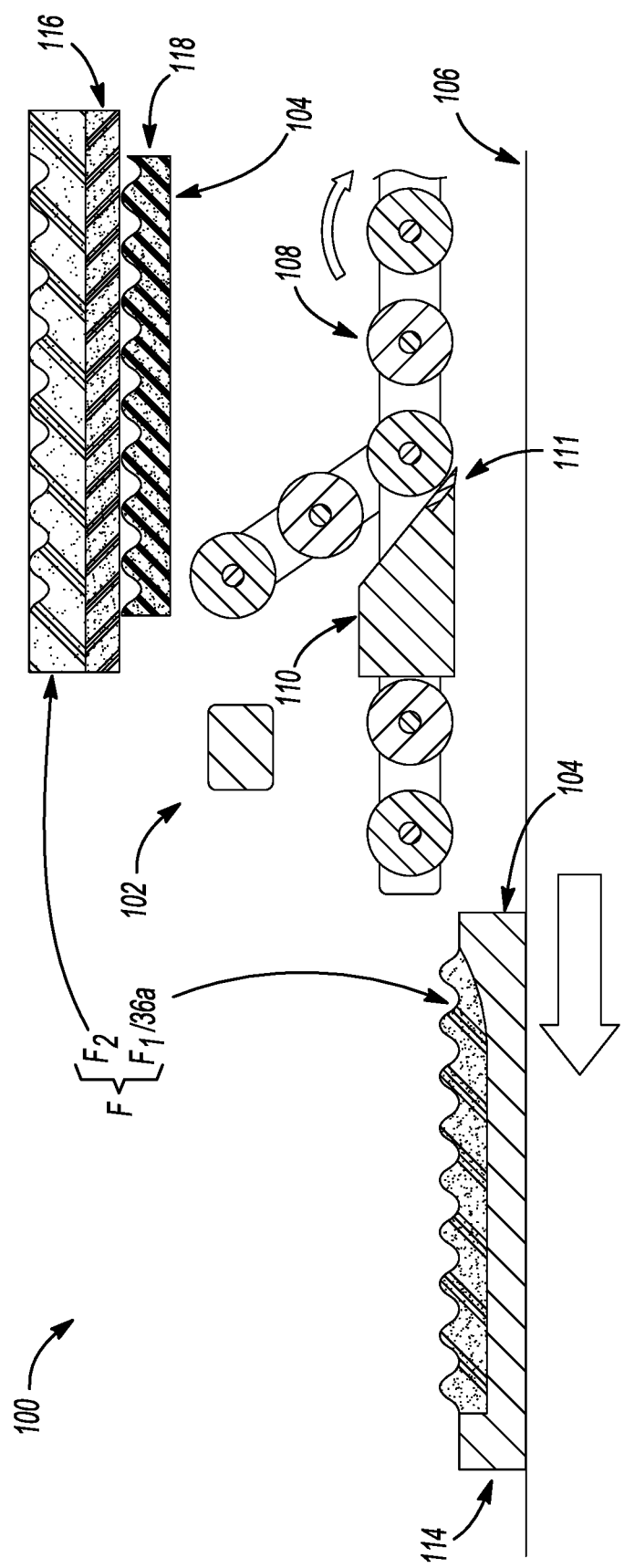
FIG. 47 is a further side view of the foam cutting system and the foam workpiece portion of FIG. 46 illustrating the foam workpiece portion separated for defining the midsole component portion and the scrap piece portion.

As shown in FIG. 46, once the insertion portion 104 and the virgin unit of foamed material F are interfaced with the receiver portion 102, the plurality of roller members compress all of the first compression block 116, the second compression block 118 and the virgin unit of foamed material F such that the first compression block 116 and the second compression block 118 urge at least a first portion F1 (see, e.g., FIGS. 46-47) of the virgin unit of foamed material F into a cavity 115 (see, e.g., FIG. 45) defined by the patterned surface $114_P$ of the second compression die 114. Referring to FIGS. 46-47, with the first portion F1 of the virgin unit of foamed material F urged into the cavity 115 of the second compression die 114, the blade 111 of the separating device 110 separates a second portion F2 (see, e.g., FIGS. 46-47) of the virgin unit of foamed material F from the first portion F1 of the virgin unit of foamed material F.

Referring to FIG. 47, the first portion F1 of the virgin unit of foamed material F, which is defined by a combination of the lower surface $118_L$ of the second compression block 118 and the cavity 115 of the second compression die 114 may generally define the size, shape and geometry of the first midsole portion 36c described above. Furthermore, as shown in FIG. 47, the second portion F2 of the virgin unit of foamed material F may be scrap piece of material defined by a negative impression corresponding to the first portion F1 of the virgin unit of foamed material F/the first midsole portion 36c described above.

Although a foam cutting system 100 has been described above at FIGS. 40-47 for cutting a pattern (e.g., a sinusoidal pattern, a saw tooth pattern or the like) provided by any of the first midsole portions 36, 36a, 36b, 36c, 36d, 36e and the second midsole portions 44, 44a, 44b, 44c, 44d, 44e other methodologies may be employed for cutting a pattern to either of the first midsole portions 36, 36a, 36b, 36c, 36d, 36e and the second midsole portions 44, 44a, 44b, 44c, 44d, 44e. In an example, a wire cutting device where, for example, a wire under tension, such as a heated wire is used as a "cutting blade."

Furthermore, although one or both of the first midsole portions 36, 36a, 36b, 36c, 36d, 36e and the second midsole portions 44, 44a, 44b, 44c, 44d, 44e may be cut for forming a pattern (e.g., a sinusoidal pattern, a saw tooth pattern or the like), the pattern of one or both of the first midsole portions 36, 36a, 36b, 36c, 36d, 36e and the second midsole portions 44, 44a, 44b, 44c, 44d, 44e may be formed in a non-cutting manner. For example, the one or both of the first midsole portions 36, 36a, 36b, 36c, 36d, 36e and the second midsole portions 44, 44a, 44b, 44c, 44d, 44e may be injection molded around or through each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e; in such an implementation at least one of the first midsole portions 36, 36a, 36b, 36c, 36d, 36e the second midsole portions 44, 44a, 44b, 44c, 44d, 44e and the each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e may be pre-formed to define a pattern (e.g., a sinusoidal pattern, a saw tooth pattern or the like). If, for example, the each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e is pre-formed to define a pattern (e.g., a sinusoidal pattern, a saw tooth pattern or the like), injection molding of one or both of the first midsole portions 36, 36a, 36b, 36c, 36d, 36e and the second midsole portions 44, 44a, 44b, 44c, 44d, 44e around, through or around-and-through each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e will result in one or both of the first midsole portions 36, 36a, 36b, 36c, 36d, 36e and the second midsole portions 44, 44a, 44b, 44c, 44d, 44e forming a pattern (e.g., a sinusoidal pattern, a saw tooth pattern or the like) corresponding to the preformed pattern of each strip of material $52_1$-$52_3$, $52a_1$-$52a_3$, $52b_1$-$52b_6$, $52c_1$-$52c_3$, $52b_1$-$52d_3$, $52e_1$-$52e_3$ of the one or more strips of material 52, 52a, 52b, 52c, 52d, 52e.

The pattern (e.g., a sinusoidal pattern, a saw tooth pattern or the like) provided by any of the first midsole portions 36, 36a, 36b, 36c, 36d, 36e and the second midsole portions 44, 44a, 44b, 44c, 44d, 44e contributes to improved performance of the article of footwear 10, 10a, 10b, 10c, 10d, 10e when worn by a user. Furthermore, as a result of each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e being captured between the first midsole portions 36, 36a, 36b, 36c, 36d, 36e and the second midsole portions 44, 44a, 44b, 44c, 44d, 44e, each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e may also contribute to improved performance of the article of footwear 10, 10a, 10b, 10c, 10d, 10e.

In an example, the improved performance of the article of footwear may arise from one or more characteristics (e.g. stiffness) of the selected material of at least one of the first midsole portion 36, 36a, 36b, 36c, 36d, 36e, the second midsole portion 44, 44a, 44b, 44c, 44d, 44e and each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e as well as the shape (e.g., the pattern, amplitude A and/or frequency) of at least one of the first midsole portion 36, 36a, 36b, 36c, 36d, 36e, the second midsole portion 44, 44a, 44b, 44c, 44d, 44e and each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e. In an example, at least one of the pattern, amplitude A and frequency may contribute to a desired amount of shear strength in one or more regions (e.g., the forefoot region 16, 16a, 16b, 16c, 16d, 16e the midfoot region 18, 18a, 18b, 18c, 18d, 18e and the heel region 20, 20a, 20b, 20c, 20d, 20e) of the sole structure 14, 14a, 14b, 14c, 14d, 14e of the article of footwear 10, 10a, 10b, 10c, 10d, 10e.

In some instances, a shorter wavelength defined by, for example, sinusoidal pattern or saw tooth pattern may lead to an improved shear strength of the sole structure 14, 14a, 14b, 14c, 14d, 14e in one or more regions (e.g., the forefoot region 16, 16a, 16b, 16c, 16d, 16e the midfoot region 18, 18a, 18b, 18c, 18d, 18e and the heel region 20, 20a, 20b, 20c, 20d, 20d) of the article of footwear 10, 10a, 10b, 10c, 10d, 10e. Even further, if, for example, each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e is a stretchable fabric, the sole structure 14, 14a, 14b, 14c, 14d, 14e may yield an improved shear stability as a result of each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e being captured between the first midsole portion 36, 36a, 36b, 36c, 36d, 36e and the second midsole portion 44, 44a, 44b, 44c, 44d, 44e. Therefore, in an example, each strip of material $52_1$-$52_3$, $52a_1$-$52a_3$, $52b_1$-$52b_6$, $52c_1$-$52c_3$, $52d_1$-$52d_3$, $52e_1$-$52e_3$ of the one or more strips of material 52, 52a, 52b, 52c, 52d, 52e may be placed in tension (arising from the selected pattern of the first midsole portion 36, 36a, 36b, 36c, 36d, 36e and the second midsole portion 44, 44a, 44b, 44c, 44d, 44e) in response to shear loading imparted by a user's foot so as to provide improved stability in one or a combination of a parallel loading direction and a perpendicular loading direction.

The following Clauses provide exemplary configurations of a sole structure and methods of making a sole structure, as described above.

Clause 1: A sole structure for an article of footwear, the sole structure comprising: a first midsole portion including a first sidewall; a second midsole portion including a second sidewall; and a first sheet disposed between the first midsole portion and the second midsole portion and including a first surface and a second surface formed on an opposite side of the first sheet than the first surface, the first sheet including one or more apertures extending through the first sheet from the first surface to the second surface; wherein the first midsole portion and the second midsole portion are operably connected through the one or more apertures of the first sheet.

Clause 2: The sole structure of Clause 1, further comprising a second sheet disposed between the first midsole portion and the second midsole portion.

Clause 3: The sole structure of Clause 2, wherein the second sheet includes a third surface and a fourth surface formed on an opposite side of the second sheet than the third surface.

Clause 4: The sole structure of Clause 3, further comprising one or more apertures extending through the second sheet from the third surface to the fourth surface.

Clause 5: The sole structure of any of Clauses 2-4, wherein the second sheet is spaced apart from the first sheet in a first direction.

Clause 6: The sole structure of Clause 5, wherein the first direction is substantially parallel to a longitudinal axis of the sole structure.

Clause 7: The sole structure of any of Clauses 2-6, wherein the second sheet and the first sheet each include a longitudinal axis that is substantially perpendicular to a longitudinal axis of the sole structure.

Clause 8: The sole structure of any of Clauses 2-6, wherein the second sheet and the first sheet each include a longitudinal axis that is formed at an angle relative to a longitudinal axis of the sole structure.

Clause 9: The sole structure of any of Clauses 2-8, wherein a longitudinal axis of the first sheet and a longitudinal axis of the second sheet are substantially parallel to one another.

Clause 10: The sole structure of any of Clauses 2-8, wherein a longitudinal axis of the first sheet and a longitudinal axis of the second sheet are convergent.

Clause 11: The sole structure of Clause 2, wherein the second sheet is in contact with the first sheet.

Clause 12: The sole structure of Clause 11, wherein the second sheet crosses the first sheet.

Clause 13: The sole structure of Clause 1, wherein a first distal end of the first sheet is visible at one of a medial side of the sole structure and a lateral side of the sole structure.

Clause 14: The sole structure of Clause 13, wherein a second distal end of the first sheet is visible at the other of the medial side of the sole structure and the lateral side of the sole structure.

Clause 15: The sole structure of Clause 1, wherein a first distal end of the first sheet extends from one of a medial side of the sole structure and a lateral side of the sole structure.

Clause 16: The sole structure of Clause 15, wherein a second distal end of the first sheet extends from the other of the medial side of the sole structure and the lateral side of the sole structure.

Clause 17: The sole structure of any of the preceding clauses, wherein a first distal end of the first sheet is substantially planar at one of a medial side of the sole structure and a lateral side of the sole structure and a second distal end of the first sheet is substantially planar at the other of the medial side of the sole structure and the lateral side of the sole structure.

Clause 18: The sole structure of any of Clauses 1-16, wherein a first distal end of the first sheet includes a sinusoidal shape at one of a medial side of the sole structure and a lateral side of the sole structure and a second distal end of the first sheet includes a sinusoidal shape at the other of the medial side of the sole structure and the lateral side of the sole structure.

Clause 19: The sole structure of any of Clauses 1-16, wherein a first distal end of the first sheet includes a saw-tooth shape at one of a medial side of the sole structure and a lateral side of the sole structure and a second distal end of the first sheet includes a saw-tooth shape at the other of the medial side of the sole structure and the lateral side of the sole structure.

Clause 20: The sole structure of Clause 1, wherein each aperture of the one or more apertures is at least 3.0 mm in length in a largest dimension.

Clause 21: The sole structure of Clause 1, wherein each aperture of the one or more apertures is at least 1 mm in length in a smallest dimension.

Clause 22: The sole structure of Clause 1, wherein each aperture of the one or more apertures is a post-processed aperture defined by material removed from the first sheet.

Clause 23: The sole structure of Clause 1, wherein the first sheet is woven, knit, or braided for integrally defining each aperture of the one or more apertures.

Clause 24: The sole structure of Clause 1, further comprising an outsole including a ground-contacting surface.

Clause 25: The sole structure of Clause 24, wherein the first midsole portion is disposed between the outsole and the first sheet.

Clause 26: The sole structure of Clause 1, wherein the first midsole portion defines at least one first contact region and the second midsole portion defines at least one second contact region, the at least one first contact region in contact with the at least one second contact region at the one or more apertures.

Clause 27: The sole structure of Clause 1, wherein the first midsole portion and the second midsole portion are bonded to one another at the one or more apertures.

Clause 28: The sole structure of Clause 1, wherein a material of the first midsole portion and a material of the second midsole portion are melded at the one or more apertures.

Clause 29: The sole structure of any of the previous clauses, wherein the first midsole portion includes a first surface in contact with the first sheet and the second midsole portion includes a second surface in contact with the first sheet, the first surface of the first midsole portion and the second surface of the second midsole portion each including a plurality of surface features.

Clause 30: The sole structure of Clause 29, wherein each of the plurality of surface features has a minimum height or depth of at least 2 mm.

Clause 31: The sole structure of Clause 29, wherein each of the plurality of surface features has a minimum height or depth of at least 5 mm.

Clause 32: The sole structure of Clause 29, wherein each of the plurality of surface features has a maximum height or depth of less than 22 mm.

Clause 33: The sole structure of Clause 29, wherein each of the plurality of surface features has a maximum height or depth of less than 17 mm.

Clause 34: The sole structure of Clause 29, wherein the height or depth of each of the plurality of surface features ranges from about 2 mm to about 15 mm.

Clause 35: The sole structure of any of the previous clauses, wherein the first midsole portion includes a first series of peaks and a first series of valleys and the second midsole portion includes a second series of peaks and a second series of valleys.

Clause 36: The sole structure of Clause 35, wherein the first series of peaks oppose the second series of valleys and the second series of peaks oppose the first series of valleys.

Clause 37: The sole structure of Clause 35, wherein the first sheet conforms to the shape of the first series of peaks and the first series of valleys and conforms to the shape of the second series of peaks and the second series of valleys.

Clause 38: The sole structure of any of Clauses 35-37, wherein the first series of peaks, the first series of valleys, the second series of peaks, and the second series of valleys cooperate to provide the first sheet with a side surface having a sinusoidal or saw-tooth configuration.

Clause 39: The sole structure of any of the preceding clauses, further comprising an adhesive disposed between the first midsole portion and the second midsole portion, the adhesive being applied to at least one of the first midsole portion, the second midsole portion, the first surface of the sheet, and the second surface of the sheet.

Clause 40: The sole structure of any of the preceding clauses, wherein the first sheet comprises a mesh textile defining the one or more apertures in a structure of the mesh.

Clause 41: The sole structure of Clause 40, wherein the one or more apertures are each at least 0.5 mm in length in a largest dimension.

Clause 42: The sole structure of Clause 40, wherein the one or more apertures are each at least 1.0 mm in length in a largest dimension.

Clause 43: The sole structure of Clause 40, wherein the one or more apertures are each less than 10 mm in length in a largest dimension.

Clause 44: The sole structure of Clause 40, wherein the one or more apertures are each less than 5.0 mm in length in a largest dimension.

Clause 45: The sole structure of Clause 40, wherein the one or more apertures are each less than 3.0 mm in length in a largest dimension.

Clause 46: The sole structure of Clause 40, wherein the one or more apertures each have a length in a largest dimension from about 0.5 mm to about 3.0 mm.

Clause 47: The sole structure of any of the preceding clauses, wherein the first sheet is a textile configured to stretch in only one dimension.

Clause 48: The sole structure of any of the preceding clauses, wherein the first sheet is a textile configured to stretch in two dimensions.

Clause 49: The sole structure of any of the preceding clauses, wherein the first sheet is an embroidered textile.

Clause 50: The sole structure of Clause 49, wherein the embroidered textile includes a first embroidered region and a second embroidered region, the first embroidered region having a different concentration of fibers than the second embroidered region.

Clause 51: The sole structure of Clause 1, wherein the first sheet includes embroidered regions disposed at discrete locations of the sheet.

Clause 52: The sole structure of any of the preceding clauses, wherein at least one of the first midsole portion and the second midsole portion is formed from a polymeric material having a foam structure.

Clause 53: The sole structure of Clause 52, wherein the polymeric material having a foam structure is an injection-molded foam.

Clause 54: The sole structure of Clause 52, wherein the polymeric material having a foam structure is a compression-molded foam.

Clause 55: An article of footwear incorporating the sole structure of any of the preceding claims.

Clause 56: A method of manufacturing an article of footwear, comprising: providing the sole structure of any of Clauses 1-55; providing an upper for an article of footwear; affixing the sole structure and the upper to each other to form the article of footwear.

Clause 57: A method of making a sole structure for an article of footwear, the method comprising: providing a first midsole portion including a first sidewall; providing a second midsole portion including a second sidewall; positioning a first sheet of material between the first midsole portion and the second midsole portion having a first surface and a second surface formed on an opposite side of the first sheet than the first surface, the first sheet including one or more apertures extending through the sheet from the first surface to the second surface; and connecting the first midsole portion and the second midsole portion through the one or more apertures of the first sheet.

Clause 58: The method of Clause 57, further comprising positioning a second sheet between the first midsole portion and the second midsole portion.

Clause 59: The method of Clause 58, wherein positioning a second sheet includes providing a second sheet having a third surface and a fourth surface formed on an opposite side of the second sheet than the third surface.

Clause 60: The method of Clause 59, further comprising providing one or more apertures that extend through the second sheet from the third surface to the fourth surface.

Clause 61: The method of any of Clauses 58-60, further comprising spacing the second sheet apart from the first sheet in a first direction.

Clause 62: The method of Clause 61, wherein spacing the second sheet apart from the first sheet in a first direction includes spacing the second sheet apart from the first sheet in a direction that is substantially parallel to a longitudinal axis of the sole structure.

Clause 63: The method of any of Clauses 58-62, further comprising providing the second sheet and the first sheet with a longitudinal axis that is substantially perpendicular to a longitudinal axis of the sole structure.

Clause 64: The method of any of Clauses 58-62, further comprising providing the second sheet and the first sheet with a longitudinal axis that is formed at an angle relative to a longitudinal axis of the sole structure.

Clause 65: The method of any of Clauses 58-62, further comprising positioning a longitudinal axis of the first sheet and a longitudinal axis of the second sheet substantially parallel to one another.

Clause 66: The method of any of Clauses 58-62, further comprising positioning a longitudinal axis of the first sheet and a longitudinal axis of the second sheet convergent to one another.

Clause 67: The method of Clause 58, further comprising placing the second sheet in contact with the first sheet.

Clause 68: The method of Clause 67, further comprising crossing the second sheet and the first sheet.

Clause 69: The method of Clause 57, further comprising exposing a first distal end of the first sheet at one of a medial side of the sole structure and a lateral side of the sole structure.

Clause 70: The method of Clause 69, further comprising exposing a second distal end of the first sheet at the other of the medial side of the sole structure and the lateral side of the sole structure.

Clause 71: The method of Clause 57, further comprising extending a first distal end of the first sheet from one of a medial side of the sole structure and a lateral side of the sole structure.

Clause 72: The method of Clause 71, further comprising extending a second distal end of the first sheet from the other of the medial side of the sole structure and the lateral side of the sole structure.

Clause 73: The method of any of the preceding clauses, further comprising providing a first distal end of the first sheet with a substantially planar configuration at one of a medial side of the sole structure and a lateral side of the sole structure and providing a second distal end of the first sheet with a substantially planar configuration at the other of the medial side of the sole structure and the lateral side of the sole structure.

Clause 74: The method of any of Clauses 57-72, further comprising providing a first distal end of the first sheet with a sinusoidal shape at one of a medial side of the sole structure and a lateral side of the sole structure and providing a second distal end of the first sheet with a sinusoidal shape at the other of the medial side of the sole structure and the lateral side of the sole structure.

Clause 75: The method of any of Clauses 57-72, further comprising providing a first distal end of the first sheet with a saw-tooth shape at one of a medial side of the sole structure and a lateral side of the sole structure and providing a second distal end of the first sheet with a saw-tooth shape at the other of the medial side of the sole structure and the lateral side of the sole structure.

Clause 76: The method of Clause 57, further comprising providing each aperture of the one or more apertures with a length that is at least 3.0 mm in a largest dimension.

Clause 77: The method of Clause 57, further comprising providing each aperture of the one or more apertures with a length that is at least 1 mm in a smallest dimension.

Clause 78: The method of Clause 57, further comprising forming each aperture of the one or more apertures by removing material from the first sheet.

Clause 79: The method of Clause 57, wherein positioning the first sheet includes positioning a sheet that is woven, knit, or braided for integrally defining each aperture of the one or more apertures.

Clause 80: The method of Clause 57, further comprising providing an outsole including a ground-contacting surface.

Clause 81: The method of Clause 80, further comprising positioning the first midsole portion between the outsole and the first sheet.

Clause 82: The method of Clause 57, wherein providing a first midsole portion includes providing a first midsole portion that defines at least one first contact region and providing a second midsole portion includes providing a second midsole portion that defines at least one second contact region, the at least one first contact region in contact with the at least one second contact region at the one or more apertures.

Clause 83: The method of Clause 57, further comprising bonding the first midsole portion and the second midsole portion to one another at the one or more apertures.

Clause 84: The method of Clause 57, further comprising melding a material of the first midsole portion and a material of the second midsole portion at the one or more apertures.

Clause 85: The method of any of the previous clauses, further comprising contacting a first surface of the first midsole portion with the first sheet and contacting a second surface of the second midsole portion with the first sheet, the first surface of the first midsole portion and the second surface of the second midsole portion each including a plurality of surface features.

Clause 86: The method of Clause 85, further comprising providing each of the plurality of surface features with a minimum height or depth of at least 2 mm.

Clause 87: The method of Clause 85, further comprising providing each of the plurality of surface features with a minimum height or depth of at least 5 mm.

Clause 88: The method of Clause 85, further comprising providing each of the plurality of surface features with a maximum height or depth of less than 22 mm.

Clause 89: The method of Clause 85, further comprising providing each of the plurality of surface features with a maximum height or depth of less than 17 mm.

Clause 90: The method of Clause 85, further comprising providing each of the plurality of surface features with a height or depth that ranges from about 2 mm to about 15 mm.

Clause 91: The method of any of the previous clauses, further comprising providing the first midsole portion with a first series of peaks and a first series of valleys and providing the second midsole portion with a second series of peaks and a second series of valleys.

Clause 92: The method of Clause 91, further comprising opposing the first series of peaks with the second series of valleys and opposing the second series of peaks with the first series of valleys.

Clause 93: The method of Clause 91, further comprising conforming the first sheet to the shape of the first series of peaks and the first series of valleys and conforming the first sheet to the shape of the second series of peaks and the second series of valleys.

Clause 94: The method of any of Clauses 91-93, further comprising providing the first sheet with a side surface having a sinusoidal or saw-tooth configuration.

Clause 95: The method of any of the preceding clauses, further comprising positioning an adhesive between the first midsole portion and the second midsole portion, the adhesive being applied to at least one of the first midsole portion, the second midsole portion, the first surface of the sheet, and the second surface of the sheet.

Clause 96: The method of any of the preceding clauses, wherein positioning a first sheet includes positioning a first sheet comprising a mesh textile defining the one or more apertures in a structure of the mesh.

Clause 97: The method of Clause 96, further comprising providing each of the one or more apertures with a length of at least 0.5 mm in a largest dimension.

Clause 98: The method of Clause 96, further comprising providing each of the one or more apertures with a length of at least 1.0 mm in a largest dimension.

Clause 99: The method of Clause 96, further comprising providing each of the one or more apertures with a length that is less than 10 mm in a largest dimension.

Clause 100: The method of Clause 96, further comprising providing each of the one or more apertures with a length that is less than 5.0 mm in a largest dimension.

Clause 101: The method of Clause 96, further comprising providing each of the one or more apertures with a length that is less than 3.0 mm in a largest dimension.

Clause 102: The method of Clause 96, further comprising providing each of the one or more apertures with a length from about 0.5 mm to about 3.0 mm in a largest dimension.

Clause 103: The method of any of the preceding claims, wherein providing a first sheet includes providing a first sheet that is a textile configured to stretch in only one dimension.

Clause 104: The method of any of the preceding clauses, wherein providing a first sheet includes providing a first sheet that is a textile configured to stretch in two dimensions.

Clause 105: The method of any of the preceding clauses, wherein providing a first sheet includes providing a first sheet that is an embroidered textile.

Clause 106: The method of Clause 105, wherein providing an embroidered textile includes providing a textile having a first embroidered region and a second embroidered region, the first embroidered region having a different concentration of fibers than the second embroidered region.

Clause 107: The method of Clause 57, further comprising providing the first sheet with embroidered regions disposed at discrete locations of the sheet.

Clause 108: The method of any of the preceding clauses, further comprising forming at least one of the first midsole portion and the second midsole portion from a polymeric material having a foam structure.

Clause 109: The method of Clause 108, wherein forming at least one of the first midsole portion and the second midsole portion from a polymeric material having a foam structure includes incorporation of an injection-molded foam.

Clause 110: The method of Clause 108, wherein forming at least one of the first midsole portion and the second midsole portion from a polymeric material having a foam structure includes incorporation of a compression-molded foam.

Clause 111: An article of footwear incorporating the sole structure of any of the preceding clauses.

Clause 112: A method of manufacturing an article of footwear, comprising: providing the sole structure of any of Clauses 57-111; providing an upper for an article of footwear; affixing the sole structure and the upper to each other to form the article of footwear.

The foregoing description of the embodiments has been provided for purposes of illustration and description. It is not intended to be exhaustive or to limit the disclosure. Individual elements or feature of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sole structure for an article of footwear, the sole structure comprising:
a first midsole layer including a first surface;
a second midsole layer formed separately from the first midsole layer and including a second surface; and
a first sheet disposed between the first midsole layer and the second midsole layer and including a third surface and a fourth surface formed on an opposite side of the first sheet than the third surface, the first sheet being a mesh textile defining one or more post-processed apertures (i) extending through a structure of the mesh textile from the third surface to the fourth surface, (ii) defined by removing an interior portion of the mesh textile from the first sheet, and (iii) completely surrounded by the mesh textile of the first sheet;
wherein the first surface of the first midsole layer is directly bonded to the second surface of the second midsole layer through the one or more post-processed apertures of the first sheet by an adhesive.

2. The sole structure of claim 1, further comprising a second sheet disposed between the first midsole layer and the second midsole layer.

3. The sole structure of claim 1, wherein a first distal end of the first sheet is visible at one of a medial side of the sole structure and a lateral side of the sole structure.

4. The sole structure of claim 1, wherein a first distal end of the first sheet is substantially planar at one of a medial side of the sole structure and a lateral side of the sole structure and a second distal end of the first sheet is substantially planar at the other of the medial side of the sole structure and the lateral side of the sole structure.

5. The sole structure of claim 1, wherein a first distal end of the first sheet includes a sinusoidal shape at one of a medial side of the sole structure and a lateral side of the sole structure and a second distal end of the first sheet includes a sinusoidal shape at the other of the medial side of the sole structure and the lateral side of the sole structure.

6. The sole structure of claim 1, wherein a first distal end of the first sheet includes a saw-tooth shape at one of a medial side of the sole structure and a lateral side of the sole structure and a second distal end of the first sheet includes a saw-tooth shape at the other of the medial side of the sole structure and the lateral side of the sole structure.

7. The sole structure of claim 1, wherein the first midsole layer includes a first series of peaks and a first series of valleys and the second midsole layer includes a second series of peaks and a second series of valleys, the first series of peaks opposing the second series of valleys and the second series of peaks opposing the first series of valleys.

8. The sole structure of claim 7, wherein the first sheet conforms to the shape of the first series of peaks and the first series of valleys and conforms to the shape of the second series of peaks and the second series of valleys.

9. A sole structure for an article of footwear, the sole structure comprising:
a first sheet including a textile material having a first surface and a second surface formed on an opposite side of the first sheet than the first surface, the first sheet including one or more post-processed apertures (i) extending through a thickness of the first sheet from the first surface to the second surface, (ii) defined by removing an interior portion of the textile material from the first sheet, and (iii) completely surrounded by the textile material of the first sheet;
a first midsole layer including a third surface disposed adjacent to the first surface of the first sheet; and
a second midsole layer formed independently of the first midsole layer and including a fourth surface disposed adjacent to the second surface of the first sheet and directly bonded to the third surface of the first midsole layer through the one or more post-processed apertures by an adhesive.

10. The sole structure of claim 9, further comprising a second sheet disposed between the first midsole layer and the second midsole layer.

11. The sole structure of claim 9, wherein a first distal end of the first sheet is visible at one of a medial side of the sole structure and a lateral side of the sole structure.

12. A sole structure for an article of footwear, the sole structure comprising:

a first midsole layer;

a second midsole layer formed separately from the first midsole layer; and a first sheet disposed between the first midsole layer and the second midsole layer, the first sheet being a mesh textile defining one or more post-processed apertures (i) extending through a structure of the mesh textile, (ii) defined by removing an interior portion of the mesh textile from the first sheet; and (iii) completely surrounded by the mesh textile of the first sheet;

wherein the first midsole layer is directly bonded to the second midsole layer through the one or more post-processed apertures of the first sheet by an adhesive.

13. The sole structure of claim 12, further comprising a second sheet disposed between the first midsole layer and the second midsole layer.

14. The sole structure of claim 12, wherein a first distal end of the first sheet is visible at one of a medial side of the sole structure and a lateral side of the sole structure.

\* \* \* \* \*